US007522993B2

(12) United States Patent
van Oldenborgh et al.

(10) Patent No.: US 7,522,993 B2
(45) Date of Patent: Apr. 21, 2009

(54) TRAFFIC INFORMATION SYSTEM FOR VEHICLES USING WIRELESS PEER TO PEER (P2P) CONNECTIONS

(75) Inventors: Marc van Oldenborgh, Amsterdam (NL); Martijn Gnirrep, Amsterdam (NL)

(73) Assignee: Nonend Inventions N.V., Curacao (AN)

( * ) Notice: Subject to any disclaimer, the term of this patent is extended or adjusted under 35 U.S.C. 154(b) by 136 days.

(21) Appl. No.: 11/617,421

(22) Filed: Dec. 28, 2006

(65) Prior Publication Data
US 2007/0220130 A1 Sep. 20, 2007

Related U.S. Application Data

(62) Division of application No. 11/287,753, filed on Nov. 28, 2005, now Pat. No. 7,349,983, which is a division of application No. 09/967,600, filed on Sep. 28, 2001, now Pat. No. 7,065,548.

(30) Foreign Application Priority Data
Feb. 16, 2001 (NL) .................................. 1017388

(51) Int. Cl.
*G01C 21/00* (2006.01)
(52) U.S. Cl. ...................... 701/200; 701/208; 701/211; 709/201; 709/231; 709/238; 340/995.13
(58) Field of Classification Search ................. 701/1, 701/200, 207–208, 211; 709/223, 231, 230, 709/238, 2; 340/995.13
See application file for complete search history.

(56) References Cited
U.S. PATENT DOCUMENTS
5,051,987 A 9/1991 Conlon (Continued)

FOREIGN PATENT DOCUMENTS
CN 101084649 A * 12/2007

(Continued)

OTHER PUBLICATIONS

Wireless data communications Pahlavan, K.; Levesque, A.H.; Proceedings of the IEEE vol. 82, Issue 9, Sep. 1994 pp. 1398-1430 Digital Object Identifier 10.1109/5.317085.*

(Continued)

*Primary Examiner*—Cuong H Nguyen
(74) *Attorney, Agent, or Firm*—Finnegan, Henderson, Farabow, Garrett & Dunner, L.L.P.

(57) ABSTRACT

The invention relates to a device for either generating or maintaining an organic data network having an dynamic topology, comprising
  a data processing unit,
  at least one data connection to a data network to which several devices provided with a data processing unit are connected by means of a data connection, and
  software having
    a receiving routine for receiving data packages of at least one transmitting device in the data network,
    a transmission routine for transmitting data packages, received from the transmitting device or devices in the data network to at least one receiving device that is connected to the data network, independent of the transmitting device or devices.

Additionally the invention relates to a method and software for data packages received from a transmitting device to at least one receiving device, independent of said transmitting device.

A device according to the invention can be used in for instance mobile phones, streaming internet applications and cable television.

15 Claims, 49 Drawing Sheets

U.S. PATENT DOCUMENTS

| | | | |
|---|---|---|---|
| 5,511,168 | A | 4/1996 | Perlman et al. |
| 5,553,071 | A | 9/1996 | Aranguren et al. |
| 5,652,751 | A | 7/1997 | Sharony |
| 5,654,958 | A | 8/1997 | Natarajan |
| 5,737,319 | A | 4/1998 | Croslin et al. |
| 5,884,031 | A | 3/1999 | Ice |
| 5,944,783 | A | 8/1999 | Nieten |
| 6,049,805 | A | 4/2000 | Drucker et al. |
| 6,052,718 | A | 4/2000 | Gifford |
| 6,055,562 | A | 4/2000 | Devarakonda et al. |
| 6,085,240 | A | 7/2000 | Suzuki et al. |
| 6,115,736 | A | 9/2000 | Devarakonda et al. |
| 6,243,585 | B1 | 6/2001 | Pelech et al. |
| 6,246,669 | B1 * | 6/2001 | Chevalier et al. ............ 370/238 |
| 6,317,682 | B1 * | 11/2001 | Ogura et al. ................. 701/117 |
| 6,353,174 | B1 | 3/2002 | Schmidt et al. |
| 6,407,991 | B1 | 6/2002 | Meier |
| 6,442,615 | B1 | 8/2002 | Nordenstam et al. |
| 6,456,599 | B1 | 9/2002 | Elliot |
| 6,466,862 | B1 * | 10/2002 | DeKock et al. .............. 701/117 |
| 6,553,218 | B1 * | 4/2003 | Boesjes ........................ 455/406 |
| 6,642,615 | B2 * | 11/2003 | Hashimoto et al. .......... 257/698 |
| 6,658,463 | B1 | 12/2003 | Dillon et al. |
| 6,667,957 | B1 | 12/2003 | Corson et al. |
| 6,742,023 | B1 | 5/2004 | Fanning |
| 6,760,306 | B1 | 7/2004 | Pan et al. |
| 6,781,523 | B2 * | 8/2004 | Matsui et al. ................ 340/910 |
| 6,801,837 | B2 * | 10/2004 | Carlstedt et al. ................. 701/1 |
| 6,829,486 | B2 | 12/2004 | McKenna et al. |
| 6,865,609 | B1 | 3/2005 | Gubbi et al. |
| 6,870,487 | B2 | 3/2005 | Nuesser et al. |
| 6,891,795 | B1 | 5/2005 | Hamachi et al. |
| 6,912,565 | B1 | 6/2005 | Powers et al. |
| 6,931,320 | B2 * | 8/2005 | Mori et al. ................... 701/212 |
| 6,981,045 | B1 * | 12/2005 | Brooks ........................ 709/226 |
| 7,006,472 | B1 | 2/2006 | Immonen et al. |
| 7,069,310 | B1 | 6/2006 | Bartholomew |
| 7,117,083 | B2 * | 10/2006 | Rothman et al. ............ 701/200 |
| 7,143,939 | B2 | 12/2006 | Henzerling |
| 7,174,385 | B2 | 2/2007 | Li |
| 7,250,860 | B2 * | 7/2007 | Smith et al. ............. 340/539.22 |
| 7,277,950 | B1 | 10/2007 | Chapweske |
| 7,451,005 | B2 * | 11/2008 | Hoffberg et al. .............. 700/83 |
| 2002/0161797 | A1 | 10/2002 | Gallo et al. |
| 2003/0016655 | A1 | 1/2003 | Gwon |
| 2004/0204845 | A1 * | 10/2004 | Wong .......................... 701/210 |
| 2005/0286549 | A1 * | 12/2005 | Murphy ....................... 370/463 |
| 2006/0058952 | A1 * | 3/2006 | Cooper et al. ............... 701/208 |
| 2006/0098588 | A1 * | 5/2006 | Zhang et al. ................. 370/255 |
| 2006/0133415 | A1 * | 6/2006 | Mueller ........................ 370/466 |
| 2006/0235967 | A1 * | 10/2006 | Fritz ............................. 709/224 |
| 2006/0291482 | A1 * | 12/2006 | Evans .......................... 370/401 |
| 2007/0088494 | A1 * | 4/2007 | Rothman et al. ............ 701/200 |
| 2007/0088499 | A1 * | 4/2007 | Erignac ....................... 701/208 |
| 2007/0118591 | A1 | 5/2007 | van Oldenborgh et al. |
| 2007/0220117 | A1 | 9/2007 | van Oldenborgh et al. |
| 2007/0226365 | A1 * | 9/2007 | Hildreth et al. ............. 709/231 |
| 2008/0022006 | A1 | 1/2008 | van Oldenborgh et al. |
| 2008/0047329 | A1 * | 2/2008 | Breed ........................... 73/61.41 |
| 2008/0227437 | A1 * | 9/2008 | Lewis ....................... 455/414.3 |

FOREIGN PATENT DOCUMENTS

| | | | |
|---|---|---|---|
| CN | 101208973 A * | 6/2008 | |
| EP | 1 643 716 A1 | 4/2006 | |
| GB | 2437191 A * | 10/2007 | |
| KR | 2006067745 A * | 6/2006 | |
| SE | 200501854 A * | 2/2007 | |
| WO | WO 99/37057 | 7/1999 | |
| WO | WO 2007024174 A2 * | 3/2007 | |
| WO | WO 2007082912 A1 * | 7/2007 | |

OTHER PUBLICATIONS

Integrated peer-to-peer applications for advanced emergency response systems. Part II. Technical feasibility; Bahora, A.S.; Collins, T.; Davis, S.; Goknur, S.; Kearns, J.; Lieu, T.; Nguyen, T.; Zeng, J.; Horowitz, B.M.; Patek, S.D.; Systems and Information Engineering Design Symposium, 2003 IEEE; Apr. 24-25, 2003 pp. 261-268.*

Incentives for large peer-to-peer systems Courcoubetis, C.; Weber, R.; Selected Areas in Communications, IEEE Journal on; vol. 24, Issue 5, May 2006 pp. 1034-1050 Digital Object Identifier 10.1109/JSAC.2006.872885.*

MiNT: a miniaturized network testbed for mobile wireless research; De, P.; Raniwala, A.; Sharma, S.; Chiueh, T.; INFOCOM 2005. 24th Annual Joint Conference of the IEEE Computer and Communications Societies. Proceedings IEEE vol. 4, Mar. 13-17, 2005 pp. 2731-2742 vol. 4.*

On the design of spontaneous networks using a P2P approach and Bluetooth; Cano, J.; Cano, J.-C.; Manzoni, P.; Ferrandez, D.; Computers and Communications, 2005. ISCC 2005. Proceedings. 10th IEEE Symposium on; Jun. 27-30, 2005 pp. 125-130; Digital Object Identifier 10.1109/ISCC.2005.110.*

Adaptive QoS management for collaboration in heterogeneous environments; Chowdhury, R.; Bhandarkar, P.; Parashar, M.; Parallel and Distributed Processing Symposium., Proceedings International, IPDPS 2002, Abstracts and CD-ROM; Apr. 15-19, 2002 pp. 90-100.*

A device-independent representation for services; Roman, M.; Beck, J.; Gefflaut, A.; Mobile Computing Systems and Applications, 2000 Third IEEE Workshop on. Dec. 7-8, 2000 pp. 73-82; Digital Object Identifier 10.1109/MCSA.2000.895383.*

MiNT: a miniaturized network testbed for mobile wireless research; De, P.; Raniwala, A.; Sharma, S.; Chiueh, T.; INFOCOM 2005. 24th Annual Joint Conference of the IEEE Computer and Communications Societies. Proceedings IEEE vol. 4, Mar. 13-17, 2005 pp. 2731-2742 vol. 4; Digital Object Identifier 10.1109/INFCOM.2005.1498556.*

In-vehicle secure wireless personal area network (SWPAN); Mahmud, S.M.; Shanker, S.; Vehicular Technology, IEEE Transactions on; vol. 55, Issue 3, May 2006 pp. 1051-1061; Digital Object Identifier 10.1109/TVT.2005.863341.*

Managing Distributed Networked Appliances in Home Networks; Merabti, M.; Fergus, P.; Abuelma'atti, O.; Yu, H.; Judice, C.; Proceedings of the IEEE; vol. 96, Issue 1, Jan. 2008 pp. 166-185; Digital Object Identifier; 10.1109/JPROC.2007.909922.*

MAC for dedicated short range communications in intelligent transport system; Jing Zhu; Roy, S.; Communications Magazine, IEEE; vol. 41, Issue 12, Dec. 2003 pp. 60-67; Digital Object Identifier 10.1109/MCOM.2003.1252800.*

MOBY-a mobile peer-to-peer service and data network; Horozov, T.; Grama, A.; Vasudevan, V.; Landis, S.; Parallel Processing, 2002. Proceedings. International Conference on; Aug. 18-21, 2002 pp. 437-444; Digital Object Identifier 10.1109/ICPP.2002.1040900.*

Issues related to Development of Wireless Peer-to-Peer Games in J2ME; Alf Inge Wang; Norum, M.S.; Lund, C.W.; Telecommunications, 2006. AICT-ICIW '06. International Conference on Internet and Web Applications and Services/Advanced International Conference on; Feb. 19-25, 2006 pp. 115-115; Digital Object Identifier 10.1109/AICT-ICIW.2006.119.*

A SIP-based OSGi device communication service for mobile personal area networks; Brown, A.; Kolberg, M.; Bushmitch, D.; Lomako, G.; Ma, M.; Consumer Communications and Networking Conference, 2006. CCNC 2006. 2006 3rd IEEE; vol. 1, Jan. 8-10, 2006 pp. 502-508.*

Managing shared access to a spectrum commons; Lehr, W.; Crowcroft, J.; New Frontiers in Dynamic Spectrum Access Networks, 2005. DySPAN 2005. 2005 First IEEE International Symposium on; Nov. 8-11, 2005 pp. 420-444; Digital Object Identifier 10.1109/DYSPAN.2005.1542658.*

BT-Crowds: Crowds-Style Anonymity with Bluetooth and Java; Vaha-Sipila, A.; Virtanen, T.; System Sciences, 2005. HICSS '05.

Proceedings of the 38th Annual Hawaii International Conference on; Jan. 3-6, 2005 pp. 320a-320a; Digital Object Identifier 10.1109/HICSS.2005.128.*

Approved Draft Standard for Information technology—Telecommunications and information exchange between systems—Local and metropolitan area networks—Specific requirements Part 15.1REVa: Wireless Medium Access Control (MAC) and Physical Layer (PHY) Specifications for Wireless Personal Area Networks (WPANs) Replaced by IEEE 802.15.1-2005.*

IEEE Std 802.15.1—2005 IEEE Standard for Information technology—Telecommunications and information exchange between systems—Local and metropolitan area networks—Specific requirements.—Part 15.1: Wireless medium access control (MAC) and physical layer (PHY) specifications for wireless personal area networks (WPANs) 2005 pp. 0_1-580.*

Approved Draft Amendment to IEEE Standard for Information technology—Telecommunications and information exchange between systems—Part 15.4:Wireless Medium Access Control (MAC) and Physical Layer (PHY) Specifications for Low-Rate Wireless Personal Area Networks (LR-WPANs): Amendment to add alternate PHY (Amendment of IEEE Std 802.15.4) 2007.*

Onn Shehory et al., "Agent Cloning: An Approach to Agent Mobility and Resource Allocation." IEEE Communications Magazine—Jul. 1998, pp. 58, 63-67.

Chu, Yang-hua; Rao, Sanjay G.; Seshan, Srinivasan; Zhang, Hui; "A Case For End System Multicast," Carnegie Mellon University; (2000), 15 pp.

Adar, Eytan and Huberman, Bernardo; "Free Riding On Gnutella"; First Monday Peer-Reviewed Journal On The Internet; vol. 5, No. 10 (Aug. 10, 2000), 14 pp.

Clarke, Ian; Sandberg, Oskar; Wiley, Brandon; Hong, Theodore W.; "Freenet A Distributed Anonymous Information Storage and Retrieval System"; (2000), 21 pp.

Jannoti, John, Gifford, David K.; Johnson, Kirk L.; Kaashoek, M. Frans; Jr. O'Toole, James W.; "Overcast Reliable Multicasting With An Overlay Network"; (Oct. 2000), 16 pp.

"eDonkey2000—Harness the power of 2000 electronic donkeys!"; eDonkey2000 Downloads Feb. 22, 2006, 10:06PM;http://web.archive.orgfwebJ20010213200827/www.edonkey2000.comoverview.htrnl; 2 pp.

Gartner Consulting, "The Emergence of Distributed Content Management and Peer-to-Peer Content Networks," Gartner Group, Jan. 2001, pp. 1-20.

* cited by examiner

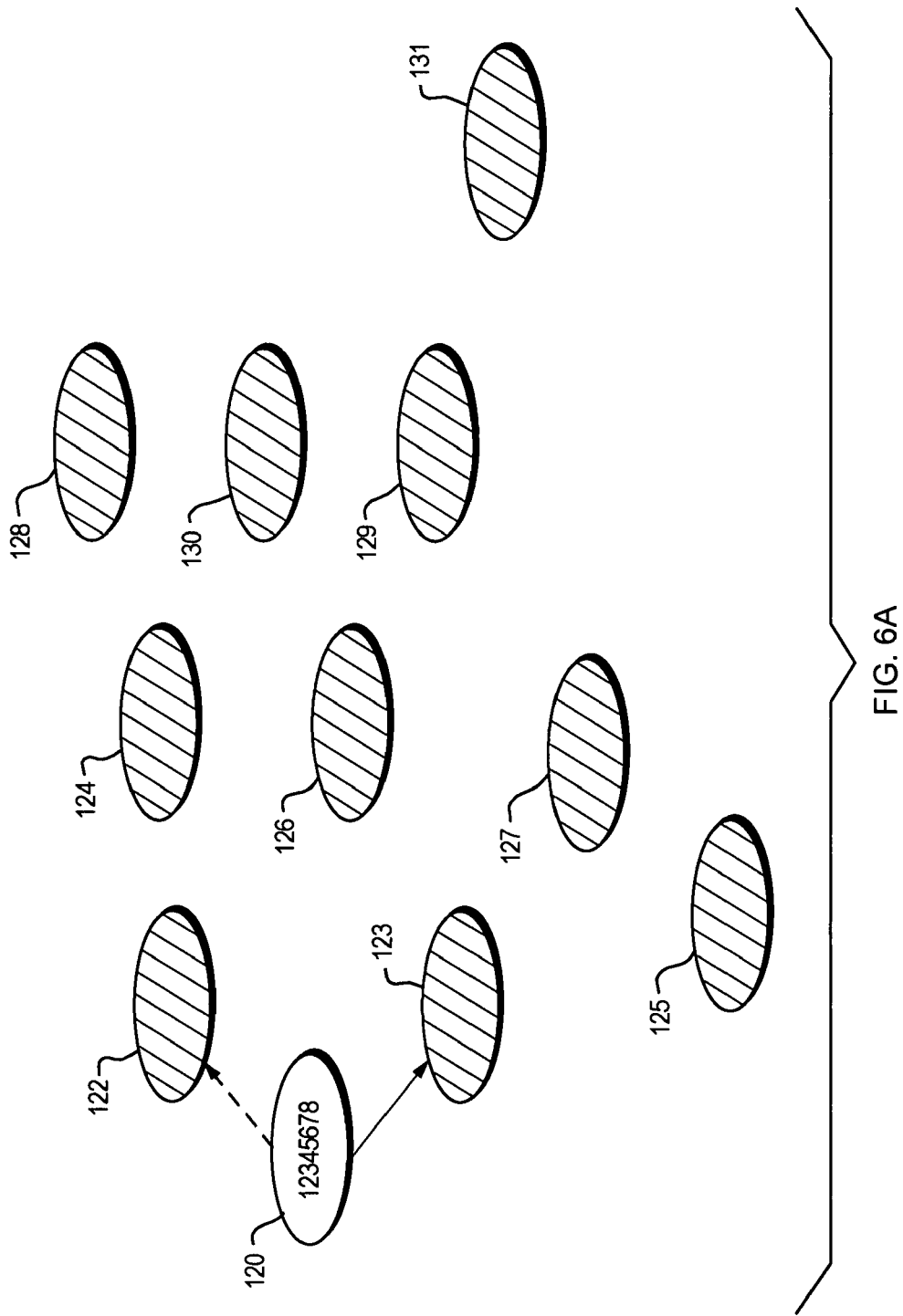

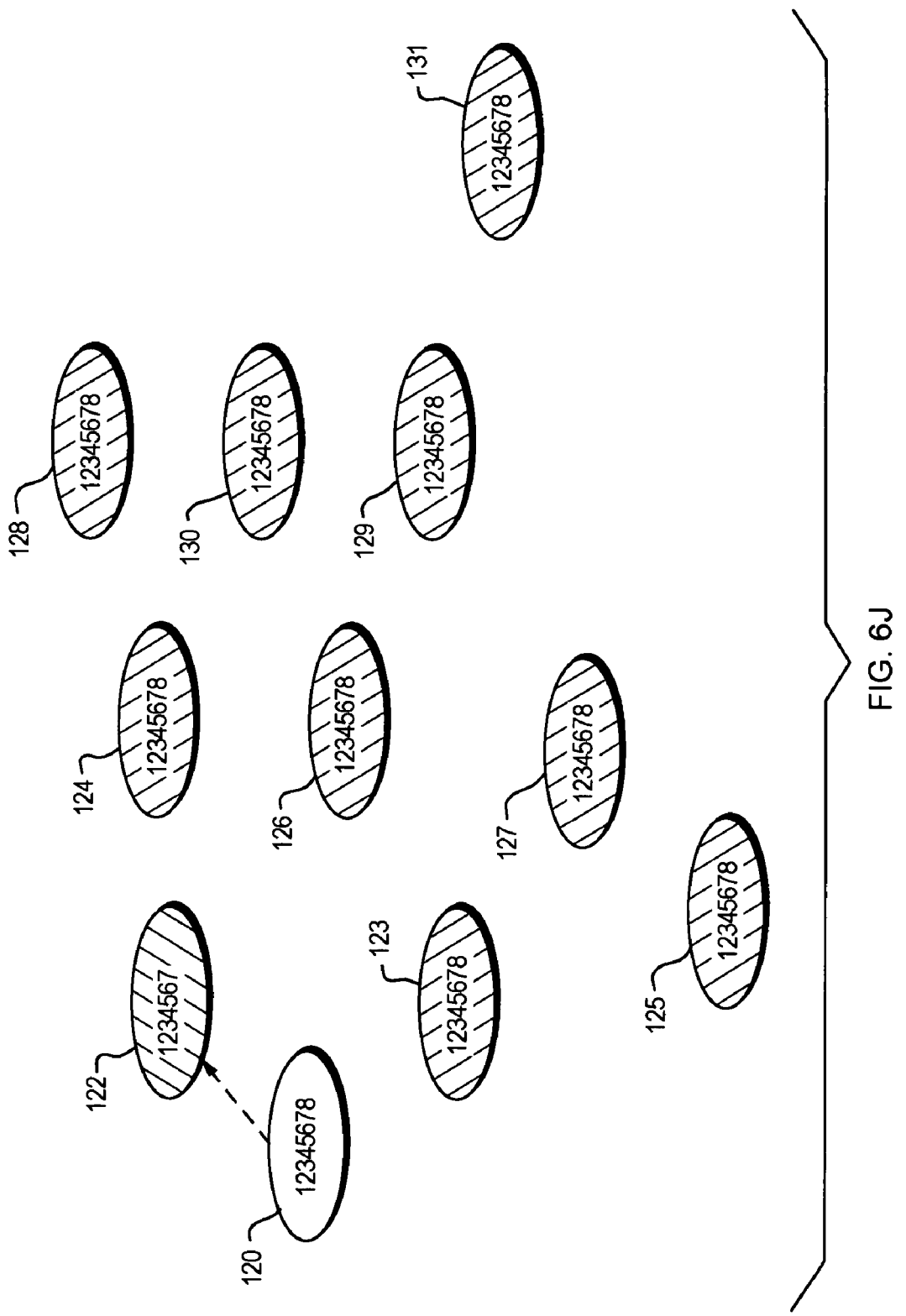

TRAFFIC INFORMATION SYSTEM FOR VEHICLES USING WIRELESS PEER TO PEER (P2P) CONNECTIONS

The present application is a divisional of, and claims priority to, U.S. patent application Ser. No. 11/287,753, filed on Nov. 28, 2005, now U.S. Pat. No. 7,349,983, which is a divisional of, and claims priority to, U.S. patent application Ser. No. 09/967,600, filed on Sep. 28, 2001, now U.S. Pat. No. 7,065,548.

BACKGROUND OF THE INVENTION

The invention relates to a device for either generating or maintaining an organic network having a dynamic topology, a method for it and a carrier provided with software for it.

It is known for instance from U.S. Pat. No. 6,052,718, to duplicate a server in an internet environment to relieve the main server. In those cases however the entire server software and complete files of the server are duplicated. This first of all is too large a burden for the duplicate. Additionally not any given computer will be suitable for that purpose, let alone any given computer requesting information to the server (the "client"). Additionally it is not possible to offer a client an optimal transfer speed of the content in this way by an intelligent choice of the route or possibly another, closer (regarding the transfer speed) (duplicate) server.

Additionally it is known from U.S. Pat. No. 5,944,783 to provide data packages with software (Java Applets) with which the content of the data packages or other data can be processed on the receiving computer. In this case, however, there is no question of communication, but of distributed processing. One large task is divided over several agents, wherein each agent carries out a part of the task and is in contact with the common server.

Additionally a network ("multicast network") of nodes is known from U.S. Pat. No. 5,511,167 which nodes, however, are each part of a hierarchic system. Each node is centrally controlled here by means of a central node.

In Onn Shehory et al., Agent Cloning: an Approach to Agent Mobility and Resource Allocation, IEEE Communications Magazine, July 1998, a multi-agent system is described comprising agents which can duplicate themselves on remote computers when overload of the agent occurs. The duplicate agent is hierarchically placed below the original agent. This requires an overhead structure. An agent is sent out to perform a task, and reports back to its origin.

In U.S. Pat. No. 6,085,240 a system of agents is described. The agent devices are managed by an overlaying structure. Thus, the system requires an overhead structure.

SUMMARY OF THE INVENTION

It is an object of the invention to at least partially remove the drawbacks mentioned explicitly or implicitly.

To that end the invention provides a device for either generating or maintaining an organic data network having a dynamic topology, comprising
a data processing unit,
at least one data connection to a data network to which several devices provided with a data processing unit are connected by means of a data connection, and
software having
a receiving routine for receiving data packages of at least one transmitting device in the data network,
a transmission routine for transmitting data packages, received from the transmitting device or devices in the data network to at least one receiving device that is connected to the data network, independent of the transmitting device or devices.

By choosing such a device an organic data network can be built up or created in which independent devices according to the invention are able to provide other independent devices according to the invention with data so that for instance data that are available to a network are quickly accessible to any given device in a network.

Additionally it is possible to build up a data network without hierarchy, in contrast to the classic networks and the internet. After all, when a server fails or gets overloaded very many computers drop out of the network. It is possible therefore, using a device according to the invention, to build or maintain a network having a very low failure sensitivity.

Additionally it is possible to set up a reliable "streaming" video or audio broadcast via the internet or another similarly organised network.

For that matter numerous applications of so-called peer-to-peer networks that may or may not have client/server technology are known.

However, an organic network having a dynamic topology wherein data transfer between server and client takes place like in the device according to the invention, is not described in them. In conformity with the device according to the invention it is namely possible that the same peer at one moment acts as server having a second peer as client and at another moment acts as client of the second peer now acting as server, without a control being at the basis thereof. The two devices change role on their own initiative.

Content as meant in the present invention relates to the data such as music in digital form, converted images in digital form, data base information, simple ascii data, but all other possible data as well. This is the information that has to be distributed to as many devices as possible when the request such. For instance in internet terms, streaming video or streaming audio can be thought of. In this case the quality of a data connection is particularly important. Content namely is generally divided into smaller data packages, that are subsequently transmitted. In case of a streaming audio or video application the sequential order of several data packages is of importance because en route delaying during the transmission of a data package results in an irregular broadcast.

A data processing unit according to the invention first of all relates to a digital data processing unit, or a central processing unit, CPU, having ALU, a calculation unit, such as known from the so-called PC or other similar computers. In a broader sense processors can be thought of that may among others be placed in mobile phones and other equipment for the (electronic) control of internal processes.

A data storage unit as meant according to the invention may be a generally known computer memory (RAM), but also a hard disk or another dynamic data storage medium.

According to the invention a data network does not only mean a physically cabled network; it may also comprise a series of data connections that use electromagnetic waves that propagate through the air or an optical cable. Combinations are also possible. A physically cabled network may also comprise a data network that uses cabling for conducting current (power voltage). In this text a data network is also called network for short.

In this text by a connection first of all a physical connection is meant, for instance a cable, optical cable, electricity cable, or any possible physical connection over which data packages can be transmitted in electromagnetic form. By connection (sometimes called data connection) is also meant a wireless connection, such as via infrared or radio waves or otherwise.

Preferably the software is provided with a transmission routine for transmitting the software together with the data packages independent of the transmitting device. In this way a new device can quickly be added in the network.

In an embodiment, the software is provided with a test routine for testing connections with other devices in the data network.

Additionally, in the same or another embodiment in a device according to the invention the software is provided with a transmission routine for transmitting data packages to receiving devices in the data network devices other than the transmitting and receiving devices in the network ordering to that end.

In the same or another embodiment of the invention, the software comprises a conversion routine for either converting or transforming the data packages.

In the same or another embodiment of the invention, the software is provided with an evaluation routine for evaluating the quality of the data connections.

In the same or another embodiment of the invention, the software is further provided with an inventory routine for making an inventory of at least a number of the other devices in the data network, and trying out the connection to another device in the data network for transmitting and/or receiving when existing connections are broken off or come below a threshold value.

In the same or another embodiment of the invention, the device is provided with a memory for storing a data network address of at least one other device in the data network.

In the same or another embodiment of the invention, the software is provided with a decision routine which on the basis of predetermined criteria decide to make a new connection to either an additional device or another transmitting device.

In the same or another embodiment of the invention, the device is provided with an environmental evaluation routine for asking for addresses of devices that are connected to the transmitting and/or receiving devices. In this way a device can operate even better autonomously in the network and change the topology.

Additionally the invention relates to software, suitable for a device described above. Said software may for instance be placed on a data carrier such as, by way of example, a CD, DVD, optomagnetic disk, tape, but also in an IC such as a PROM, EPROM, or directly on a produced IC.

The invention moreover relates to a method for setting up and maintaining an organic data network, of which the nodes are provided with a data processing unit and software having a receiving routine for receiving data packages of at least one transmitting device in the data network, a transmission routine for transmitting data packages, received from the transmitting device or devices in the data network to at least one receiving device that is connected to the data network, independent of the transmitting device or devices, wherein the software either receives content, split up in data packages, from one or more transmitting devices, or retrieves content from the device itself and either delivers or passes on the content, which may or may not be in the form of data packages, to one or more receiving devices, independent of the transmitting devices.

In this way an organic network as described can be set up and maintained.

In the same or another embodiment of the method according to the invention, the method according to the invention that the software, when the quality of a connection with the transmitting device deteriorates or appears to be insufficient, asks for addresses of other devices from the transmitting and receiving devices connected to the device, contacts at least one of said other devices, tests the quality of the connection to one or more other devices, and subject to satisfactory performance of one or more of those connections effects a connection to suitable other devices and adds it to the device as transmitting devices, and repeats the asking until the total receipt of data packages complies with a predetermined criterion.

In the same or another embodiment of the method according to the invention, the method according to the invention the software breaks off a connection to a transmitting device when the quality is lower than a predetermined criterion.

Additionally the invention particularly relates to mobile communication equipment, a media player, communication equipment, or traffic information system comprising a device according to the invention. Conventional telephones as well may be provided with such a device according to the invention. Furthermore, satelite communication, and especially inter-satelite communication, may also comprise a device, method or software according to the present invention.

In this case by mobile communication equipment are among others meant mobile phones, walkie-talkies, satellite telephones, pocket computers, PDAs, game computers, that may or may not be portable and wherein a game can be played wireless with a game computer, and the like.

By a media player is meant a television, radio or playback equipment for prerecorded music or films, but also personal computers that are suitable to that end.

By a traffic information system is for instance meant a route navigation system for cars, that may or may not be provided with GPS, trains, planes, boats, but also systems that provide vehicles with information, such as car radios and any other possible system, among others radar.

The invention additionally relates to software for either generating or maintaining an organic data network having a dynamic topology, comprising a receiving routine for receiving data packages of various transmitters, a transmission routine for transmitting data packages to various receivers, a management routine for keeping up the data packages received, data packages transmitted, addresses of transmitters and receivers of data packages, an evaluation routine for evaluating the quantity, time intervals and quality of the incoming flow of data packages, a search routine for searching new potential transmitters via transmitters and receivers, a test routine for testing the quality of data connections to new potential transmitters, and a decision routine for deciding to set up connections to new transmitters and closing down connections to transmitters.

A possible device according to the invention is a consumer node that will be discussed below. The device according to the invention is not limited to that however.

In an organic data network that can be built up and maintained by means of a device according to the invention, various types of nodes can be distinguished. Not all these types of nodes are essential to the activity of the data network. Preferably a node is adapted such that the node can change type by means of the software, or may even be several types at the same time. The latter being preferred in view of achieving a maximum flexibility of the organic network.

The first node is a node transmitting content to other nodes when they request such. Such a node is further called production node.

Additionally a number of portal nodes may be defined. These are nodes that keep up a list of nodes in the network and are able to insert a node to be newly inserted into the data network. Said nodes are not of essential importance to an organic network according to the invention.

Central in the network are the consumer nodes. Said nodes are provided with software to receive content and to deliver it to other nodes requesting such independent of the source. Additionally the software may be provided with routines to test the quality of a data connection and to keep up to date with the location of a number of other nodes in the network. The consumer nodes may preferably generate content themselves as well, and in that way obtain either a part, or the entire functionality of the production nodes.

Finally so-called router nodes may be present. Such nodes do nothing else but receiving and sending on content to other nodes in the network by order of production nodes or consumer nodes.

As already discussed before, a node ensures the availability of content for anyone (client) requesting said content. An organic network may expand or start in the following manner. When a first client requests (a part of) the content from a production node, the production node will deliver the content, but at the same time send along the software as a result of which the first client changes into a first consumer node. When a second client now contacts the production node, the production node will, when the second client is not yet provided with software to act like a device according to the invention, send the necessary software, or refer the new client to an existing consumer node to that end, for instance the first consumer node. The second client then also becomes second consumer node and will if necessary search for a better connection. When the connection to the first consumer node is faster than the connection to the production node, the second consumer node can, if so desired, (entirely or partially) connect to the first consumer node, and the software according to the invention is also sent along as well, as a result of which said client changes into a second consumer node. Said second consumer node may get its content from either the production node, or from the first consumer node, whichever data connection it judges as being the better one. Special however is that the consumer node is able to act entirely autonomous and independent of the production node. Better yet, if so desired the consumer node is able to adapt the content, add content itself (for instance subtitling in a certain language in a streaming video content) or generate its own content, such as local advertising messages, or local news. As a result a consumer node simultaneously is a production node.

A new consumer node will generally be added to the network by initial contact with a production node or a portal node. Said nodes will enable the newcomer to connect to one, or preferably more existing consumer node or nodes (at a time). A new node might at its own initiative, entirely autonomously, go look for an even better connection. This process may be supported because the new node may get information from the nodes to which it is connected about nodes that they in turn are connected to. Said neighbor information may be used to improve the own connection or to have spare connections available in case of failures. Preferably there generally is no question of central control here, so that flexibility and failure sensitivity are reduced.

The nodes, if so desired, may itself, instead of or in addition to just passing on the content at request, add content or change content. For instance, local subtitling, advertising messages, conversion of file formats, adding securities, etc. The node then in fact simultaneously becomes a production node. A production node or consumer node may also add authenticity securities so that the receiving nodes know whether the content is reliable. The source of the content can do that as well, and each transmitting node can for instance check whether the content it delivers is indeed reliable. In this way a network is created having a high degree of reliability with regard to the authenticity of the content.

With a growing number of consumer nodes a data network is created. As said consumer nodes can deal with a request for content themselves, and may be are able to make a selection of an optimal connection (in the sense of reliability and/or transmission speed), and the node may be provided with further functionalities, the consumer node may also be called an intelligent node. The resulting data network has the characteristics of an organism, of which the various parts (nodes) are able to "live" independently. During data transfer, particularly during data transfer wherein the sequential order is of importance, such as for instance streaming audio and streaming video in internet applications, an optimal data connection is of great importance. Additionally the capacity of a server that provides content usually is only capable of serving a limited number of clients, while the organic network of the invention, in contrast, has a nearly unlimited capacity which grows with the number of users.

In the device according to the invention each consumer node with a certain overcapacity will be able to contribute to the increase of the total distribution capacity of the network when added to this network. The larger the network becomes, i.e. the more nodes, the more capacity will be available and the quicker the network potentially may become, without expansion of the capacity of the server, by using the device according to the invention. The device according to the invention uses the intrinsic overcapacity present in a network, for instance because most computers have a full-duplex data connection and only transmit or receive at certain moments. A production or consumer node having a limited transmission capacity can still transmit relatively much content over a network of many consumer nodes using its unused capacity. The unused receive or transmit capacity can be used by other nodes to obtain content or transmit it to other nodes. It may even be so that as the transmission capacity of the production node becomes smaller (to a certain extent: at least one receiver should of course be able to get sufficient content in), as a result of the mutual cooperation of the consumer nodes, the speed of the flow through the network will increase.

As already discussed a number of portal nodes may be defined that contain a list of the various consumer nodes that are operational and maybe various production nodes. A new client may instead of contacting a production node, contact a portal node, which from the list of consumer nodes selects the one who (as to data transfer speed) is the closest. Possibly the portal node may also (start with) transmitting software to install the new client as consumer node. The new client will subsequently connect to an existing consumer node and changes into a new consumer node.

In the process or data network described above, several types of nodes have been mentioned. Most of these nodes may also be defined by one base node.

One base node can be distinguished that has all functionalities, but of which several parts can be switched on or off depending on the functions of the node in the organic network according to the invention.

For instance every node has an input manager and an output manager, buffers, router logics, a local production connection manager, and a local consumer connection manager.

Below some examples are described wherein an organic network according to the invention can be deployed. Said examples are not limiting, but elucidate the invention. The expert will, on the basis of said examples, be able to think of many other embodiments that fall under the scope of protection of the claims.

Streaming Internet Applications

Streaming video and streaming audio are known internet applications in which data packages with contents are transmitted from a server or station to clients or consumers. The special thing about these data packages is that the time sequence of the various packages is of importance: a radio broadcast, for instance, has a fixed time line. Additionally the continuity of the data flow is of importance, as otherwise the broadcast will falter. The general principles of such streaming internet application are known to the expert.

A streaming video or audio broadcast via the internet or another data network may be implemented by means of the organic data network in the following manner by means of a device according to the invention.

First of all a so-called production node is installed. A production node is a device according to the invention the purpose of which is to make the content, either generated or present in the device itself, available to one or more other devices. Said content may be a streaming audio or video broadcast.

As soon as a computer, for instance through the internet, contacts the production node, the production node will start transmitting content, accompanied by software, for instance in the form of a "Java applet" or "Java bean", but also in the form of a so-called Windows "Cabinet file". The software subsequently installs itself on the computer and adjusts the computer as a so-called consumer node. As already discussed such a consumer node is capable of receiving content from a device, in this case a production node, and to deliver said content to another device when it requests such.

When for instance a second device presents itself to a production node with the question to also get content, the production node will transmit the software, when needed, to said second device or, when for instance all outgoing connection are occupied, inform the second device of the existence of the consumer node installed earlier on.

Either the production node sends software directly, or through the consumer node to make the second device act as consumer node to the second device, and the second device is installed as second consumer node. The second consumer node will test whether the connection to the production node or to the first consumer node is the best, and subsequently decide whether the content will have to come from either the production node, or via the first consumer node or from both. The first consumer node is able to deliver the content to the second consumer node entirely independent of the production node.

Should the second consumer node get a better connection to the production node, said direct contact will lead to the first consumer node deciding to get the content via the second consumer node. From this the dynamic topology appears that may be obtained: the node reverse their rolls.

The invention is further elucidated on the basis of several figures showing various aspects of the invention. It should be clear that said figures serve to elucidate the invention, and should not be seen as a limitation of the invention to the embodiments shown in them.

DESCRIPTION OF THE DRAWINGS

FIGS. 6A-6J show the transmission of content in several data packages by a network provided with nodes having devices according to the invention.

In FIGS. 7-11 it is shown what happens on the side of a production node, in FIGS. 12-15 it is shown what happens on the side of the consumer node.

DESCRIPTION OF EMBODIMENTS

Figure 1:
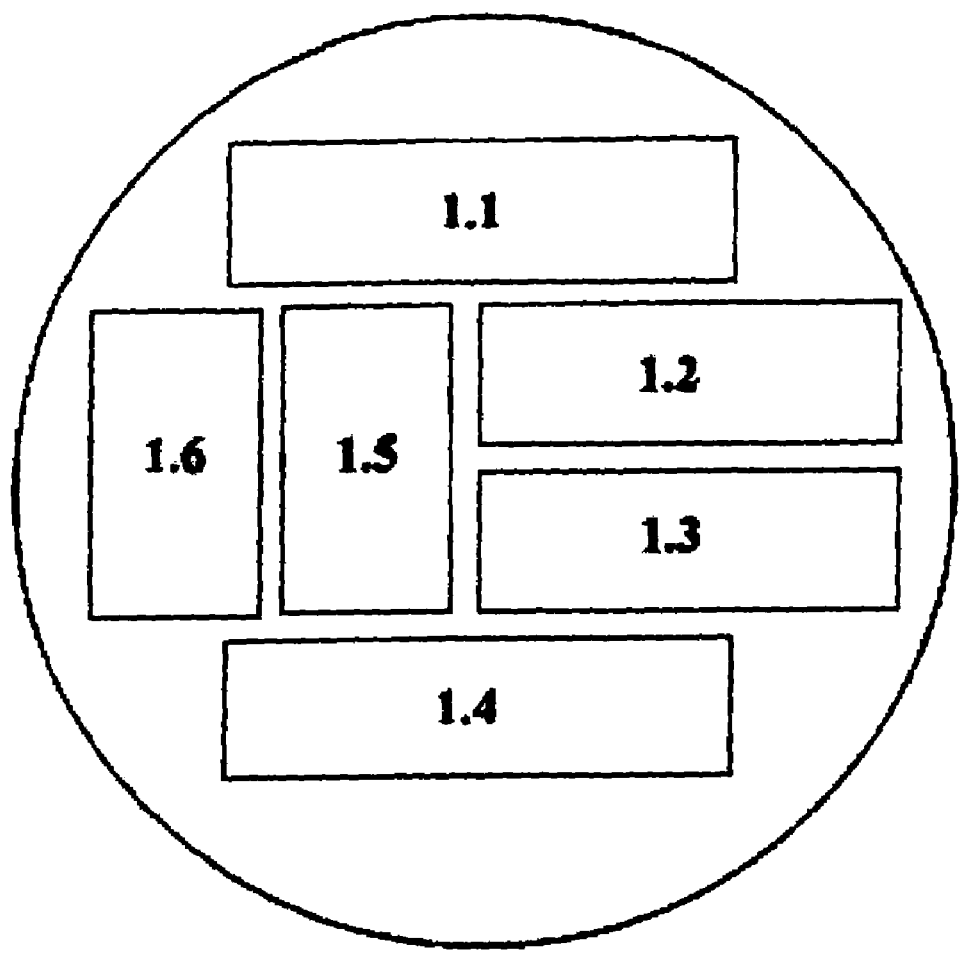
FIG. 1 shows a base node discussed earlier.

FIG. 1 show a base node 1.0 discussed earlier, that is provided with all functionality that make it possible to let the base node function as production node, consumer node, router node or portal node. By switching on or switching off the various functionalities the base node may function as one of the nodes mentioned, or even as a combination thereof or in several capacities acting alongside each other.

The base node is provided with an input manager 1.1 and an output manager 1.4. These routines in the software that regulate the incoming and outgoing content. Additionally the base node is provided with so-called router logics 1.5 to send on the contents received.

Additionally the base node is provided with one or more buffers 1.6 to store data for possibly sending it on further.

Finally the base node is provided with a local production manager 1.2 to make the content ready for transmission, and a local consumer manager 1.3 to make the incoming content ready for processing and possible play-back (in case of streaming audio or video).

Figure 2A:
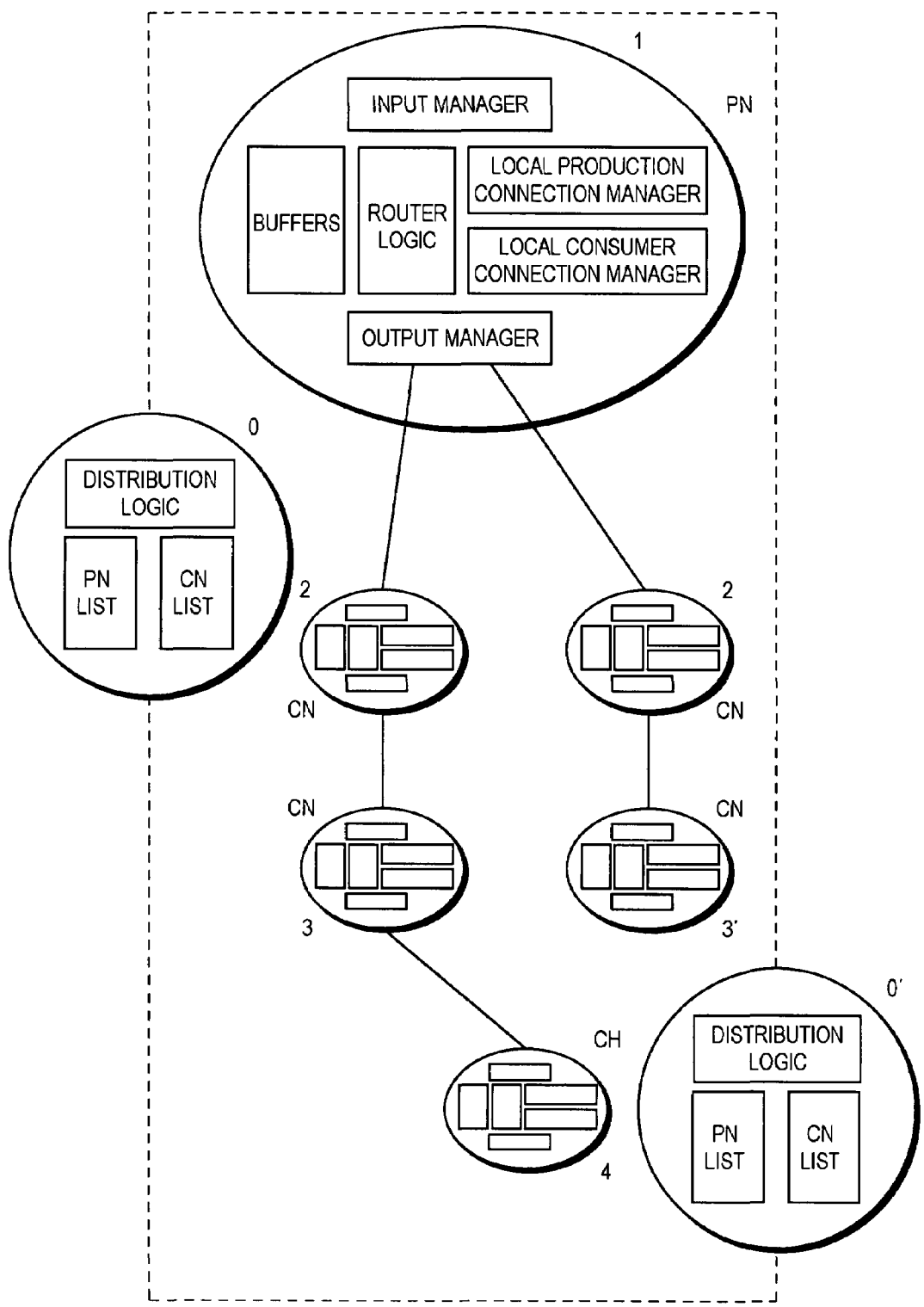
FIGS. 2A-2Q show various consecutive stages in the initiating and maintaining of an organic network according to the invention.
Figure 2B:
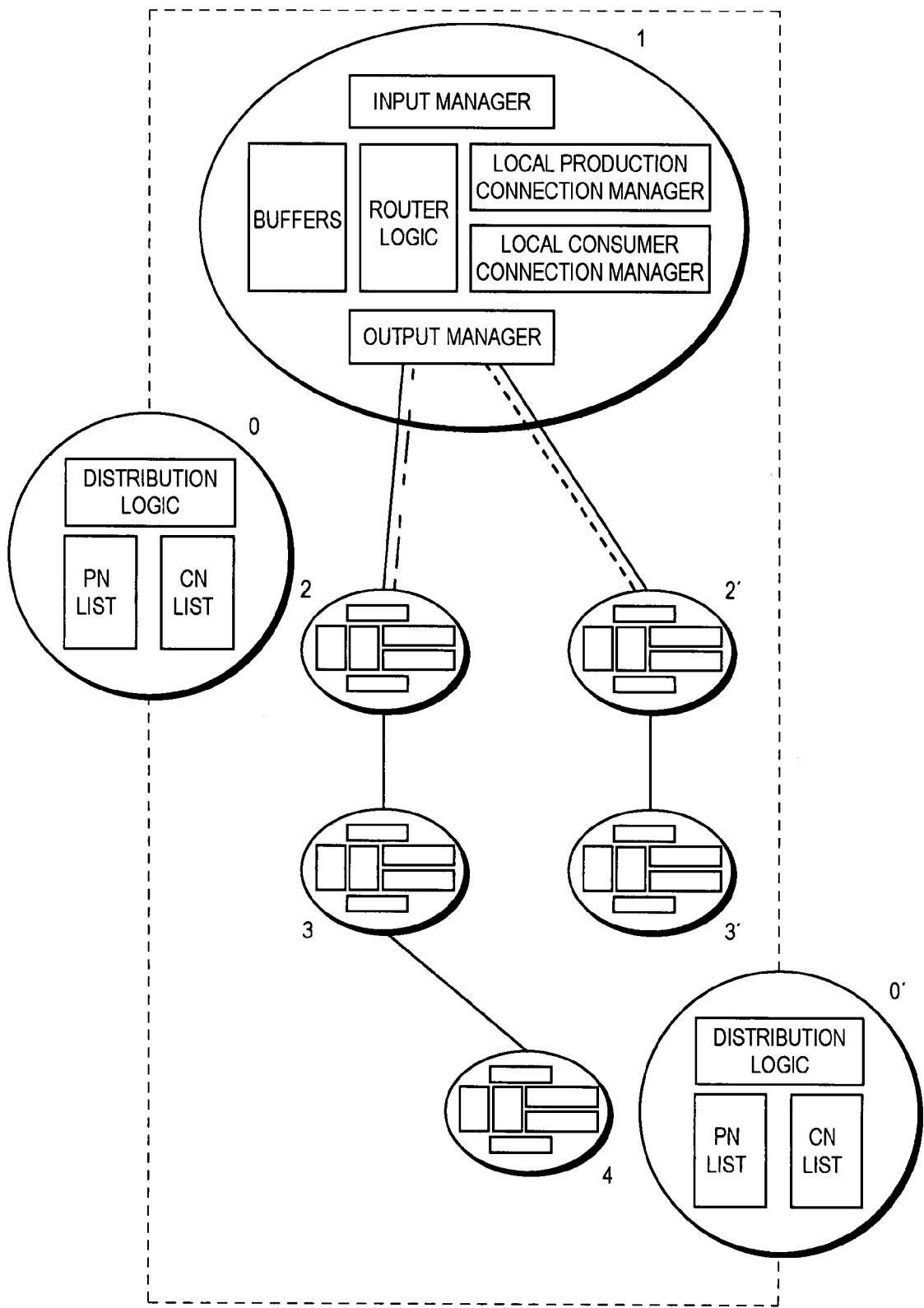
Figure 2C:
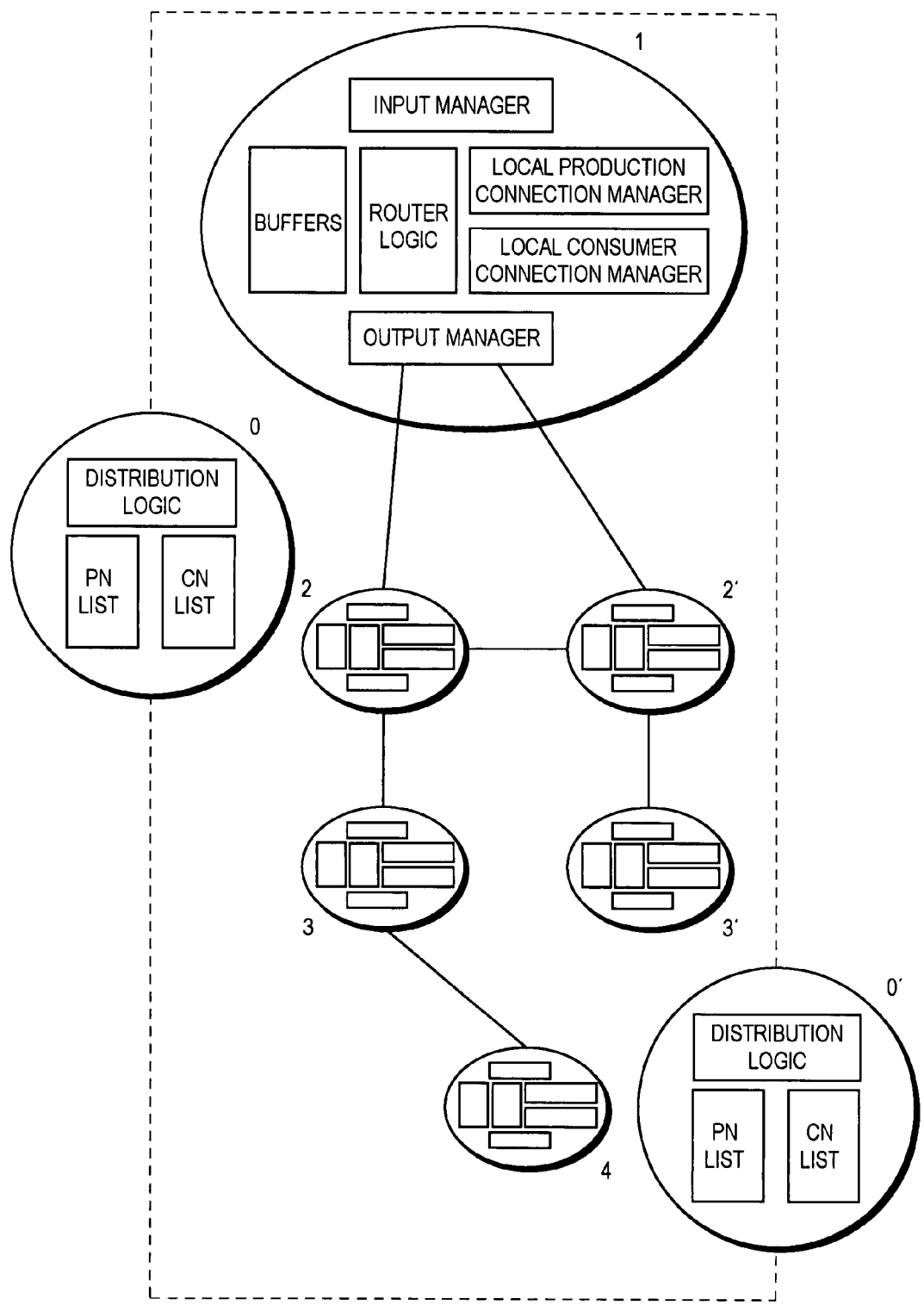
Figure 2D:
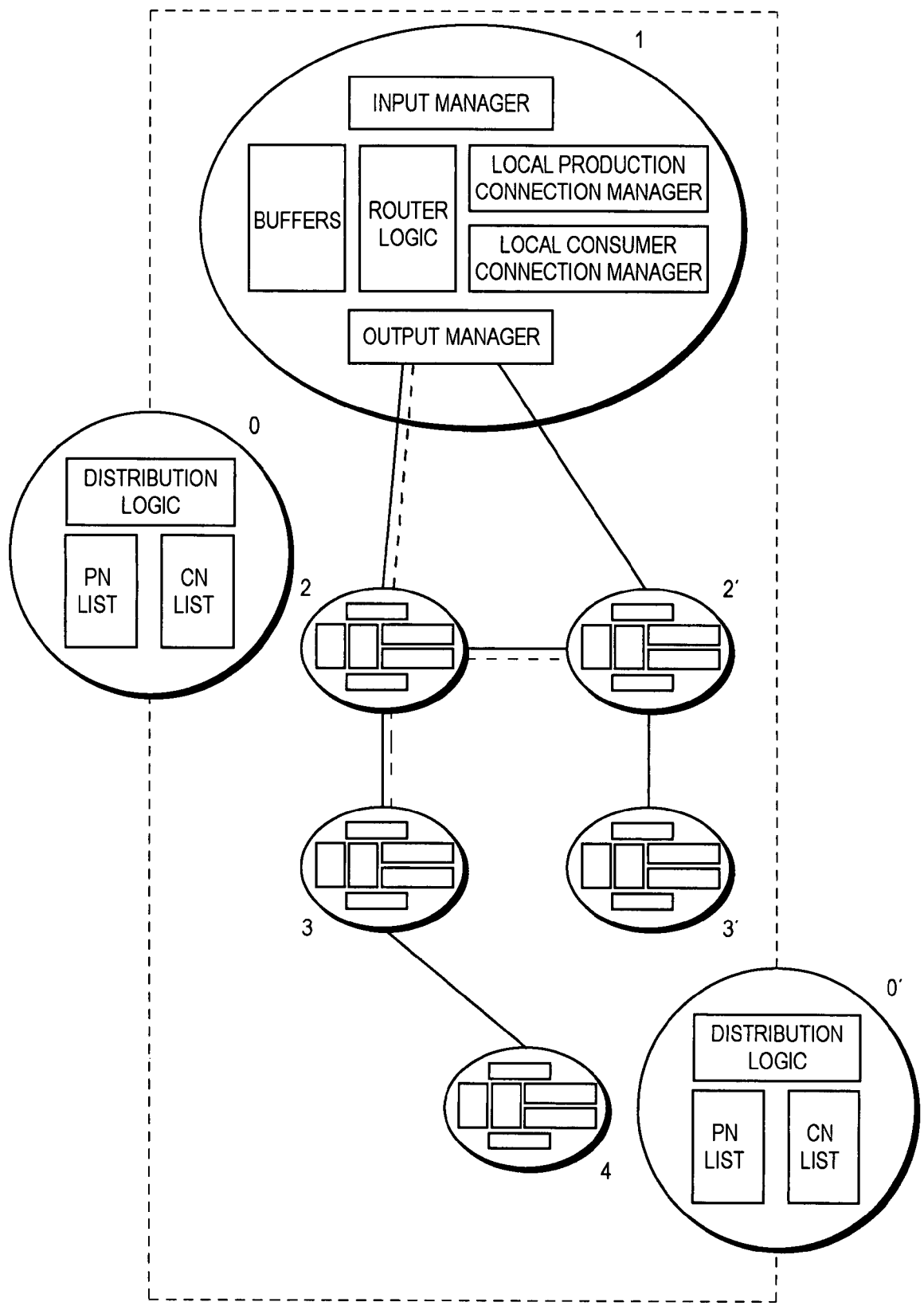
Figure 2E:
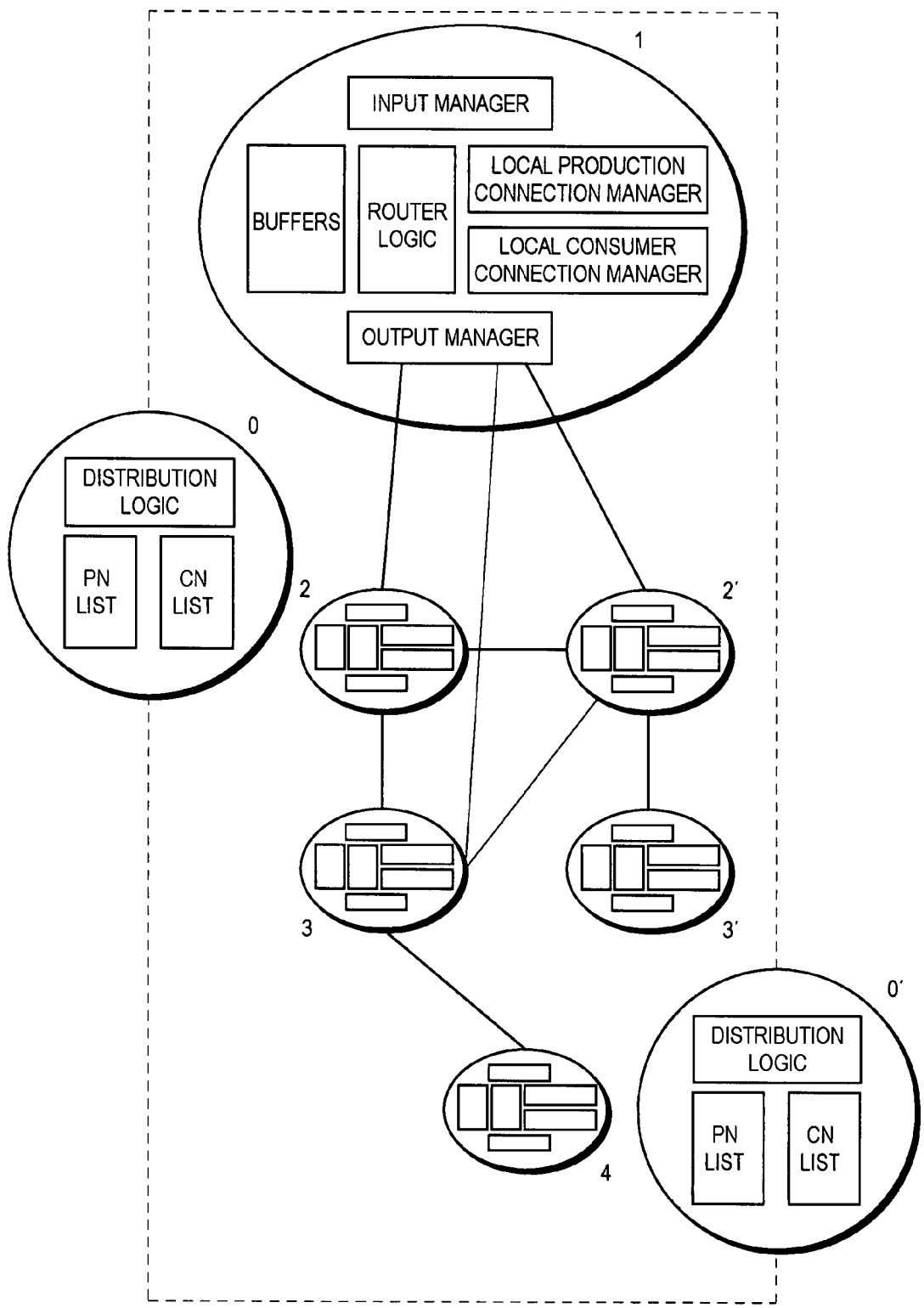
Figure 2F:
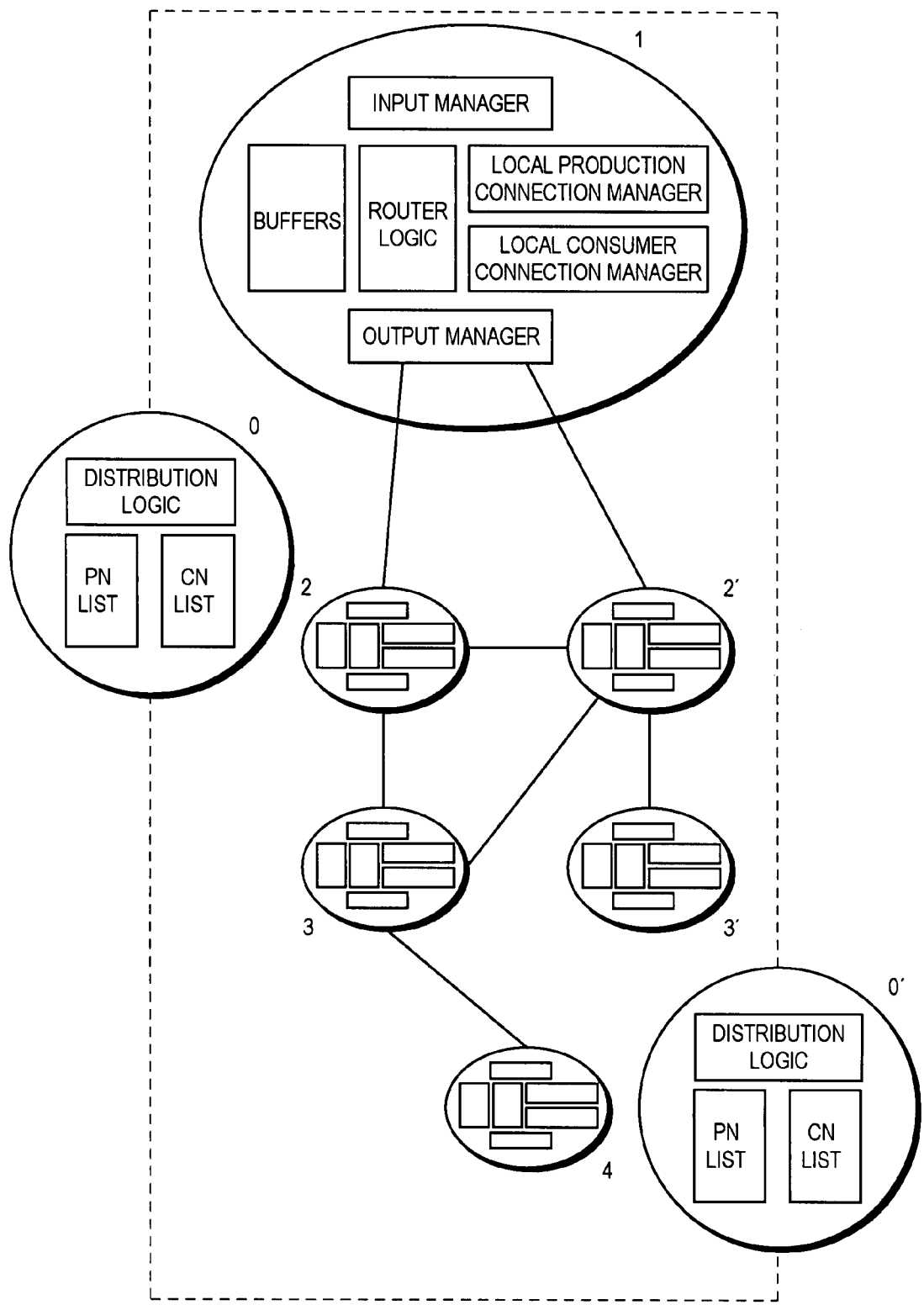
Figure 2G:
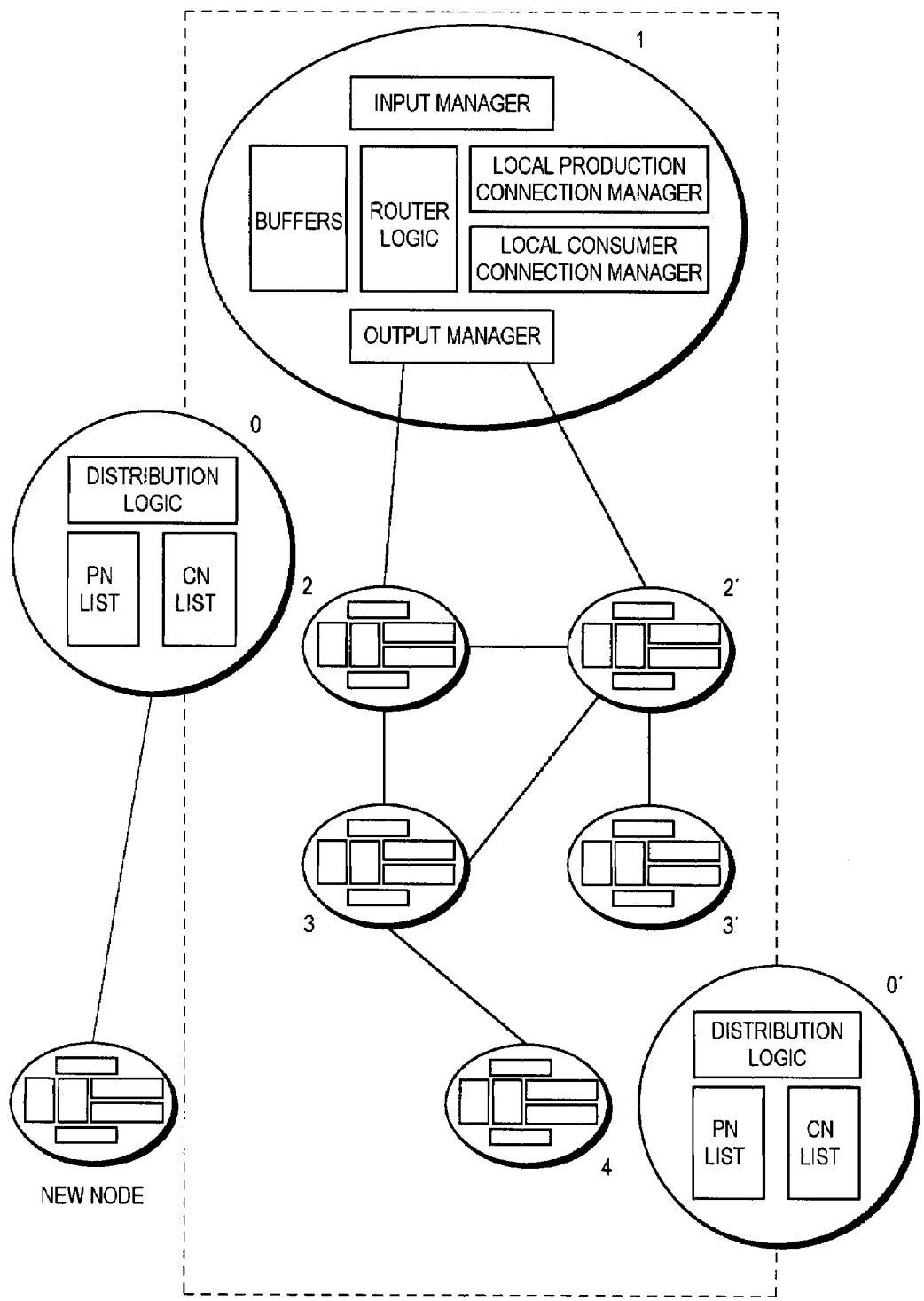
Figure 2H:
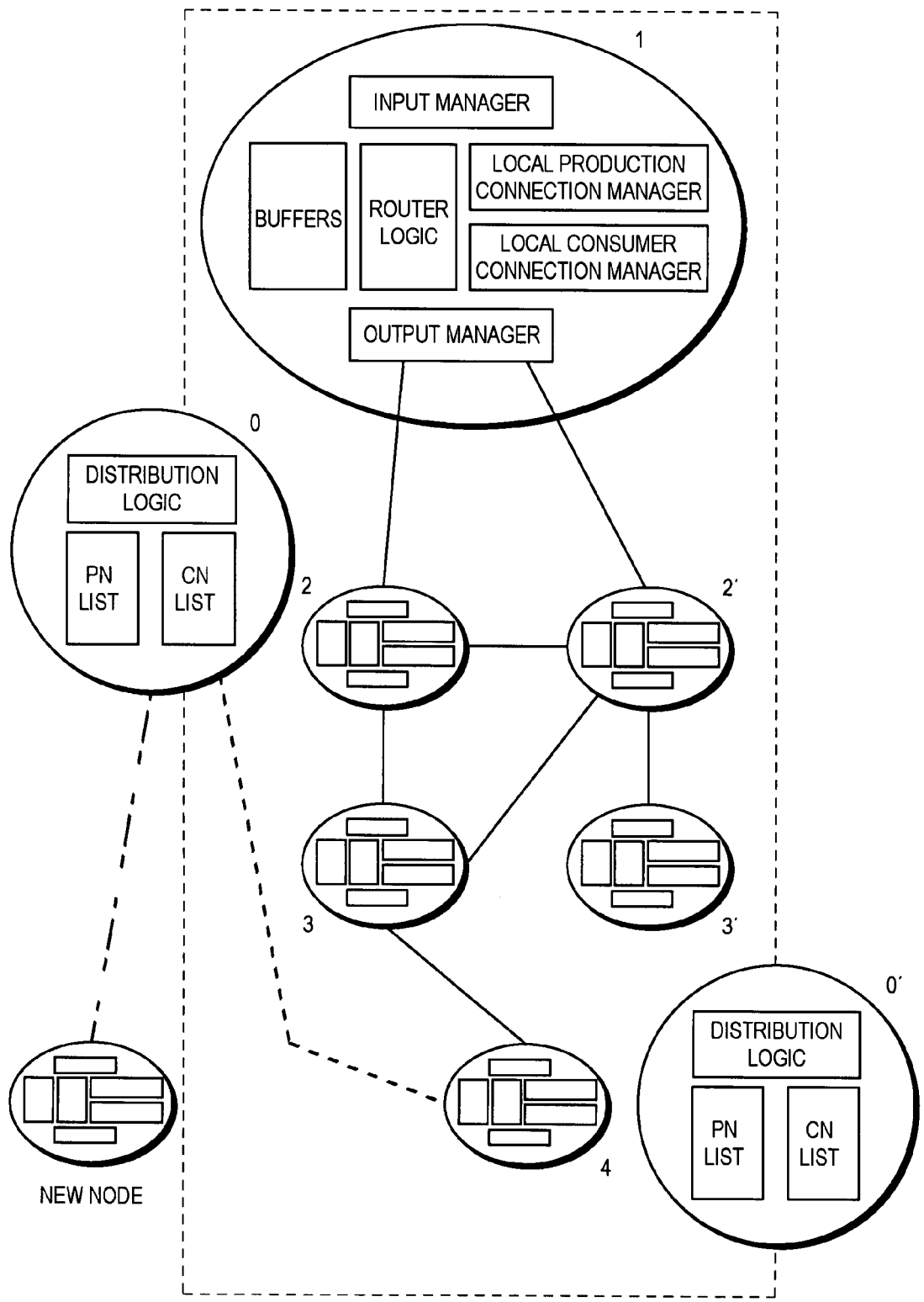
Figure 21:
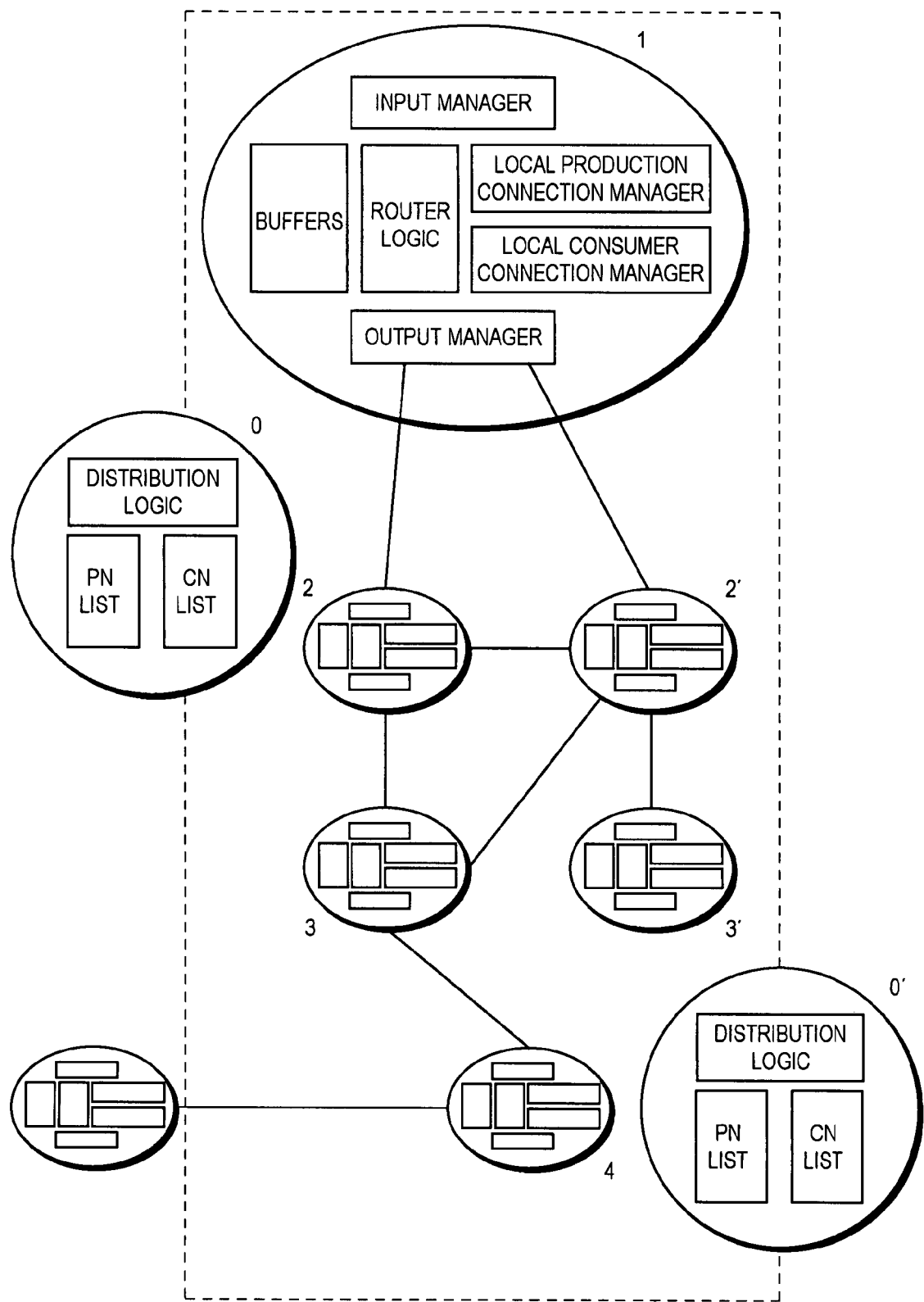
Figure 2J:
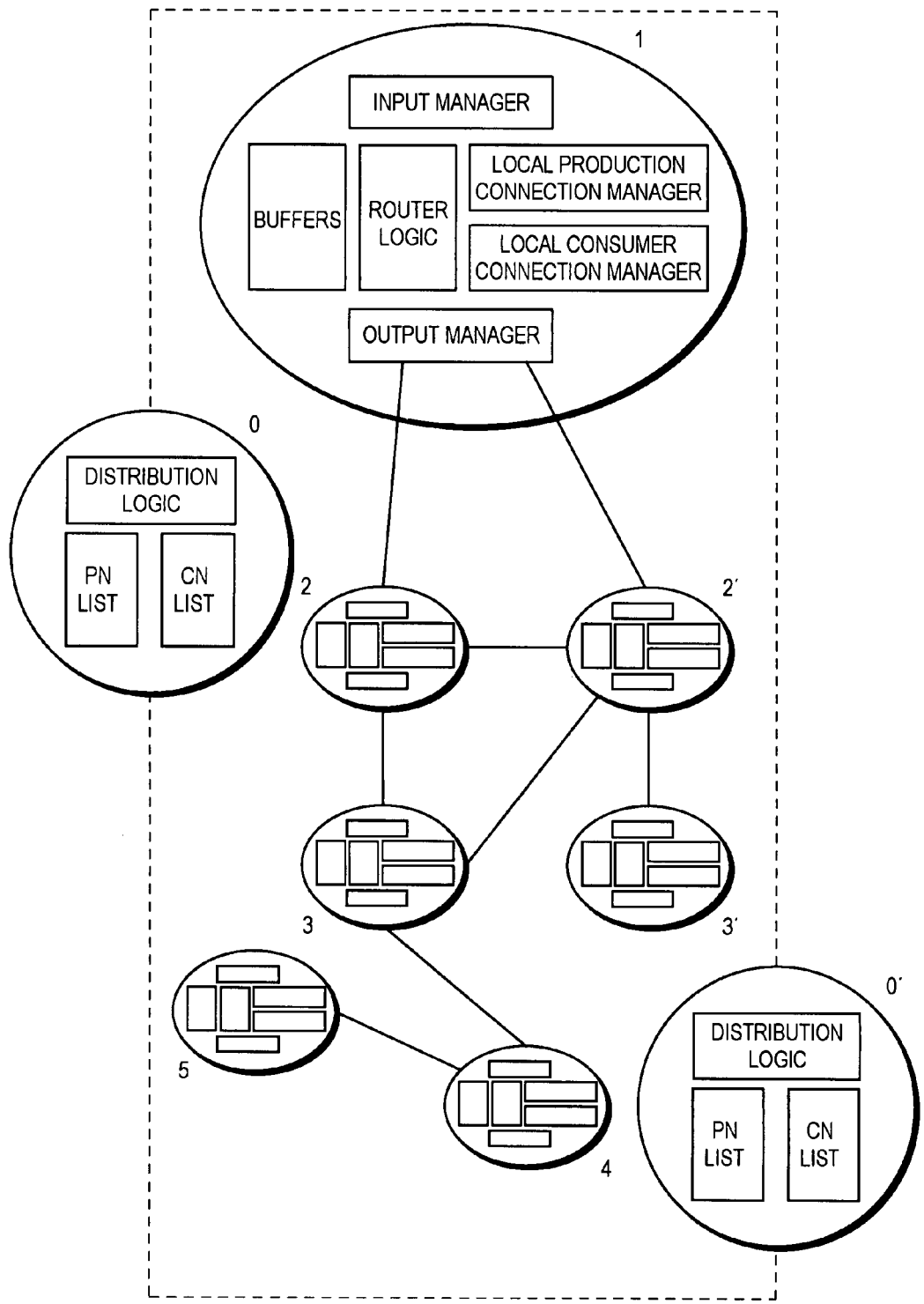
Figure 2K:
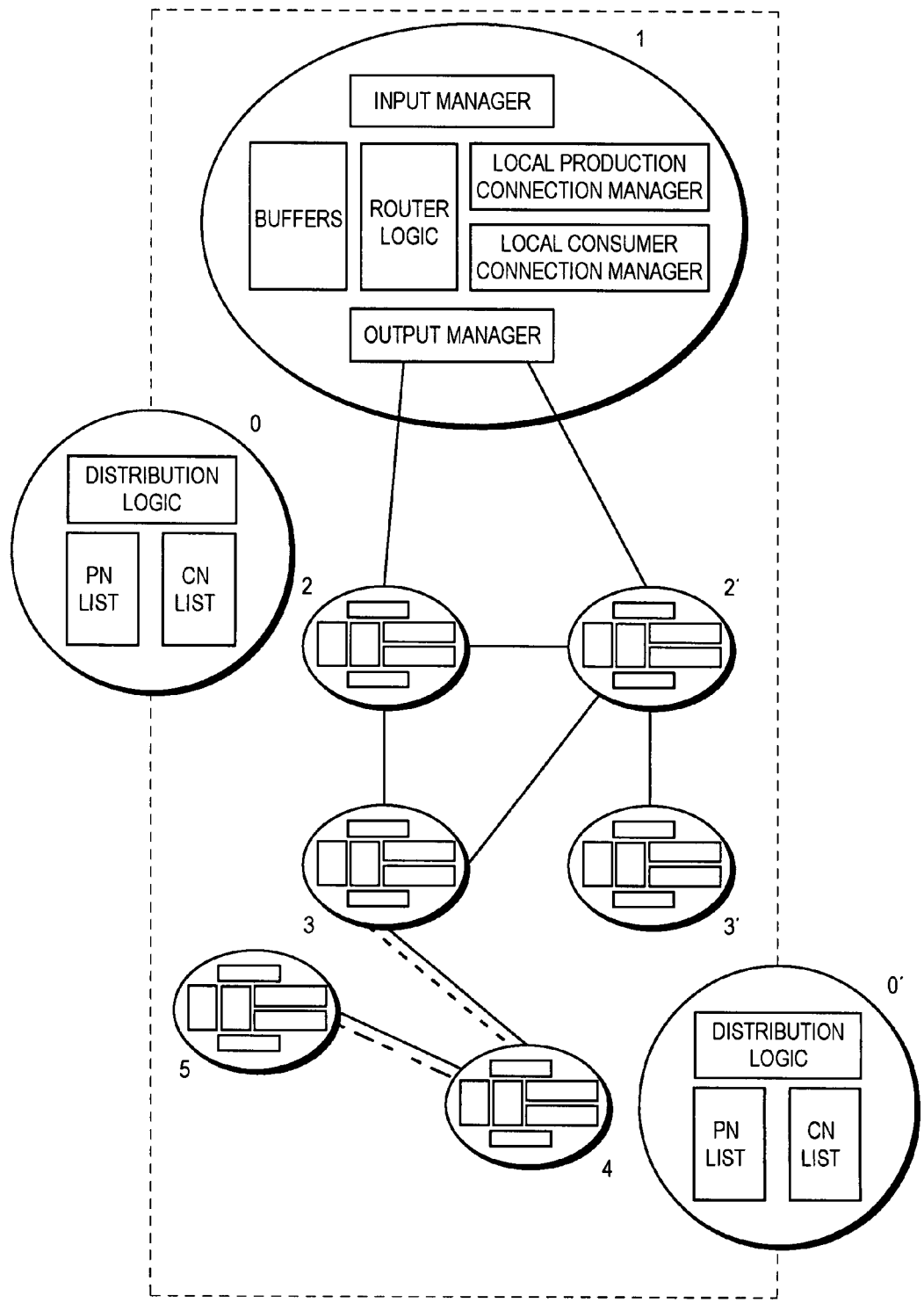
Figure 2L:
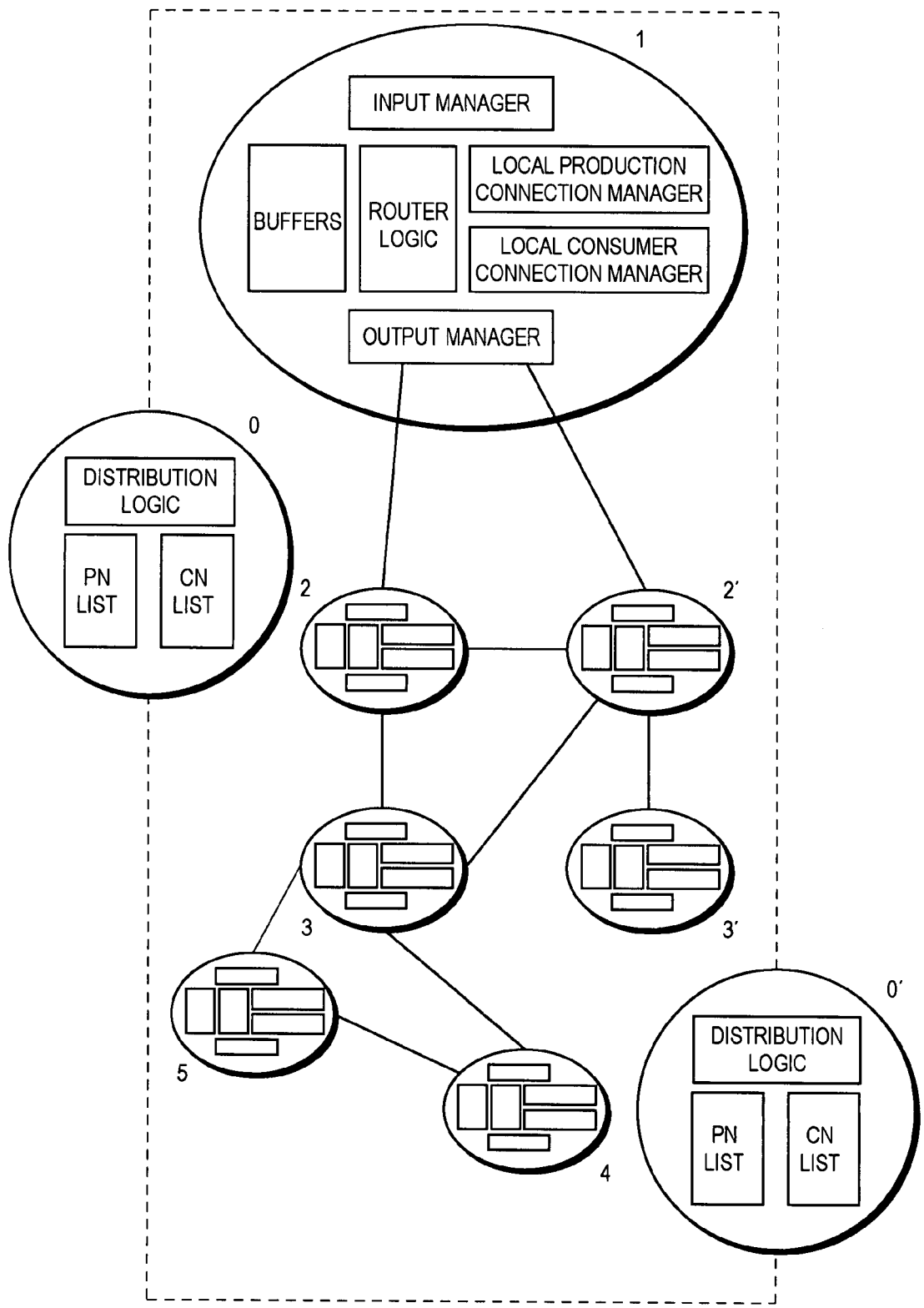
Figure 2M:
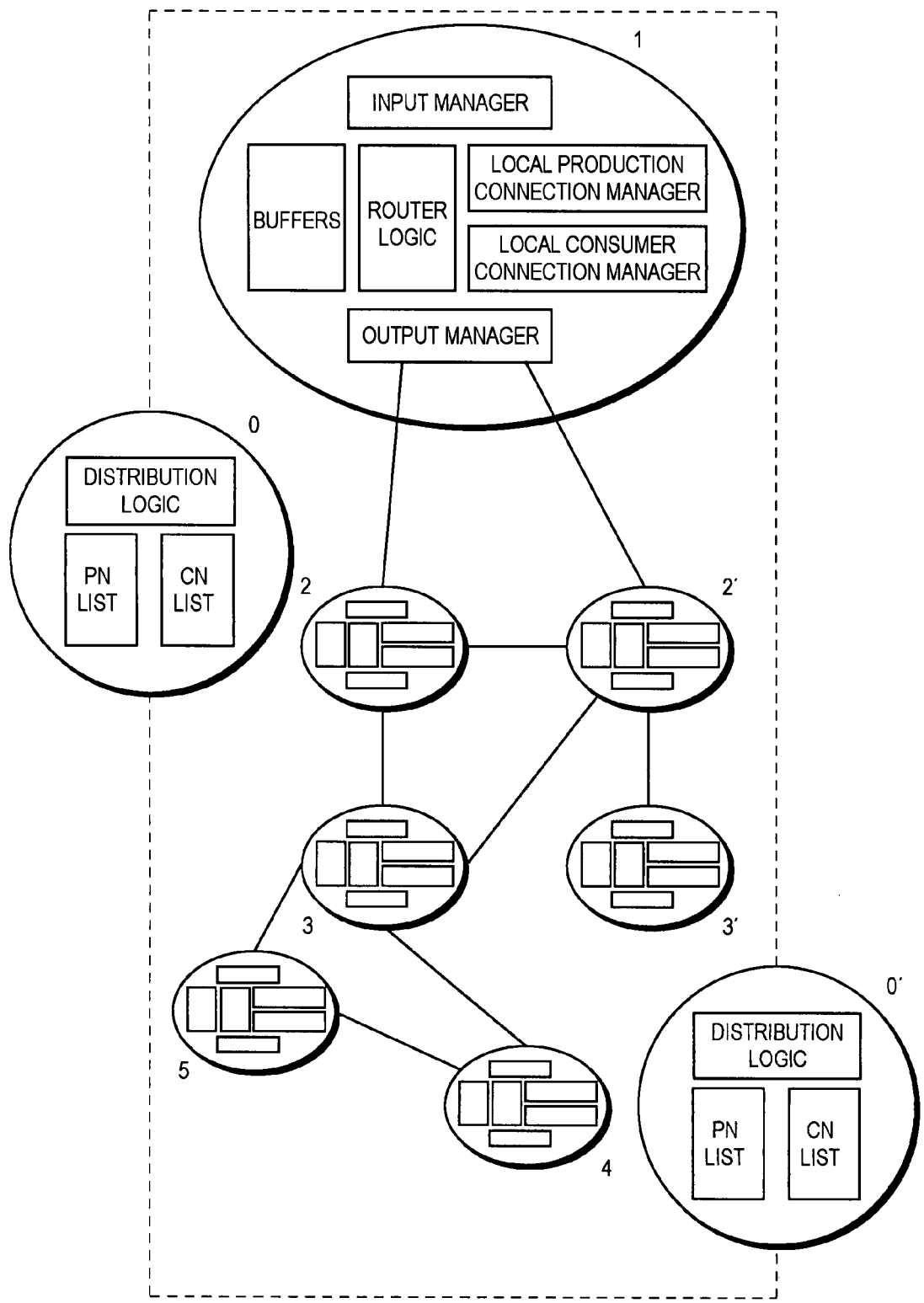
Figure 2N:
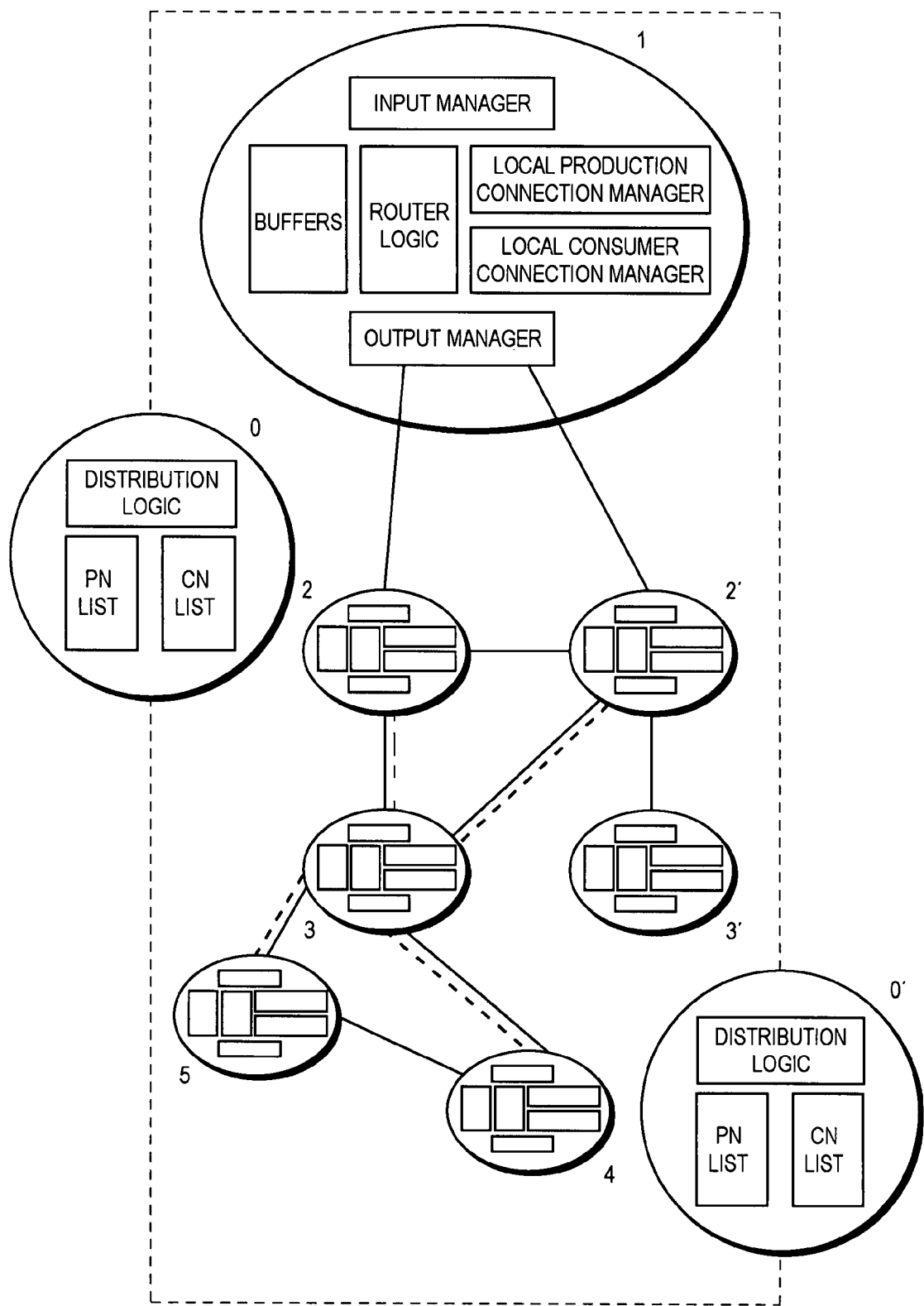
Figure 20:
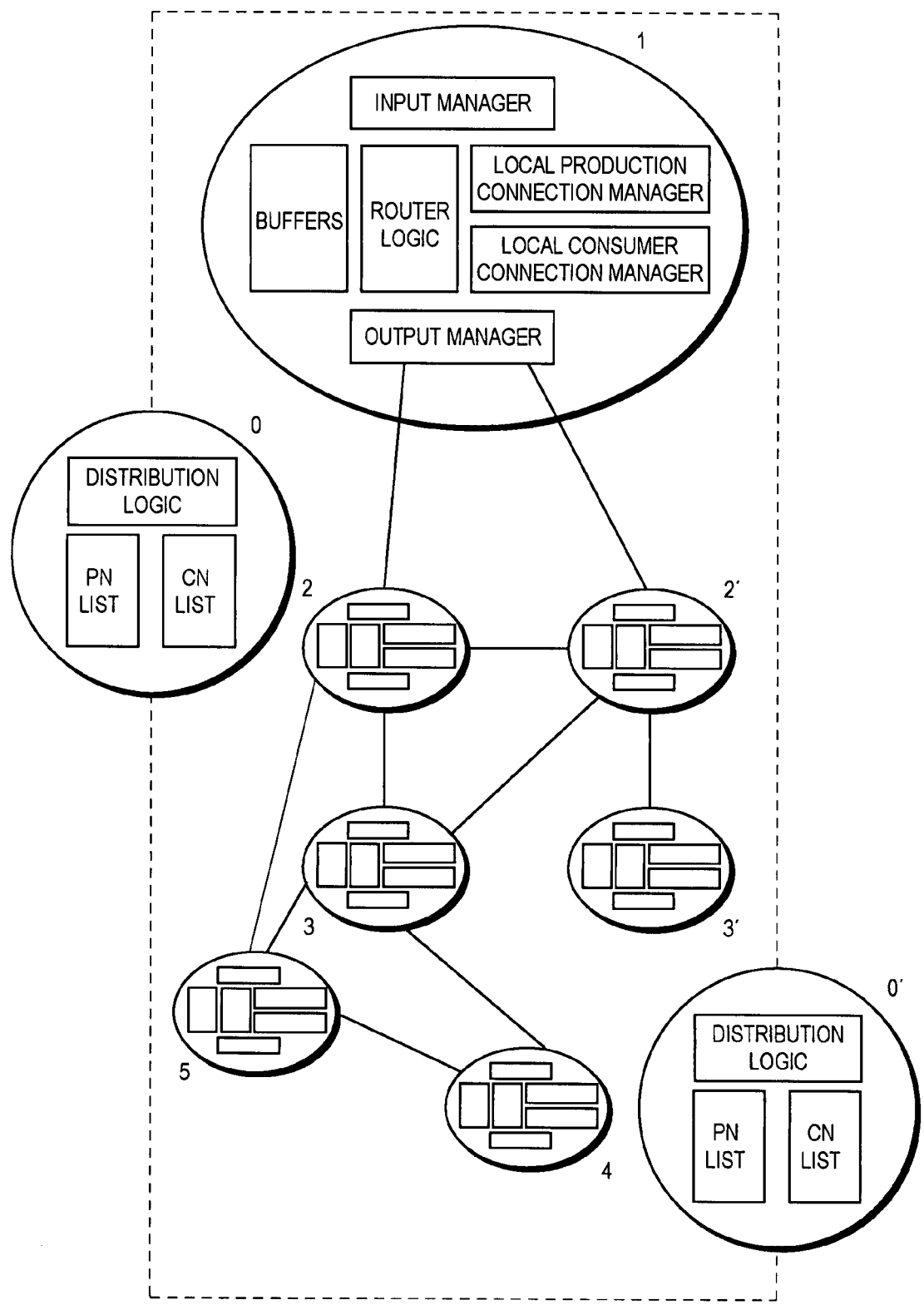
Figure 2P:
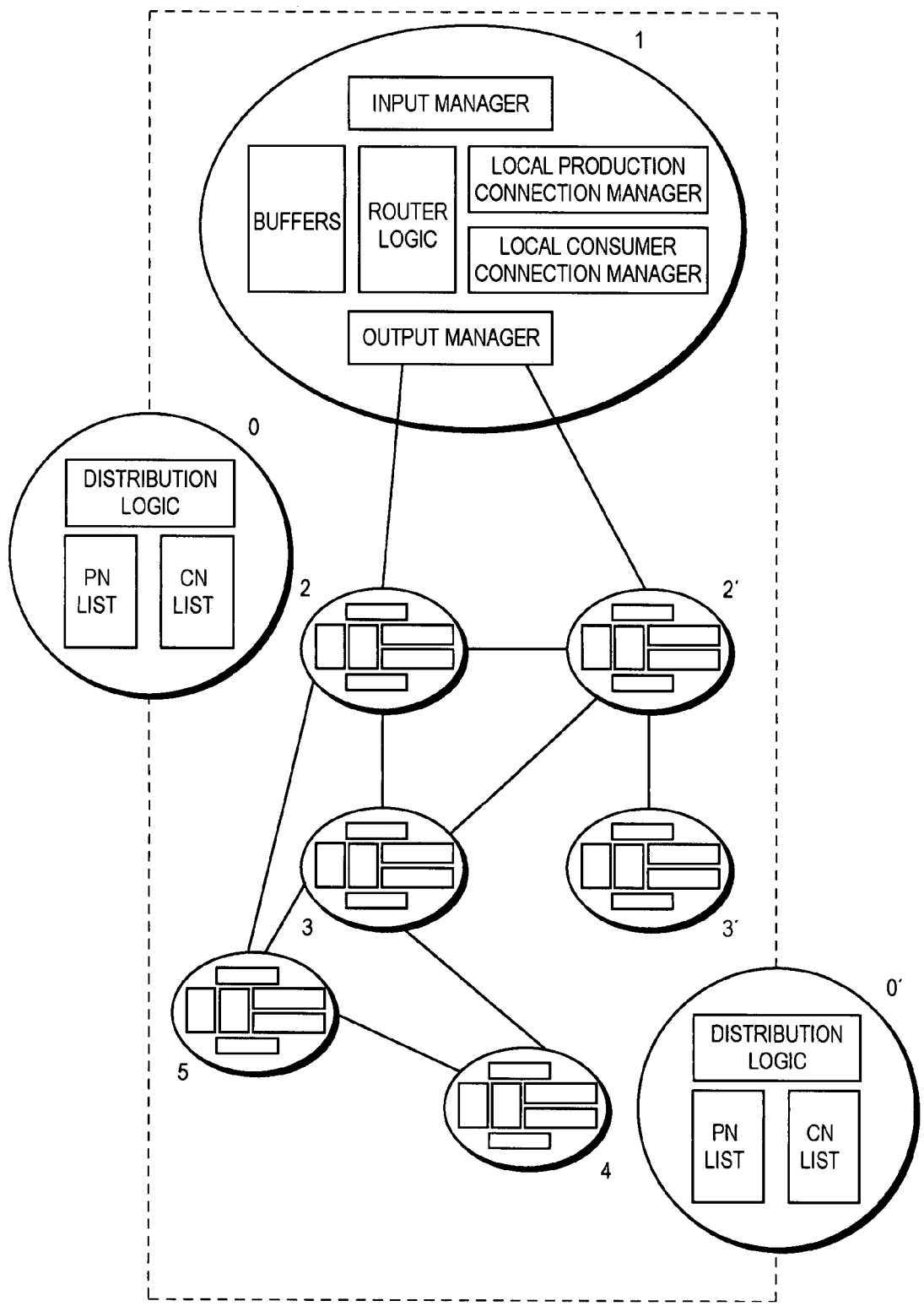
Figure 2Q:
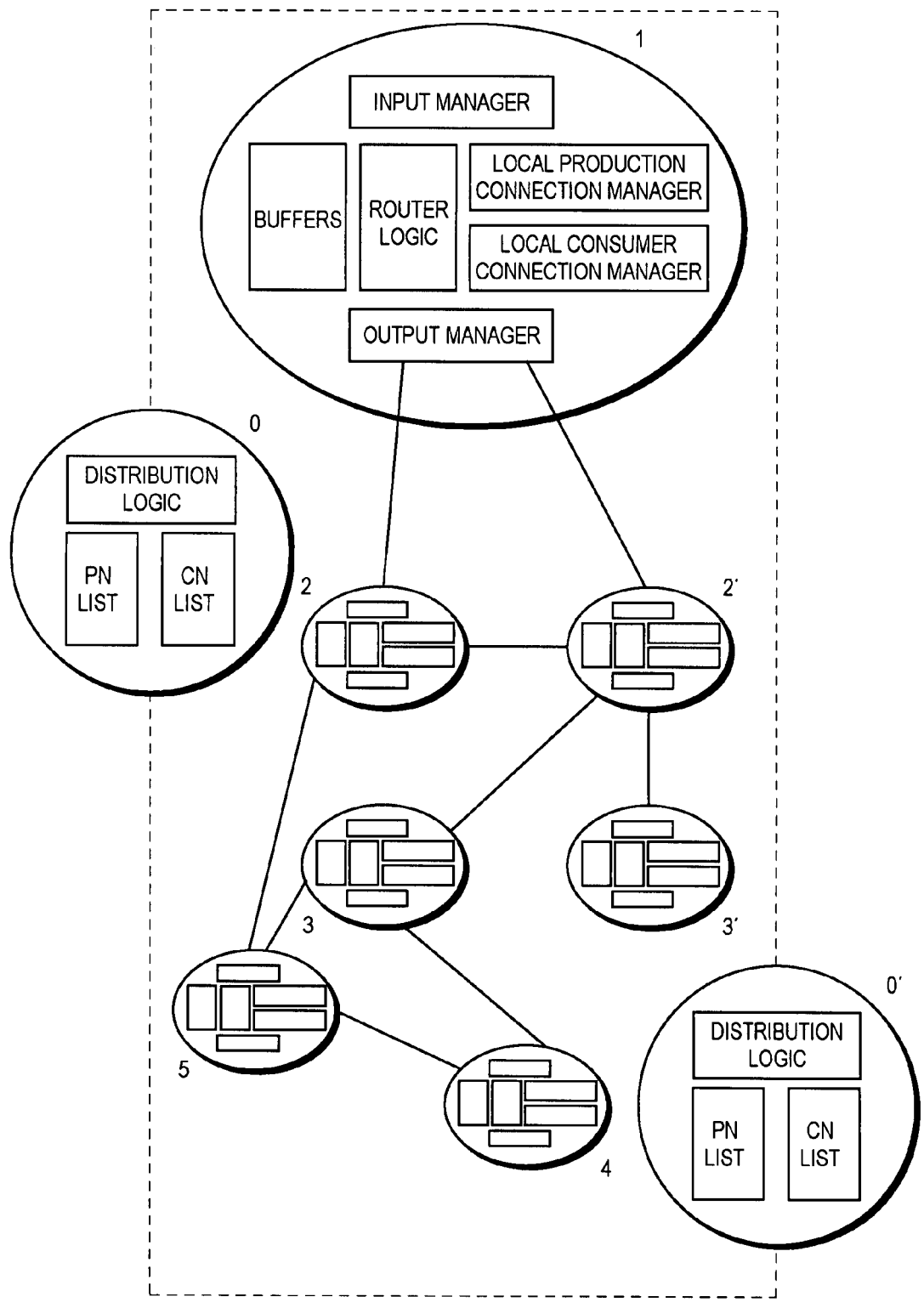

The FIGS. 2A-2Q show several stages of initiating an organic network. The thick lines are connections between nodes. The stripe broken line is a message to a node, the dotted line is the information regarding the nodes connected to the presenting node, a thin line is contacting and testing the quality of a connection.

FIG. 2A shows an organic network having a production node 1. The production node delivers content, for instance a streaming audio broadcast via the internet to two consumer nodes 2 and 2'. The content in that case is divided into data packages which are transmitted via the internet. To each of both consumer nodes consumer node 3 and 3' are respectively connected. To 3' a next consumer node 4 is connected. Two portal nodes 0 and 0' are also shown.

The consumer nodes 2 and 2' deliver content that they receive from the production node through to the consumer nodes 3 and 3', consumer node 3 in its turn delivers through to 4. As a result only two consumer nodes are directly connected to the production node.

From a certain situation as shown in FIG. 2A a possible development of the organic network will now be followed in the FIGS. 2B-2Q.

In FIG. 2B production node 1 sends a message to consumer node 2 in which the existence of consumer node 2' is mentioned.

In FIG. 2C it can be seen that consumer node 2 is testing the connection to consumer node 2'. Apparently consumer node 2' has capacity to spare and a quicker connection to the production node. For instance, in case of an internet application, consumer node 2 may be connected via an analogous modem having a baud rate of 56k6, while consumer node 2' is connected by means of for instance a cable modem, and the actual connection between the production node and consumer node 2 is 28k8 at a maximum. This whereas consumer node 2 can handle 56K6; consumer node 2' receives the content at high speed, higher than 56k6, from the production ode and starts to send the content to consumer node 2, independent of the production node, at a speed of 28k8. Consumer node 2 now obtains the content at a speed on 56k6 instead of 28k8 (for instance). This situation is shown in FIG. 2D. In FIG. 2D the production node also remains transmitting content to consumer node 2. Node 3 also obtains information delivered from node 2 about the nodes connected to said node.

In FIG. 2E consumer node 3 is testing, for instance because its connections are not optimal, the connection to various nodes in the network of which it now (directly or indirectly) knows of its existence. This testing may for instance take place because the connection to consumer node 2 gets worse and worse. On this case consumer node 3 tests the connection to production node 1 and consumer node 2'. It appears that consumer node 2' still has capacity to spare. Consumer node 2' now also starts to send content to consumer node 3 (FIG. 2F).

In FIG. 2G it can be seen how a new consumer node 5 is realised via a portal node 0. The consumer node to-be contacts portal node 0. Should it be the case that said node is not a consumer node yet, and has yet to receive software to be installed as such, the node (to-be) can obtain said software from the portal node 0. As of the moment the software has been installed, the node is a consumer node as well (and in fact it can then also start to operate as production node if it wants to).

In the figure the portal node selects a consumer node from the list it keeps up to date, in this case consumer node 4, that may or may not be added last. Should a node newly to be added not be a consumer node yet, then it will obtain the necessary software (in this case) from the portal node, as well as the information about the presence of consumer node 4 (FIG. 2H). Consumer node 5 in its turn tests the connection to consumer node 4 (FIG. 2I) and contacts consumer node 4 (FIG. 2J).

In FIG. 2K, consumer node 5 obtains information about consumer node 3 from consumer node 4 and subsequently tests (FIG. 2L) the connection to consumer node 3. When it appears that consumer node 3 has transmission capacity to spare and consumer node 5 has receiving capacity to spare, consumer node 3 will also send content to consumer node 5 independent of the production node or consumer node 2 (FIG. 2M). Consumer node 5 gears with 4 and 3 what it wants to receive.

In FIG. 2N consumer node 3 tells consumer node 2 about the existence of nodes 2', 4 and 5. In FIG. 2O it can then be seen that node 2 is testing the connection to 5, possibly because its connection deteriorates or the connection to 5 is better.

In FIG. 2P the connection between consumer node 5 and 2 has been made.

In FIG. 2Q it appears that the connection between 2 and 5 and 5 and 3 is so good that 3 now obtains its data packages via 5 instead of 2. The connection between 3 and 2 is broken off.

In FIGS. 3A-3L a device according to the invention is implemented in a mobile phone network. The white arrows here indicate a short control signal, the grey arrows a signal having one conversation, and the black arrows signals having two conversations.

Figure 3A:
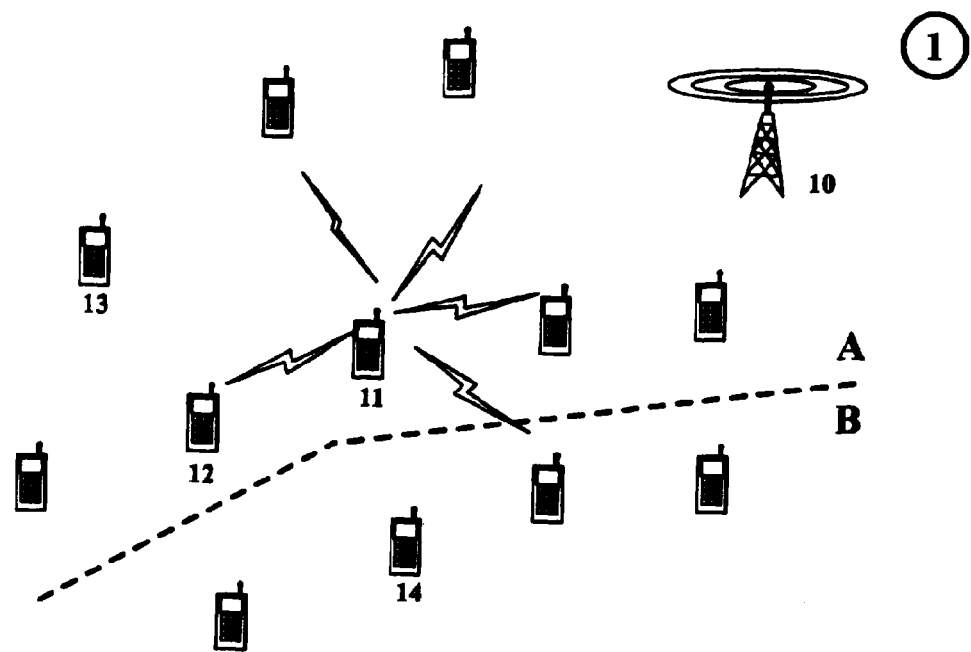
FIGS. 3A-3L show devices according to the invention applied in mobile telephony.
Figure 3B:
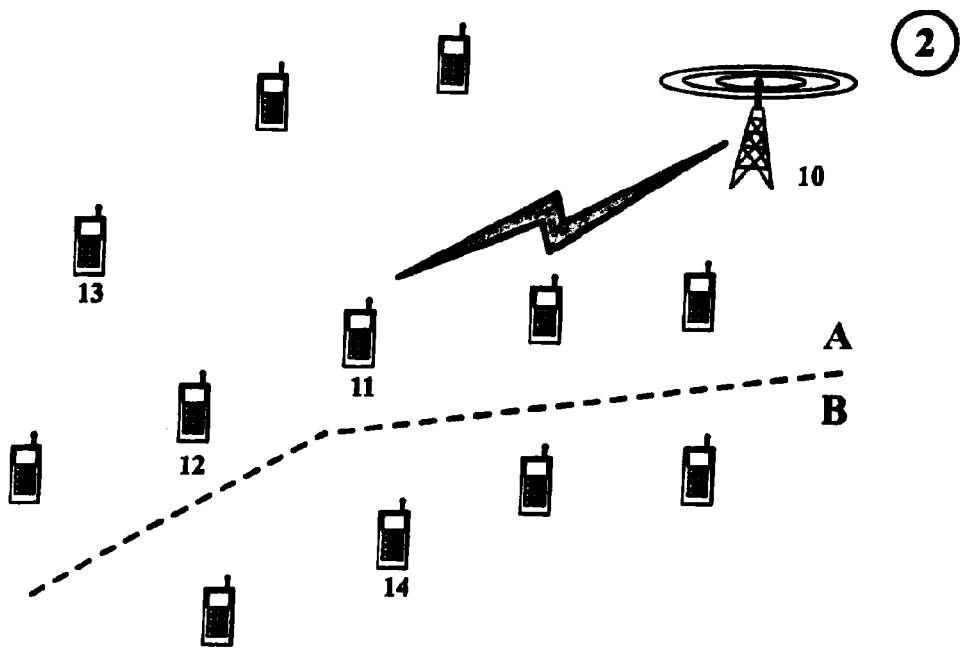

In FIG. 3A mobile phone 11 wants to make contact. The device according to the invention, built in mobile phone 11, subsequently searches whether a mobile phone in the direct vicinity has already contacted a support transmitter 10. None of the mobile phones in the direct vicinity has contact with support transmitter 10. The device according to the invention subsequently makes contact between mobile phone 11 and the support transmitter 10 (FIG. 3B). Mobile phone 11 starts a first conversation with a mobile phone outside the figure.

Figure 3C:
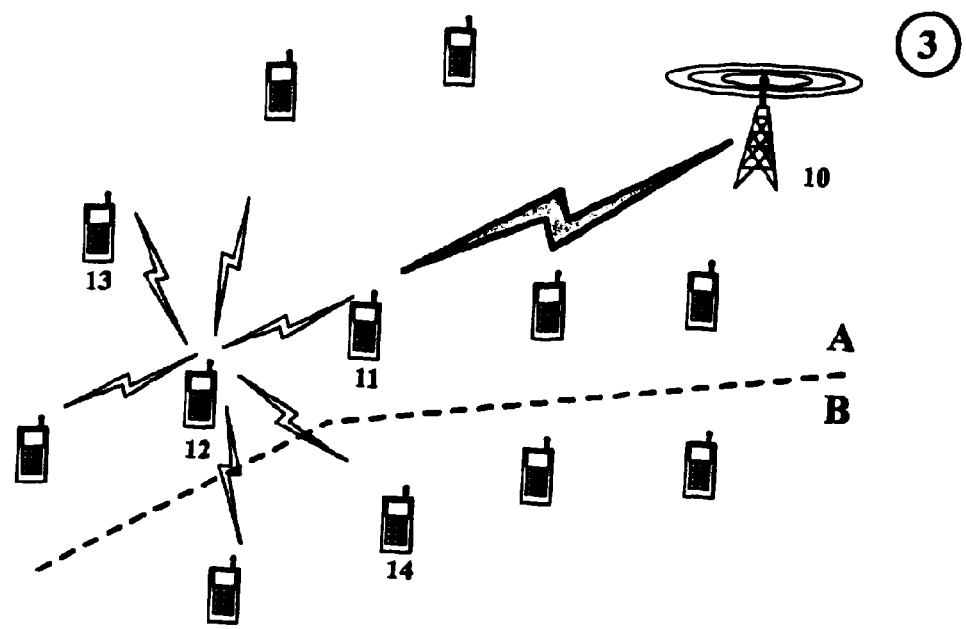
Figure 3D:
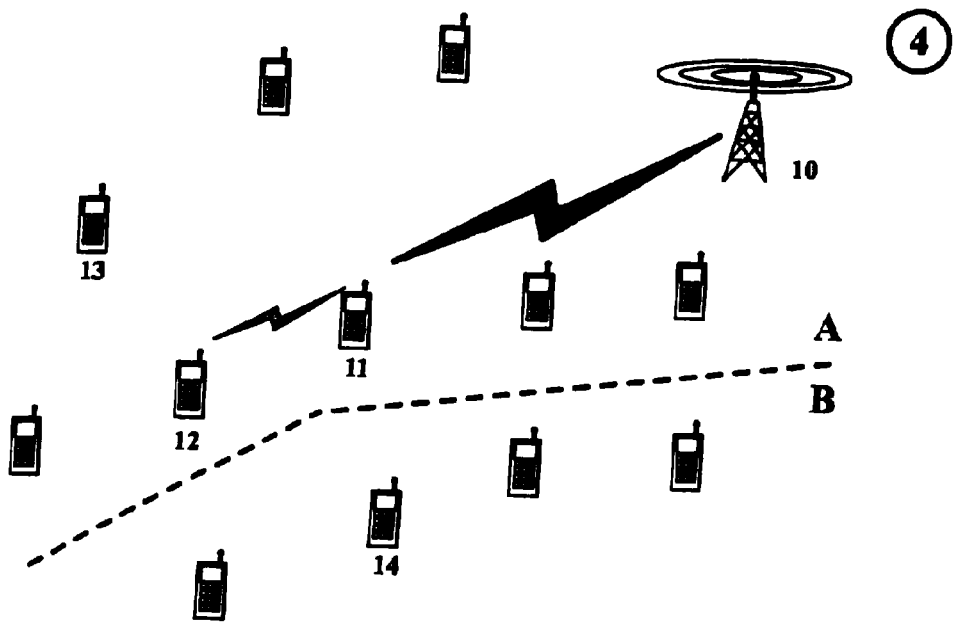

In FIG. 3C it can be seen how the device according to the invention, also implemented in mobile phone 12, searches in the direct vicinity whether a mobile phone has contact with the support transmitter 10. In FIG. 3D it can be seen that mobile phone 12 makes contact with mobile phone 11, which now sends on both conversations to the support transmitter 10.

Figure 3E:
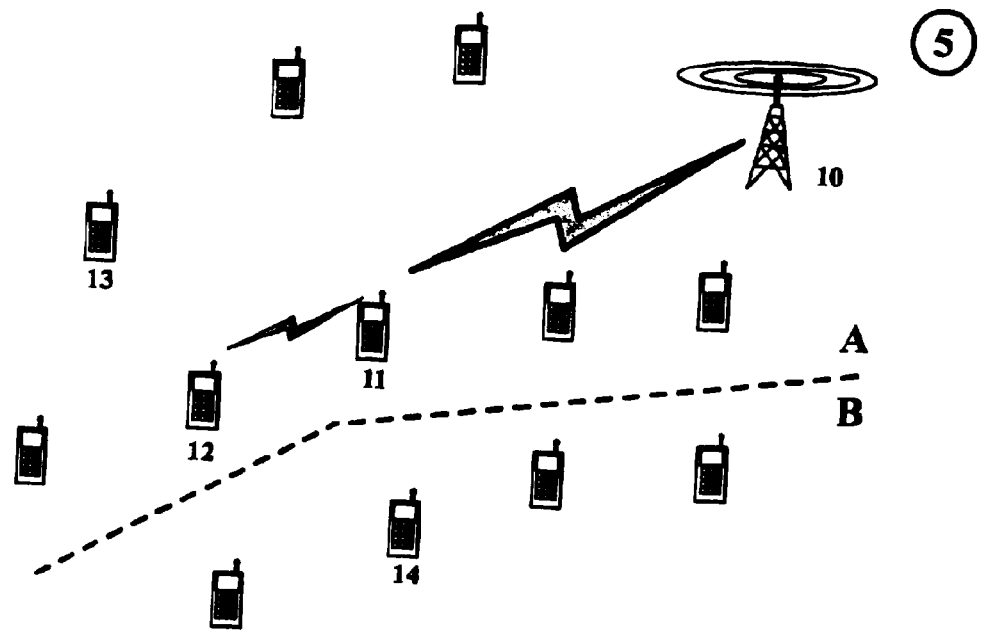

In FIG. 3E it can be seen that the conversation of mobile phone 11 has already ended, but that said phone still sends on the conversation of mobile phone 12.

Figure 3F:
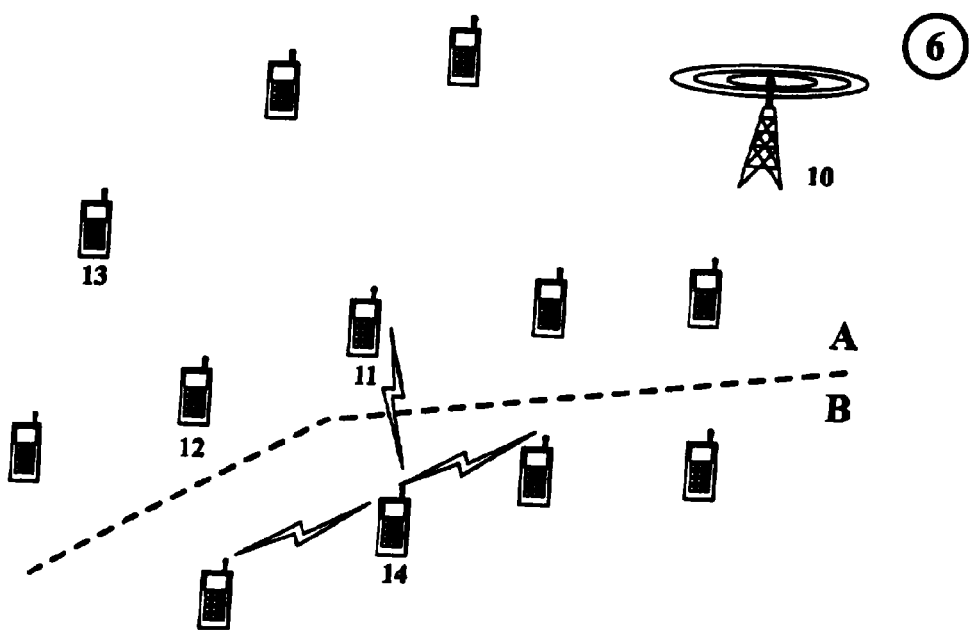
Figure 3G:
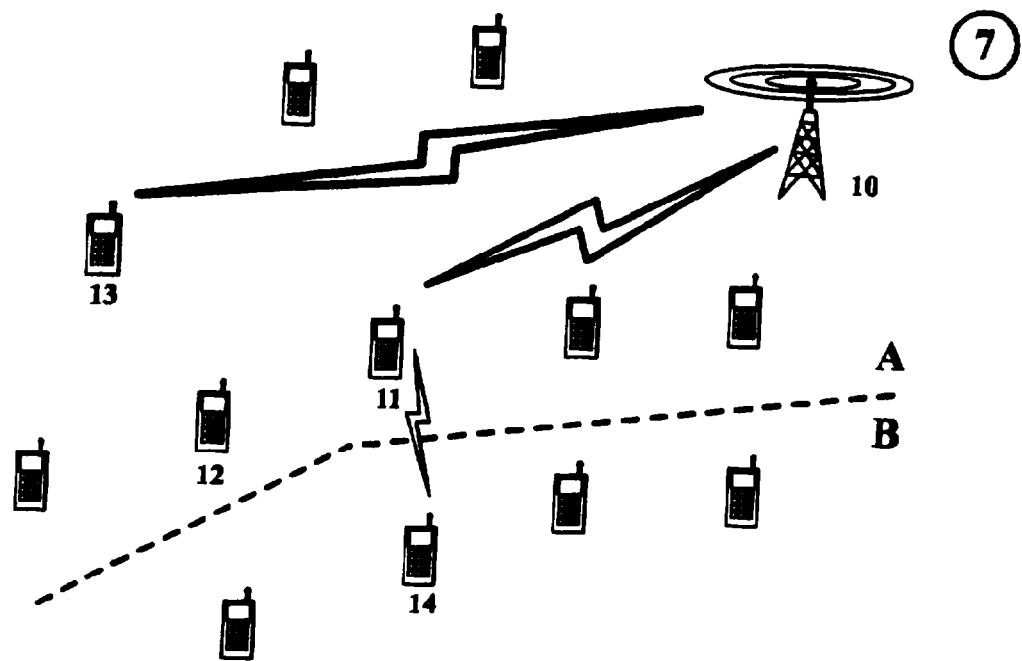
Figure 3H:
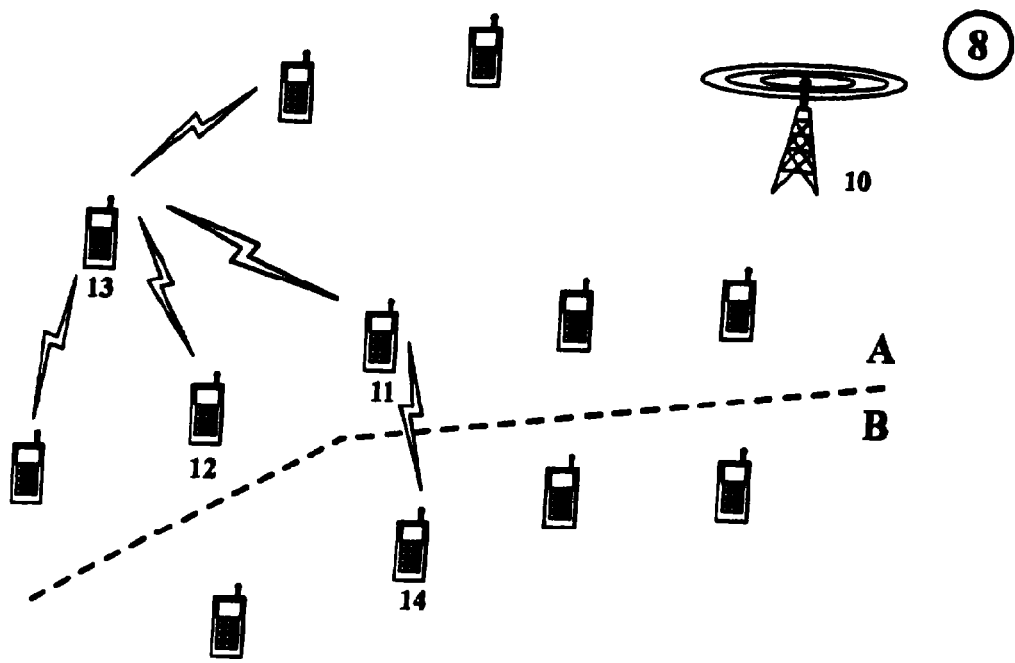

In FIG. 3F is can be seen that mobile phone 12 has also finished its conversation. Mobile phone 14 wants to call mobile phone 13, but is out of support transmitter 10's reach. Its signal is received by 11, which is able to make contact with the support transmitter. Mobile phone 11 now passes on the signal of 14 to the support transmitter 10, the support transmitter 10 sends on the signal to mobile phone 13 (FIG. 3G).

Figure 3I:
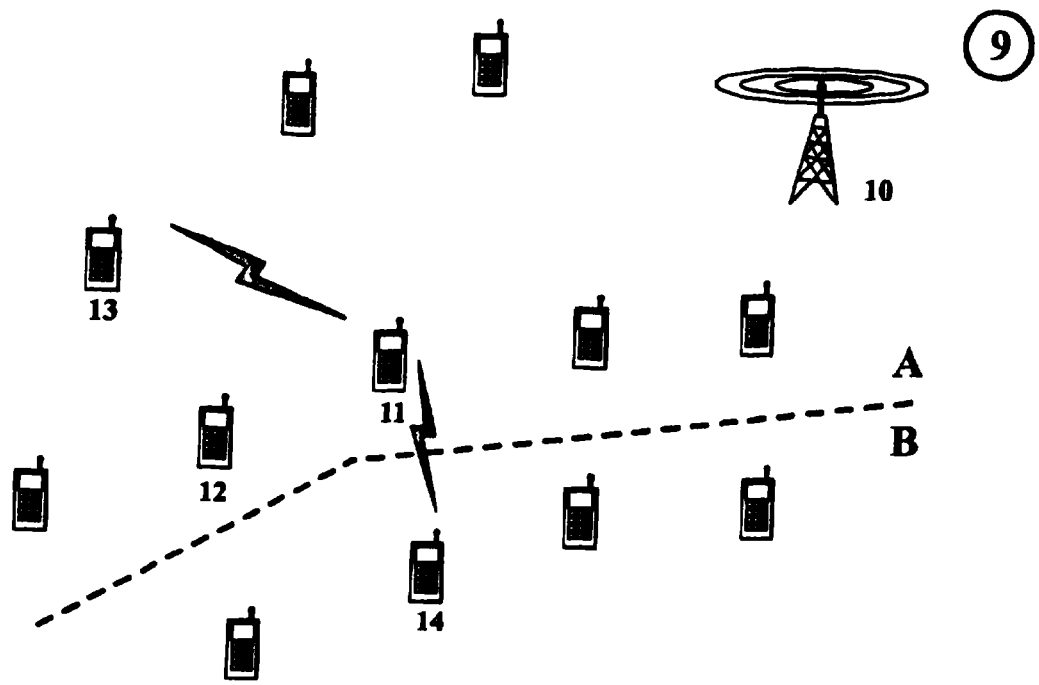

Mobile phone 13 has meanwhile been informed by for instance the support transmitter 10 that 11 is relatively close (they after all use the same support transmitter). Mobile phone 13 subsequently transmits a (small-range) signal asking mobile phone 11 to make contact with 14, which signal is received by 11 (FIG. 3H), which takes over the function of the support transmitter 10 and ensures the connection between 13 and 14 (FIG. 3I). Encryption ensures the confidential nature of the connections.

Figure 3J:
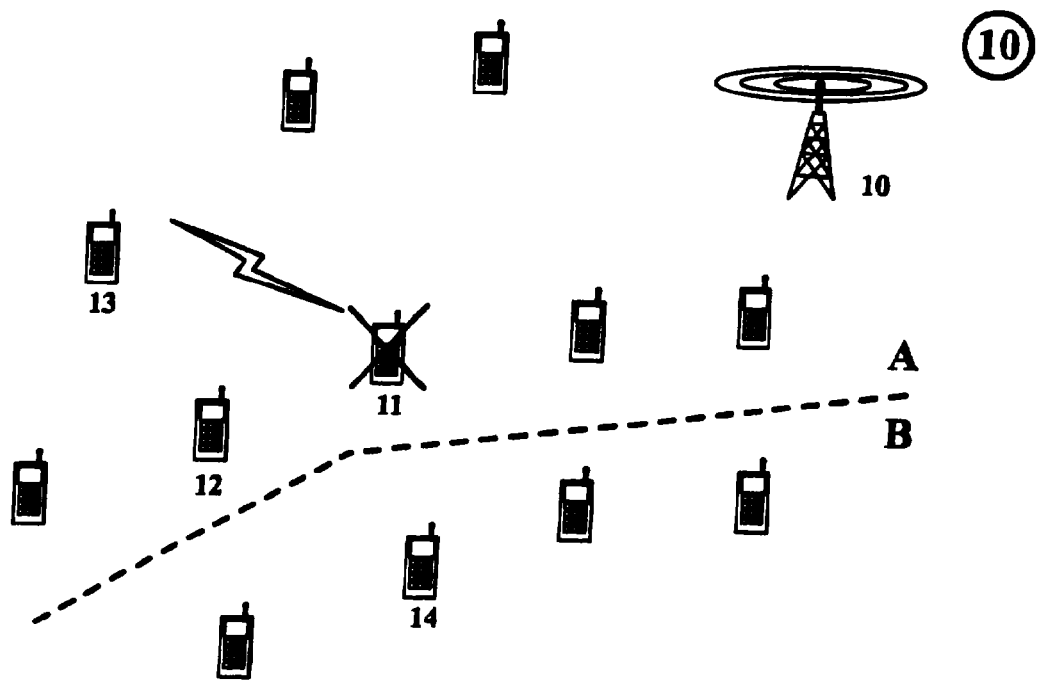
Figure 3K:
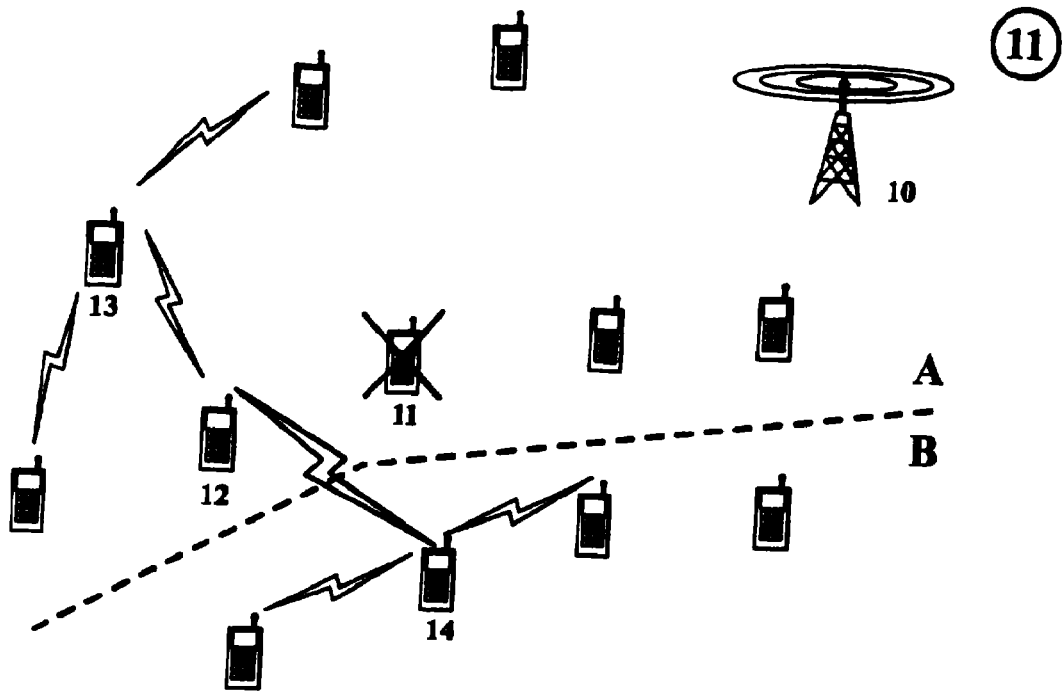
Figure 3L:
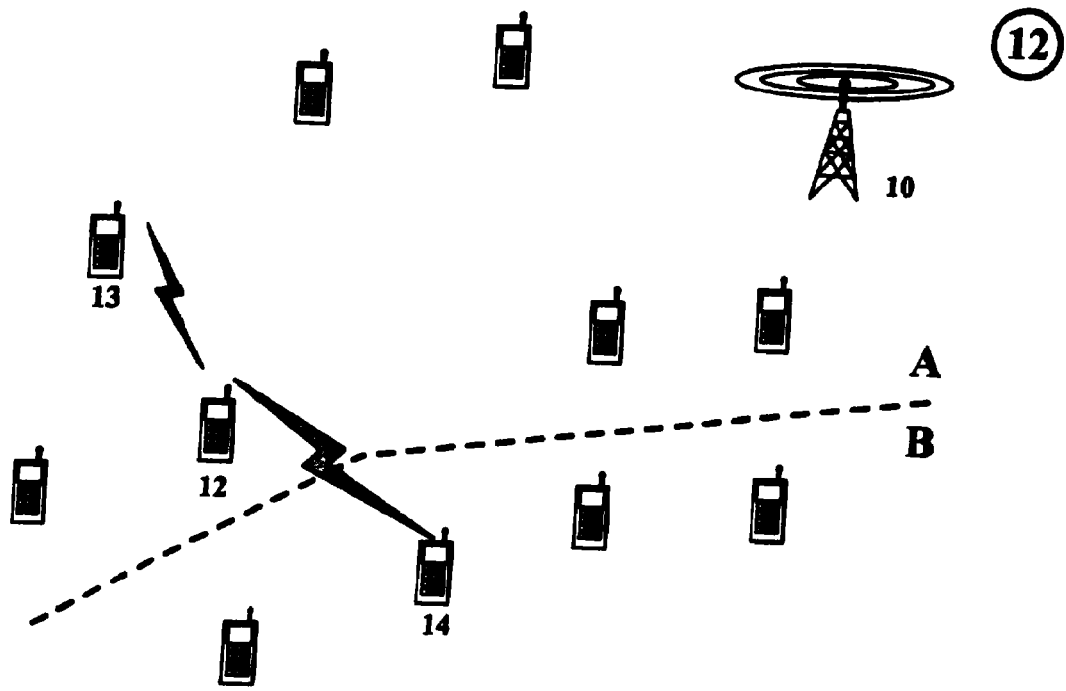

Due to a failure mobile phone 11 breaks down (FIG. 3J). Both 13 and 14 send out a call for help. Mobile phone 12 receives both calls and takes over the role of 11 (FIG. 3L).

Because of the autonomy of the device according to the invention it is possible first of all to make direct contact between mobile phones that are in each other's vicinity. Additionally it is possible to take care of failures because of the dynamic nature of the topology.

Moreover, by means of the device according to the invention it is possible with a weak support transmitter (preferably as weak as possible, as the mobile phones then will go looking for an alternative route more quickly) and many mobile phones in each other's vicinity to have a good connection with a minimum of transmission capacity of the support transmitter 10.

Figure 4A:
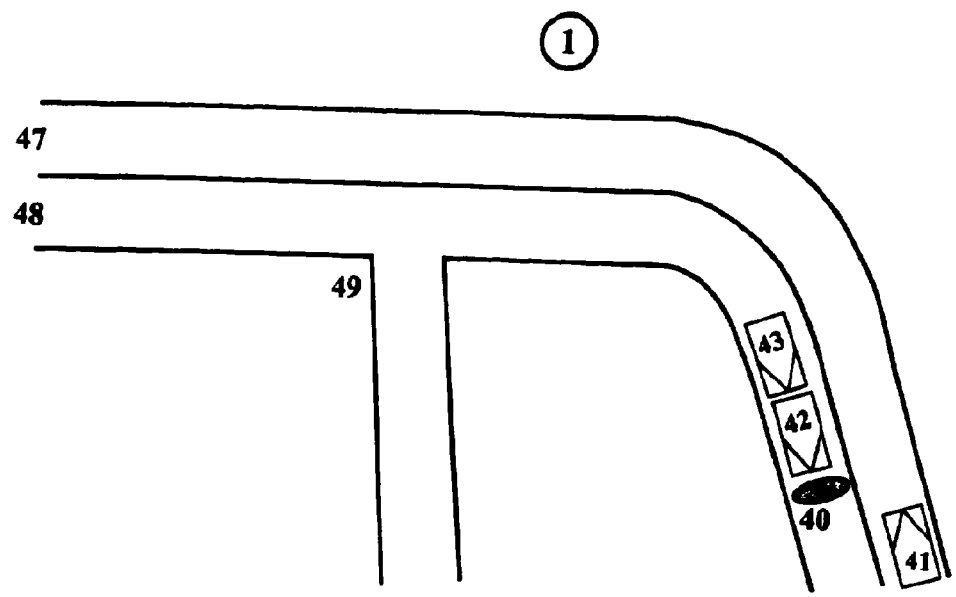
FIGS. 4A-4E show devices according to the invention applied in a traffic information system.

In FIG. 4A a traffic situation is shown, in which on one side of the road 48 and obstacle 40 is present that limits or blocks the circulation, as a result of which cars 43 and 42 come to a standstill. On the opposite side of the road 47 an approaching car 41 arrives. Amply before the blockage 40 there is an exit 49 with an alternative route. The cars are equipped with a device according to the invention.

Figure 4B:
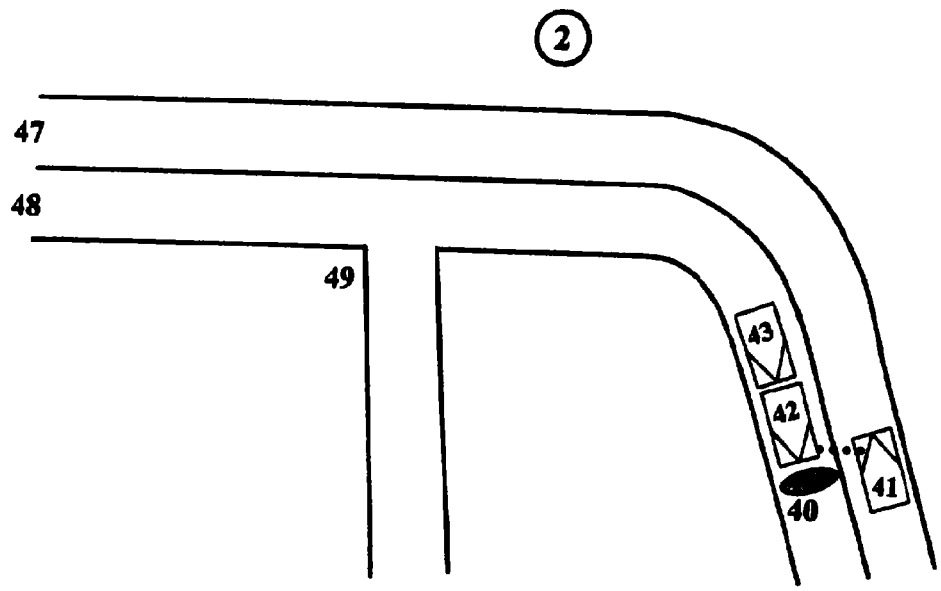
Figure 4C:
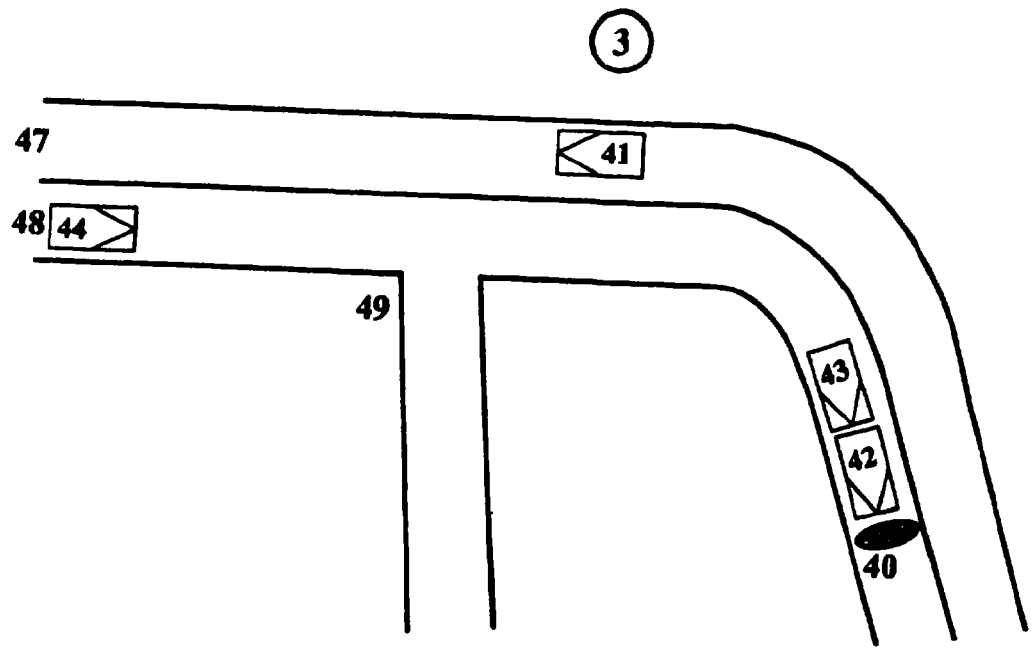

In FIG. 4B it can be seen how the approaching car 41 obtains information from the stationary car 42 that it stands still. The car 41 drives on, and in FIG. 4C it can be seen how a car 44 on the side of the road 48 approaches the obstacle.

Figure 4D:
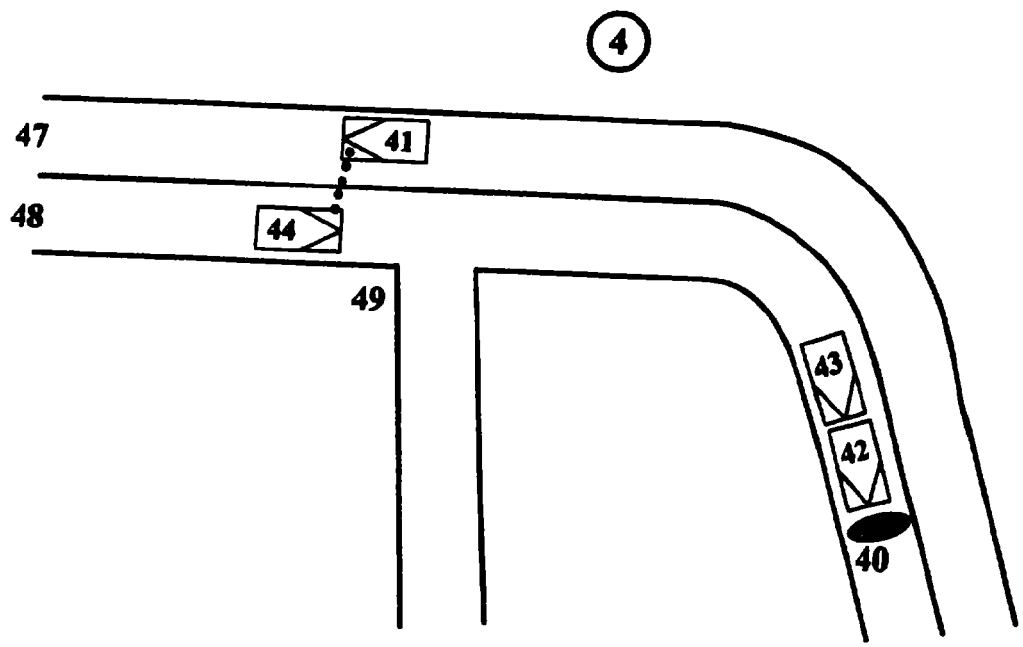

In FIG. 4D the car 41 delivers information to requesting car 44, independent of the transmitting car 42.

Figure 4E:
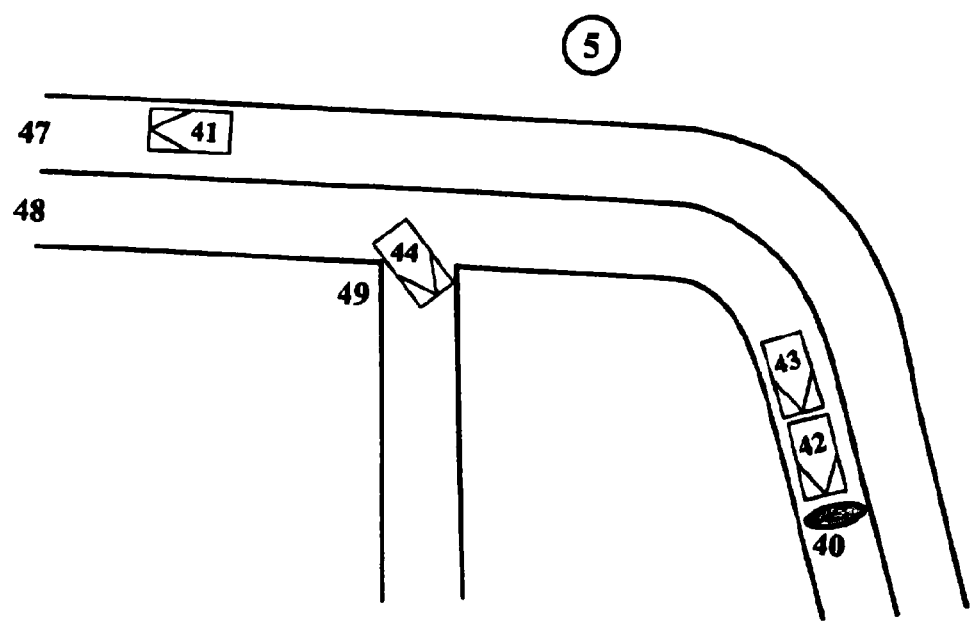

In FIG. 4E it can be seen that car 44 decides to take an alternative route via exit 49.

The device according to the invention, implemented in a car-information system, in this case receives the information from the transmitting car 42 and independent of the transmitting car sends it through to car 44. In this way car 41 informs the cars coming up behind independent of the cars that sent the information regarding the obstacle, in this example car 42.

Figure 5A:
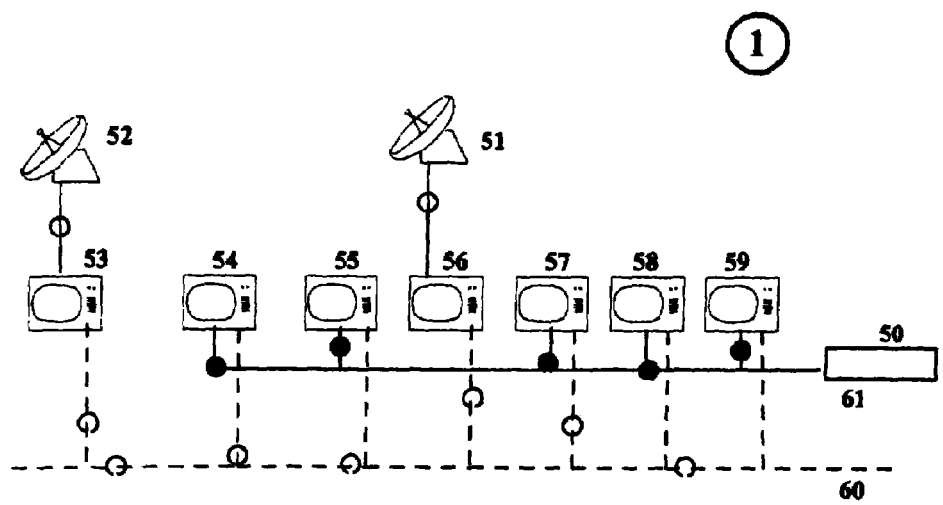
FIGS. 5A-5E show devices according to the invention applied in cable networks for television.

Another example of the application of the device according to the invention is in television. In FIG. 5A a situation is shown wherein a number of television sets 54, 55, 57, 58, 59 are connected by means of a cable network 61 to transmission/broadcasting station 50. Television 56 is connected to its own dish antenna 51. Apart from that the televisions are connected to an electricity grid 60, and provided with means for transmitting and receiving data packages via the electricity grid.

Television 53, that is not connected via a cable network to the other televisions, but indeed via the electricity grid 60, also has its own satellite connection. Televisions 56 and 53 transmit the signals of the dish antennas 51 and 52 to the other televisions via a device according to the invention. The white circles are content coming from satellites 51 and 52 which is passed on to the other television sets by television sets 53 and 56 via the electricity grid. The grey circles are content that are delivered to television sets 54,55,57,58 and 59 by transmitter 50 via the cable 61.

Figure 5B:
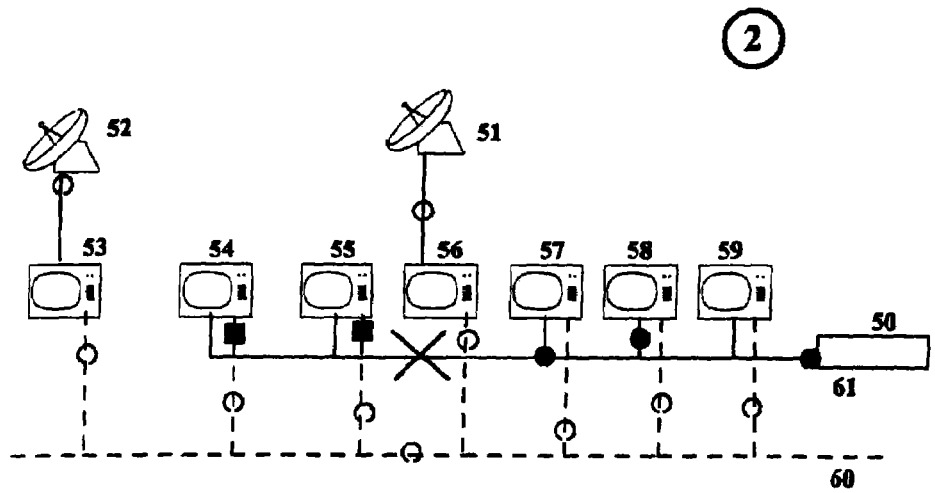
Figure 5C:
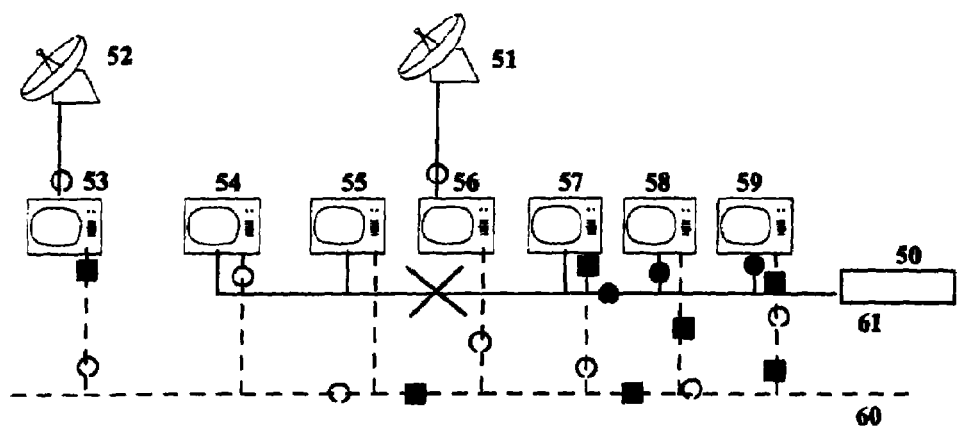
Figure 5D:
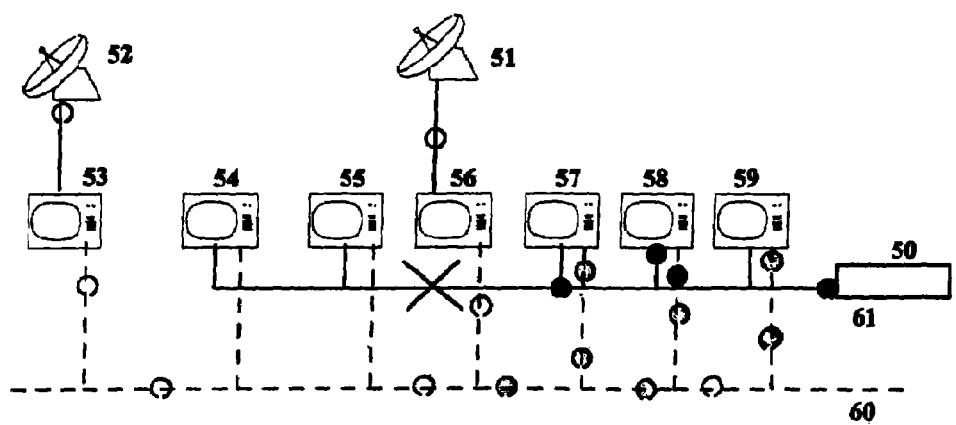
Figure 5E:
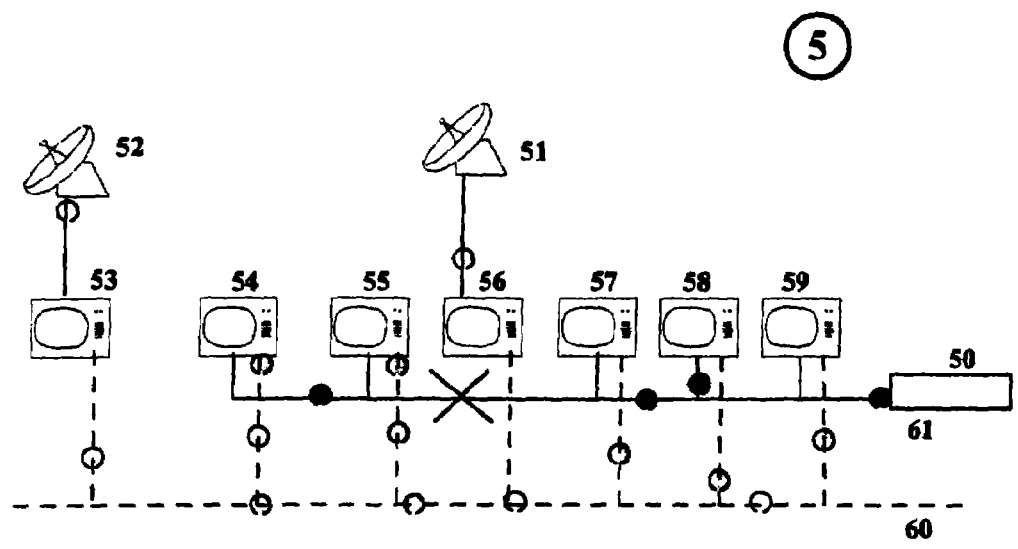

In FIG. 5B it can be seen how a failure arises in the connection between television 56 and 55. Televisions 54 and 55 send out an emergency signal (grey square) via the electricity grid, that is received by a device according to the invention in a television set that still gets a signal. Said television set (in fact the device according to the invention, in FIG. 5C television set 57,58 and 59 receive the emergency signal. Said television sets send a signal to 54 and 55 via the electricity grid that they are able to deliver, and at the request of television sets 54 and 55 they start to deliver via the electricity grid (pale grey circles, FIG. 5D). In FIG. 5E it can be seen that the television sets 54 and 55 actually obtain the cable signal. The pale grey circles reach sets 54 and 55.

This example can of course also relate to personal computers, game computers, or even domestic appliances that are connected via a network or wireless, possibly via for instance the blue tooth protocol. Via an alternative channel, but that alternative may also be overcapacity on a certain cabling, errors can be put right or for instance inertia of data transport can be solved.

FIGS. 6A-6K show the transmission of content in data packages from one point over a network such that those data are available to everybody. That may for instance be streaming video or audio.

Figure 6B:
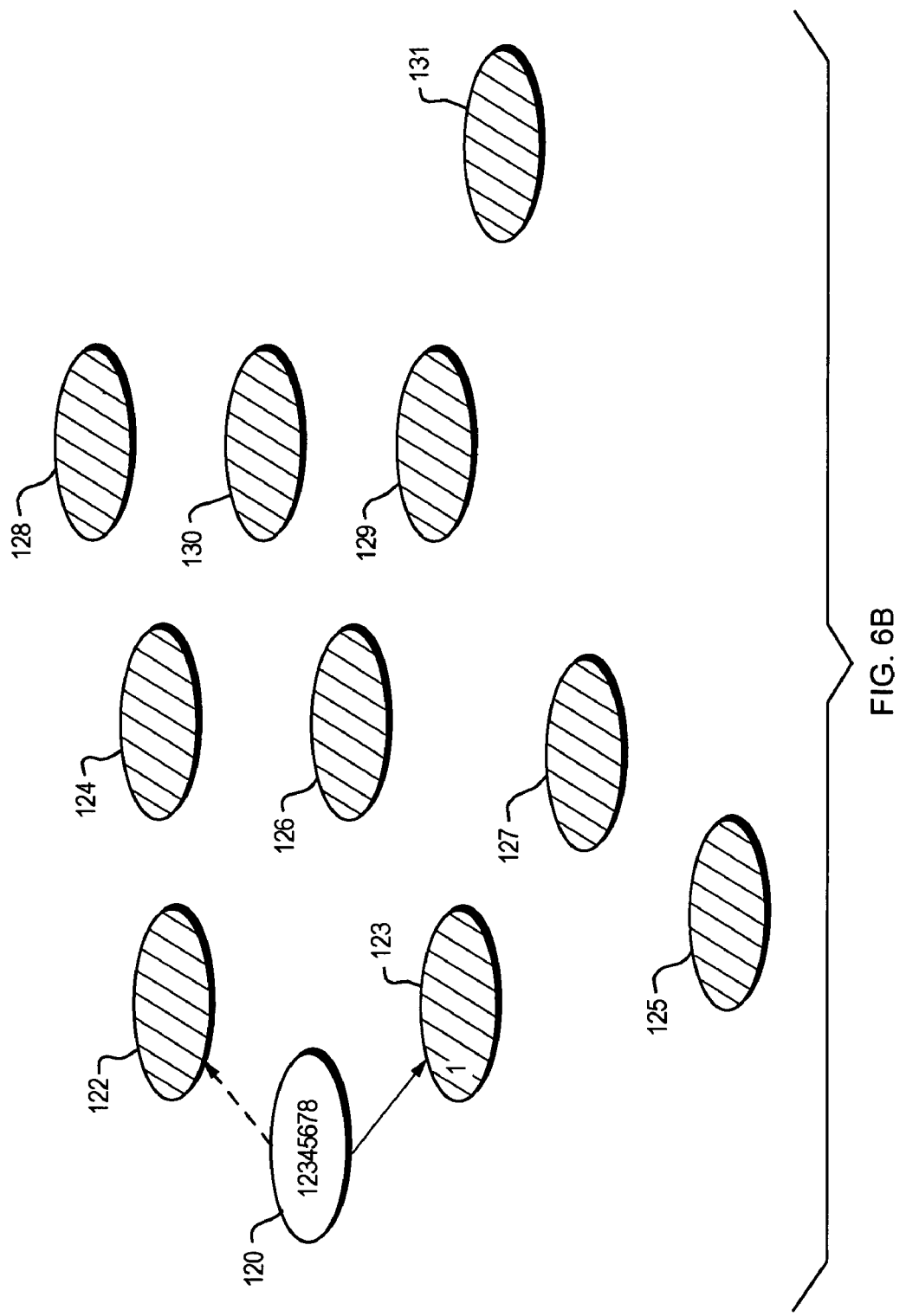
Figure 6C:
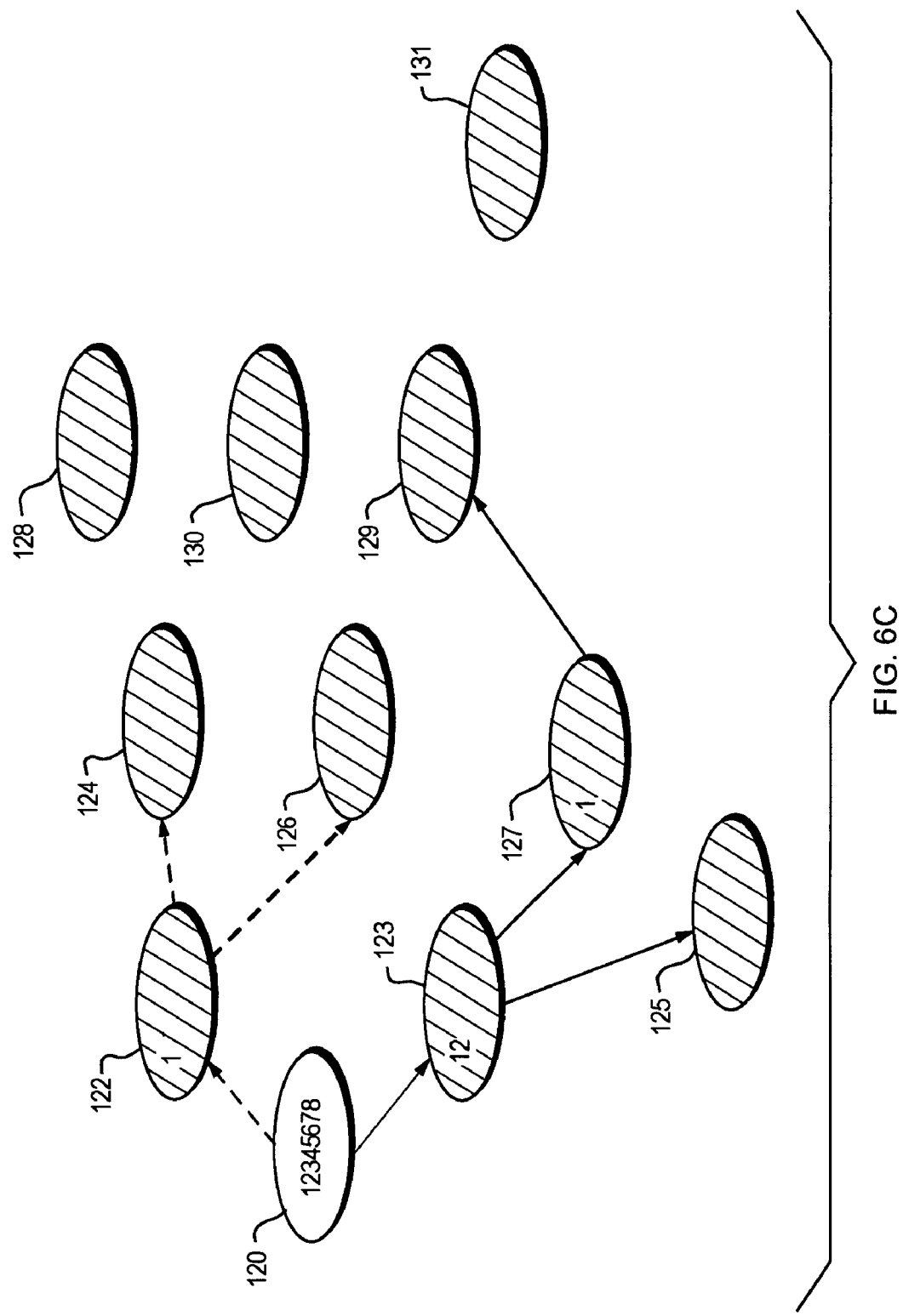

Production node 120 has content "12345678" at its disposal, and sends it to two consumer nodes 122 and 123 who request such. The flow via 123 goes much quicker than via 122. In FIG. 6B it can be seen that the first data package "1" has already been received by 123, whereas 122 still has nothing. Meanwhile 122 and 123 receive requests from 124, 126 and 127, 125, respectively. The data packages to 123 go so quickly that 123 has meanwhile received two packages already, and the connection of 123 to 127 is so good that 127 as well has already received one data package. It is therefore able to grant a request from consumer node 129 and to start sending on (FIG. 6C).

Figure 6D:
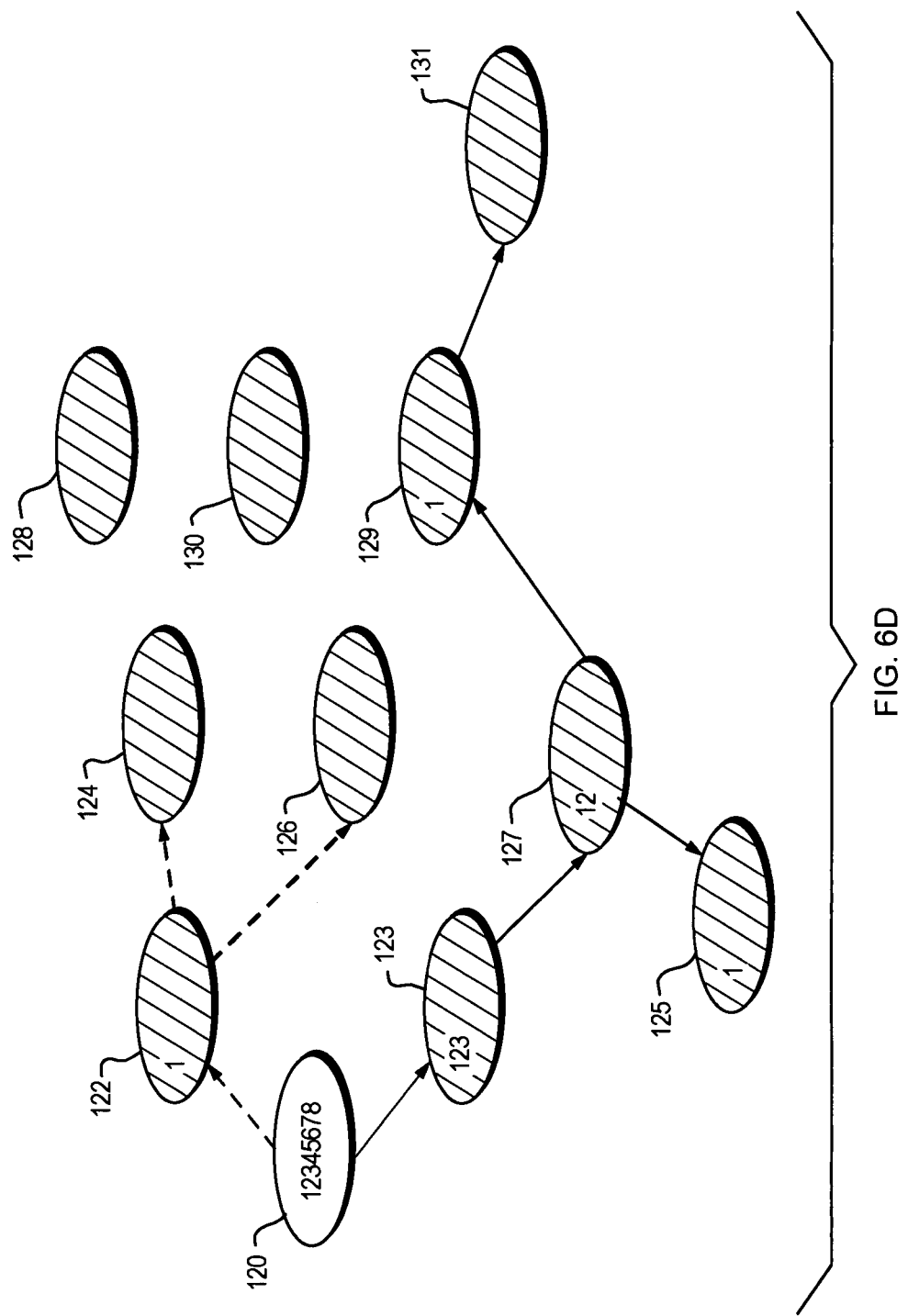

In FIG. 6D the consumer node 123 has meanwhile received three data packages already, and because the connection of 123 and 127 is so fast, 127 as well has already received two data packages. Node 125 has meanwhile been informed of the existence of 127 via 123 and has tested the data connection to 127. Because also this data connection appeared to be good, considerably faster than the data connection to 123, the node 125 has decided to request 127 to deliver the data packages. Additionally 131 has also put in a request for delivery of content and is connected to consumer node 129.

Figure 6E:
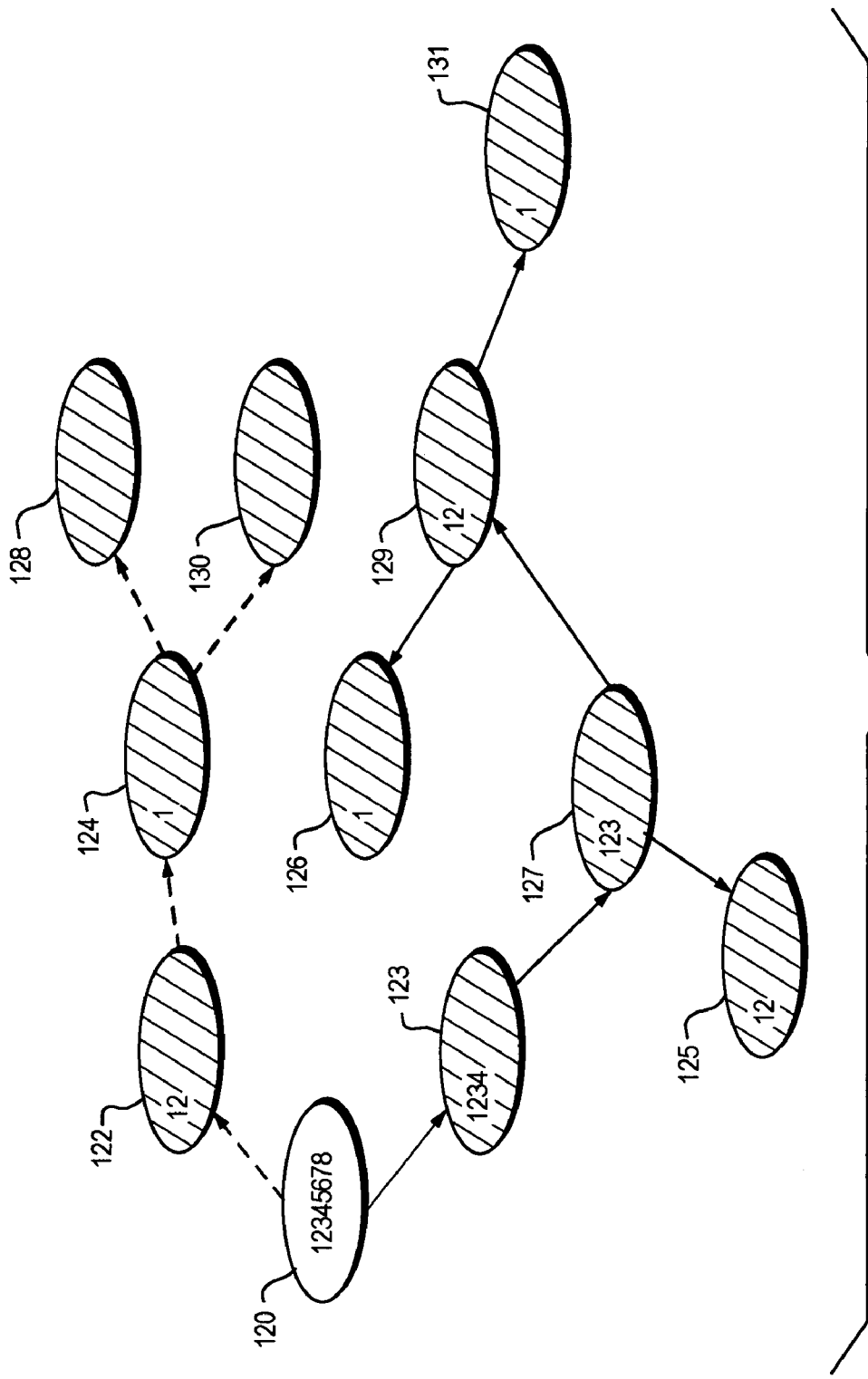

As the connection via node 122 of consumer node 126 appeared to be slow, consumer node 126 goes looking for a better connection and finally ends up at consumer node 129. At the request of consumer node 126, consumer node 129 now also starts delivering data packages to 126. In this case the dynamic topology already seems to occur and the result of the dynamic topology is apparent. Consumer node 126 then disconnects the connection to consumer node 122. Meanwhile nodes 128 and 130 as well are added to the network as consumer nodes. This situation is shown in FIG. 6E.

Figure 6F:
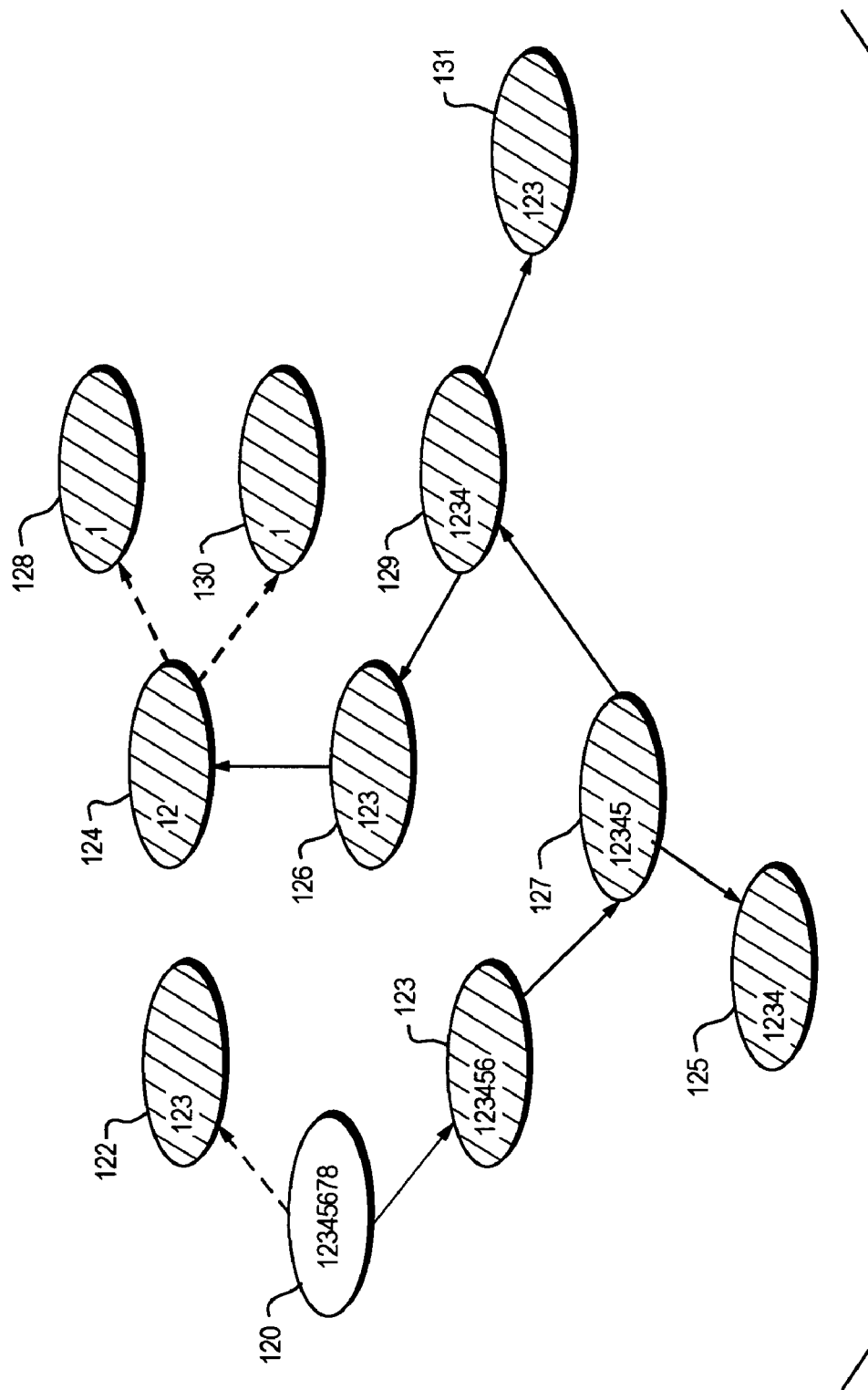

Consumer node 124 as well, due to the slow connection of consumer node 122 to the production node 120, goes looking for a better connection, and ends up at consumer node 126. At the request of consumer node 124, consumer node 126 now also starts delivering data packages to consumer node 124. This situation is shown in FIG. 6F. Meanwhile consumer nodes 128 and 130 still receive data package "1" that comes from the chain 120-122-124.

Figure 6G:
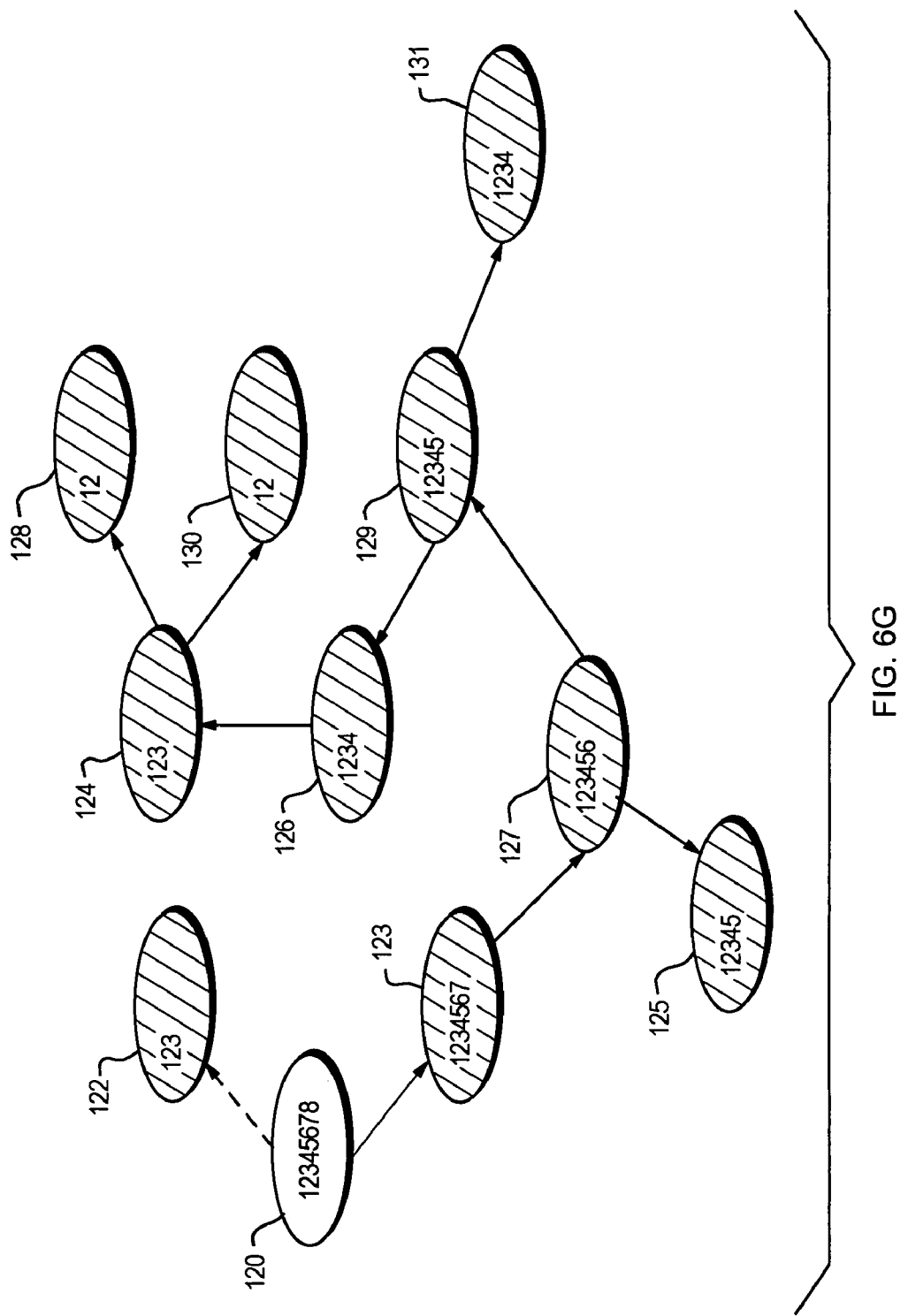
Figure 6H:
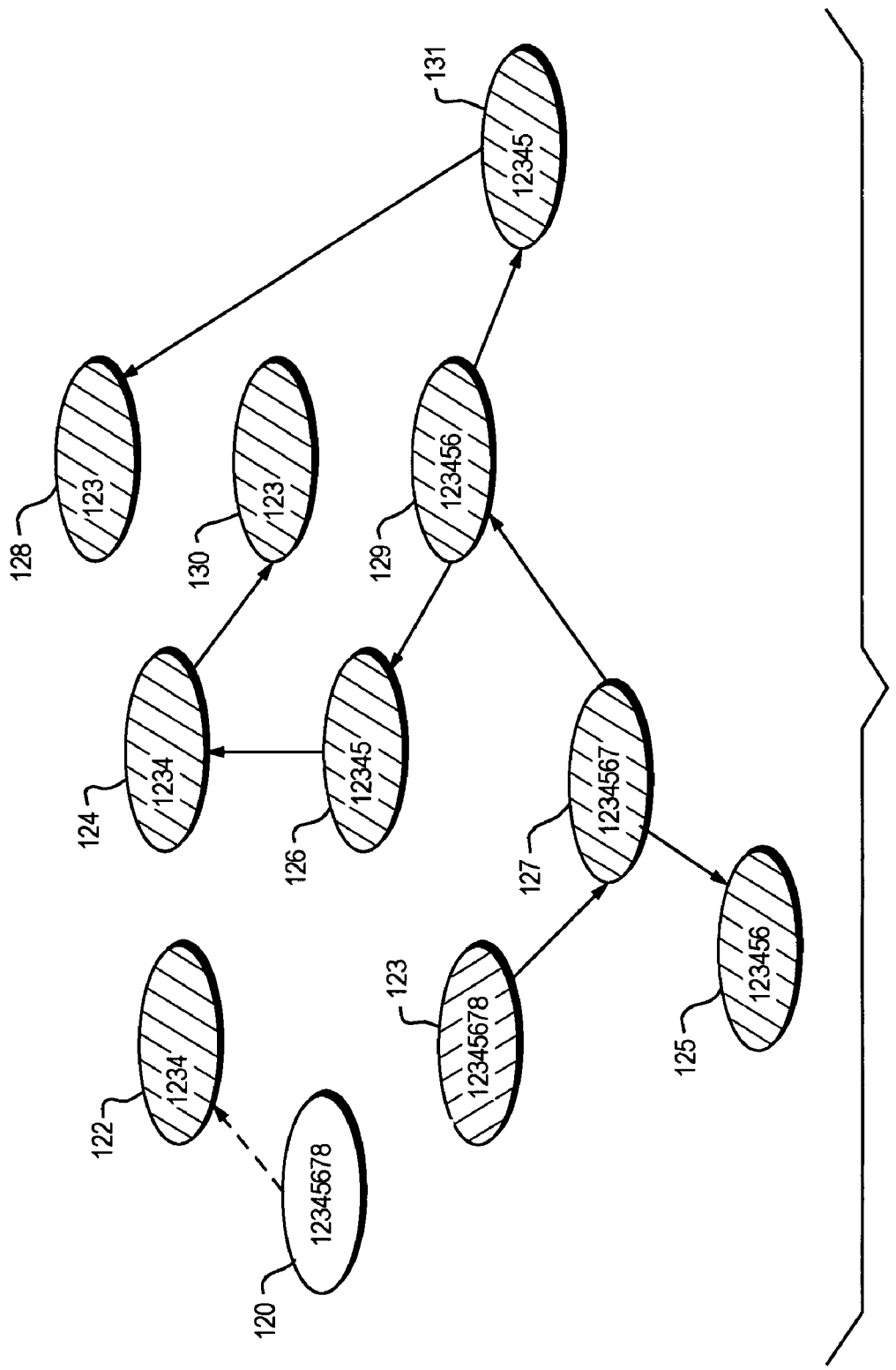

In FIG. 6G it can be seen that the delivery of data packages from the lower chain 123-127-129 goes much quicker than the delivery from production node 120 to consumer node 122. Additionally it can also be seen that the connection of consumer nodes 128 and 130 to consumer node 124 is not optimal: consumer nodes 128 and 130 have received 2 data packages, whereas consumer node 131 has already received 4 data packages. Consumer nodes 128 and 130 are going to look for a better connection, and 128 chooses to use the overcapacity of consumer node 131. This is shown in FIG. 6H. It can also be seen that consumer node 123 has now received all content and the connection to the production node is no longer used.

Figure 6I:
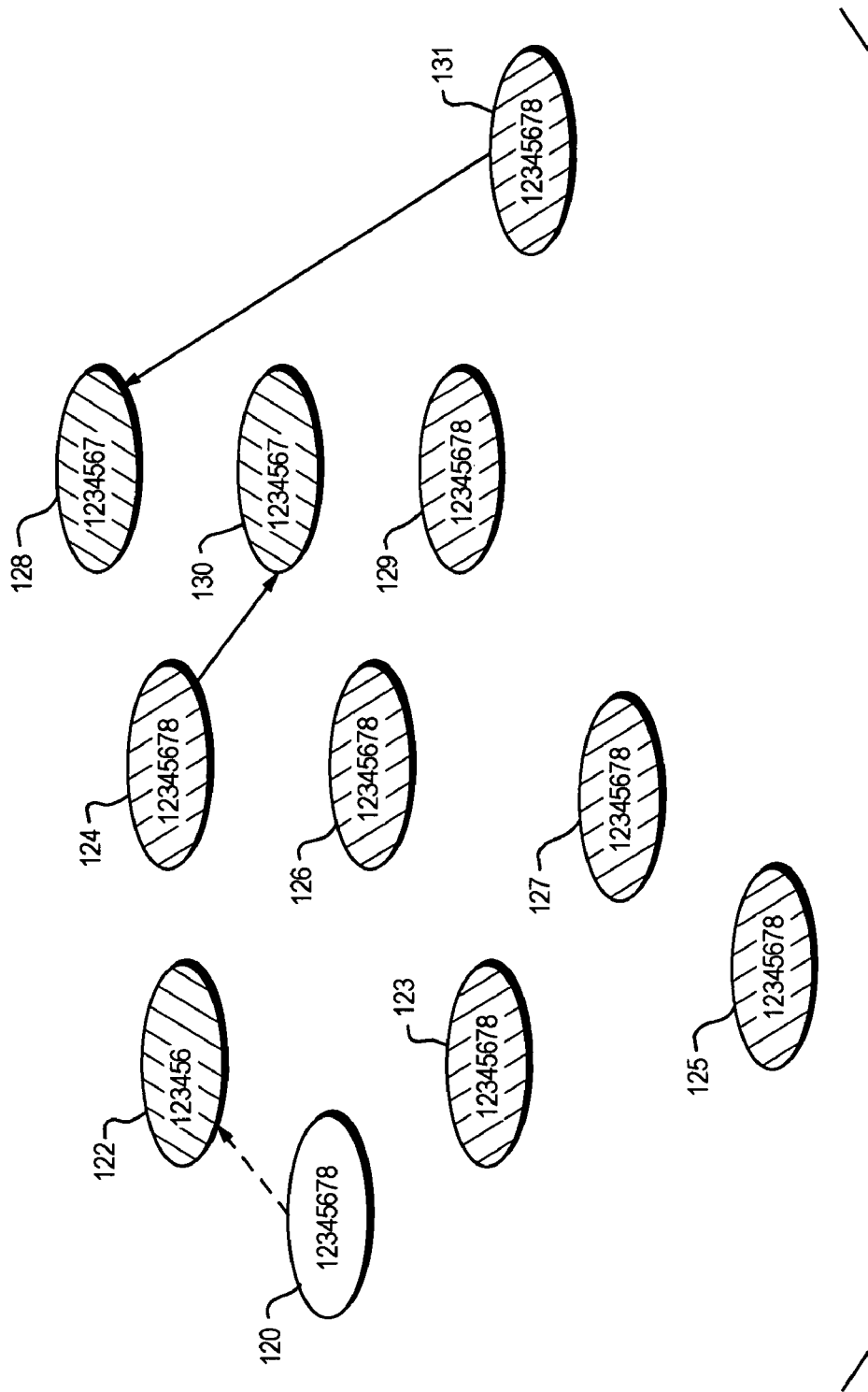

In FIG. 6I it can be seen that only consumer nodes 128, 130 and 122 have not yet received all content. In FIG. 6J all consumer nodes except 122 have received all content.

In this example it apparently was not possible for consumer node 122 to find a better connection to another node. When, however, it would have appeared for instance that the connection via consumer node 124 was better than the direct connection to the production node, the situation could have arisen that the consumer node 122 decided to request whether consumer node 124 could deliver data packages, as a result of which in fact the part of consumer node has been reversed from receiving consumer node to delivering consumer node. Preferably the consumer nodes are set up in such a way that they only go looking for a new or additional connection when an existing connection is not satisfactory (any more).

FIGS. 7-15 show a specific embodiment of a production node according to the present invention, and specifically show the data streams through such a production node (FIGS. 7-11) and through a consumer node (FIGS. 12-15). The data streams which are transmitted may be mp3 streams. The streams in this embodiment are transmitted over the internet. In this description of the drawings, reference will be made to mp3 streams. However, it must be clear that any data stream may be transmitted using this production node. The different building block of the production node and the consumer node, e.g. buffer, Router Logic, etcetera are software objects which may be programmed in any suitable general purpose programming language, like C++, Java, or any task-specific language. These objects are known to a man skilled in the art.

Figure 7:
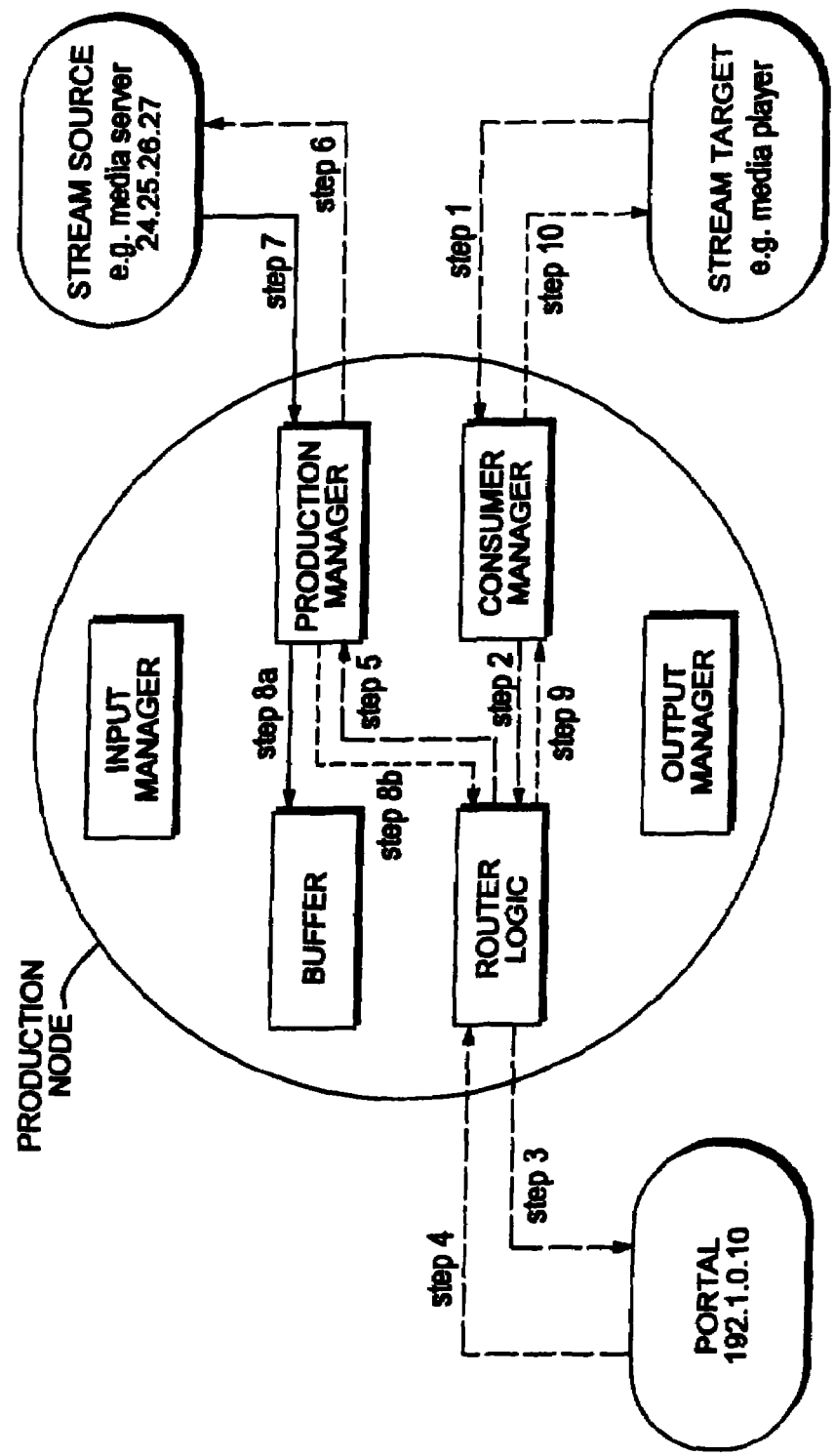
FIGS. 7-15 show the data streams according to the present invention in a specific embodiment of the invention.
Figure 8:
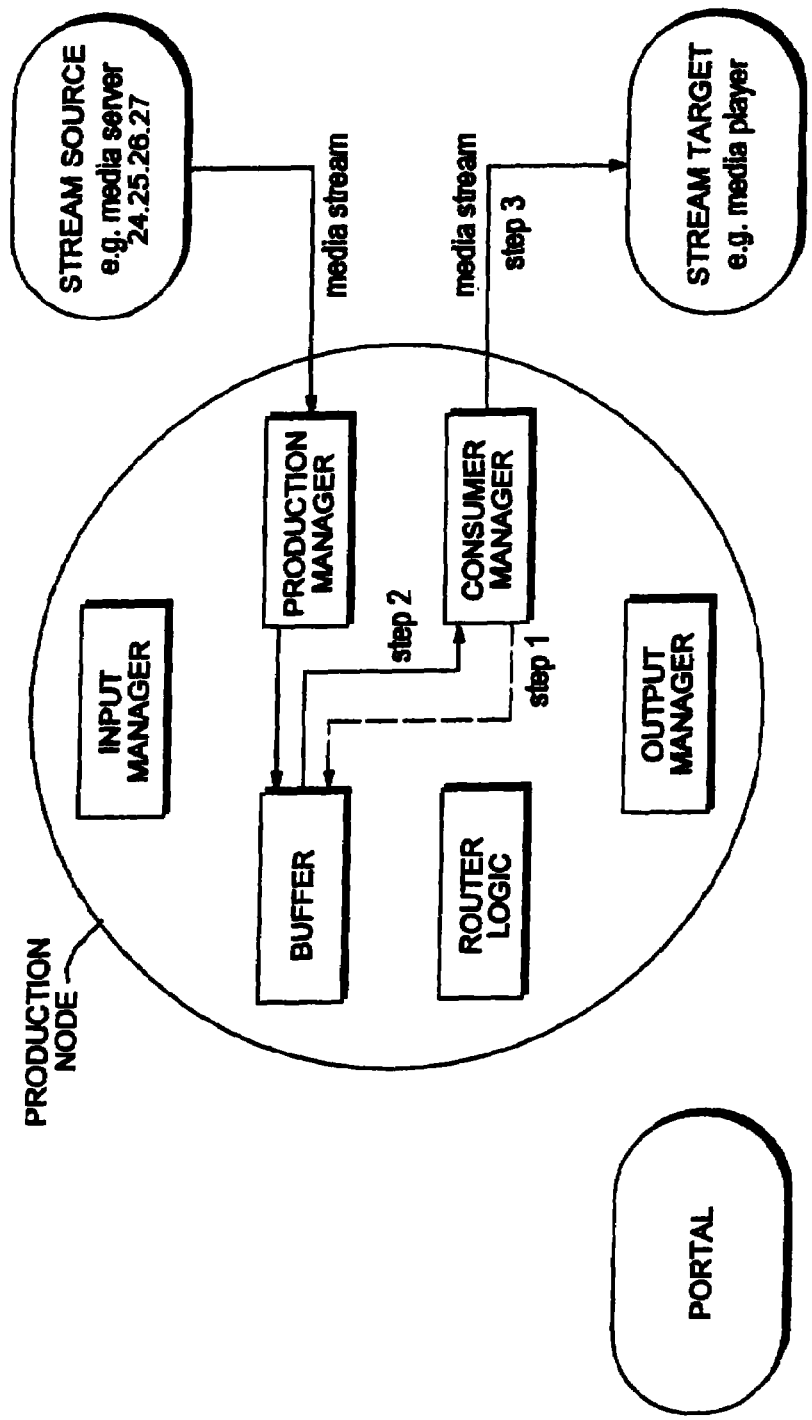
Figure 9:
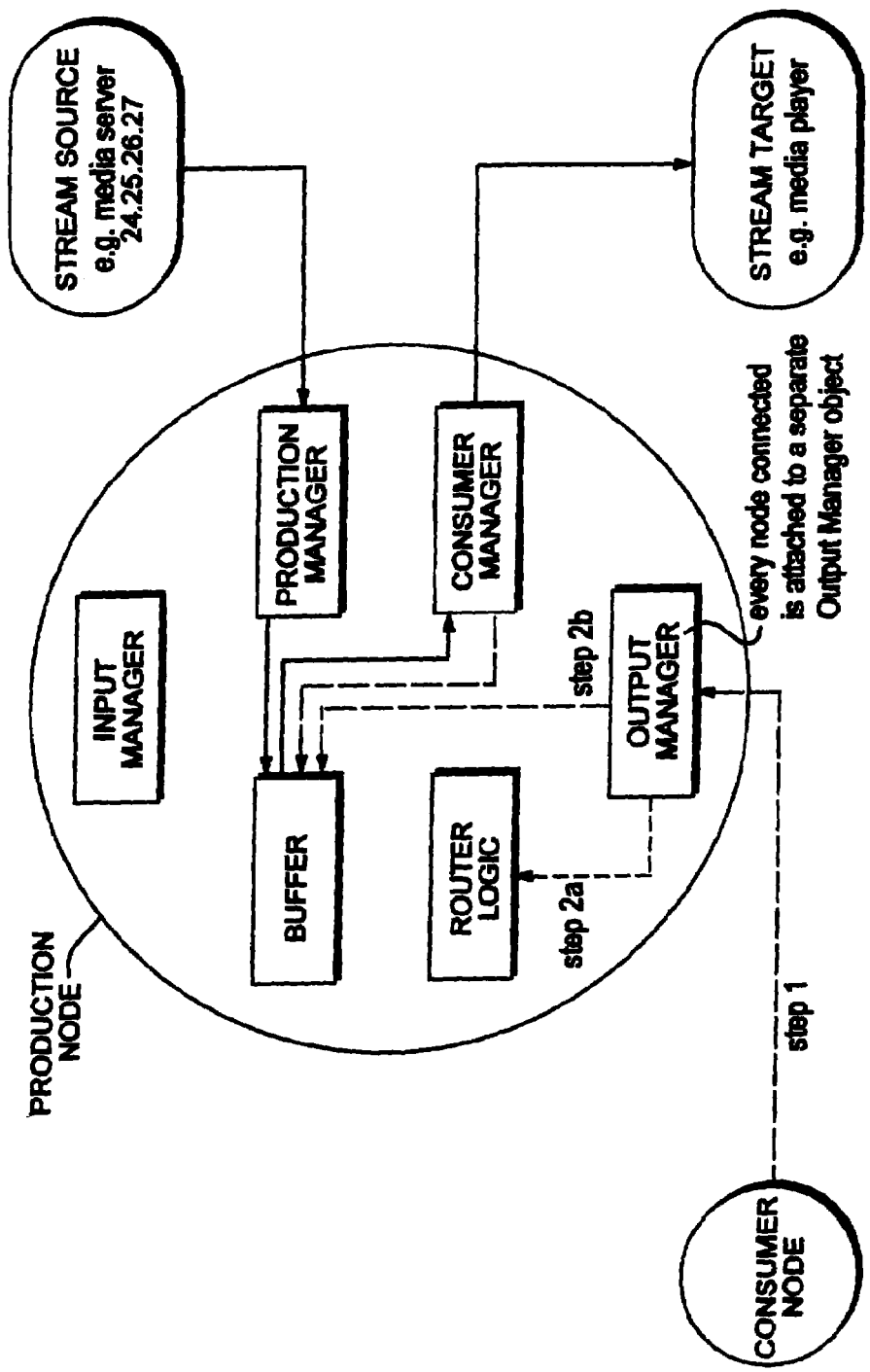

FIG. 7 shows the processing of opening a media stream by a Production Node (PN). A Stream Target (media player) requests a media stream through portal with: http://localhost:123/192.1.0.10/stream.mp3

The following steps are performed:

Step 1: Consumer Manager (CM) receives and recognizes a request

Step 2: CM asks Router Logic (RL) for action

Step 3: RL asks portal (192.1.0.10) for IP address Stream Source (SS)

Step 4: Portal returns IP address SS: 24.25.26.27
Step 5: RL asks Production Manager (PM) to call SS
Step 6: PM request SS with: http://24.25.26.27/stream.mp3
Step 7: SS returns media stream and http header
Step 8a: PM parses data and sends media stream to Buffer
Step 8b: PM returns http header to RL
Step 9: RL returns http header to CM
Step 10: CM returns http header to Stream Target In FIG. 8, the Production Node (PN) starts receiving the media stream. When http header has been passed to the Stream Target (step 10 in FIG. 7, the Consumer Manager (CM) starts a data retrieval loop: The Consumer Manager asks data from Buffer and waits for reply. Buffer response could either be:

data media stream (CM will ask for more) or
data not ready yet (CM will wait and try later) or
end of stream (CM will close connection).

The following steps are then performed:
Step 1: Consumer Manager (CM) requests Buffer for data media stream
Step 2: Buffer starts sending media stream to CM
Step 3: CM passes stream to Stream Target In FIG. 9, Production Node (PN) receives an incoming request from the Consumer Node (CN). The incoming request from a Consumer Node is received by the Output Manager (OM) of the Production Node. The request consists of network information, which is passed to the Router Logic (RL), and a request for a specific part of the media stream (data blocks) which will be handled by the Buffer.

Subsequently, the following steps are performed:
Step 1: Incoming node network request is received by the Output Manager (OM)
Step 2a: OM passes network information to the Router Logic
Step 2b: OM requests Buffer for all blocks, including a preferred first block, the Consumer Node is missing.

Figure 10:
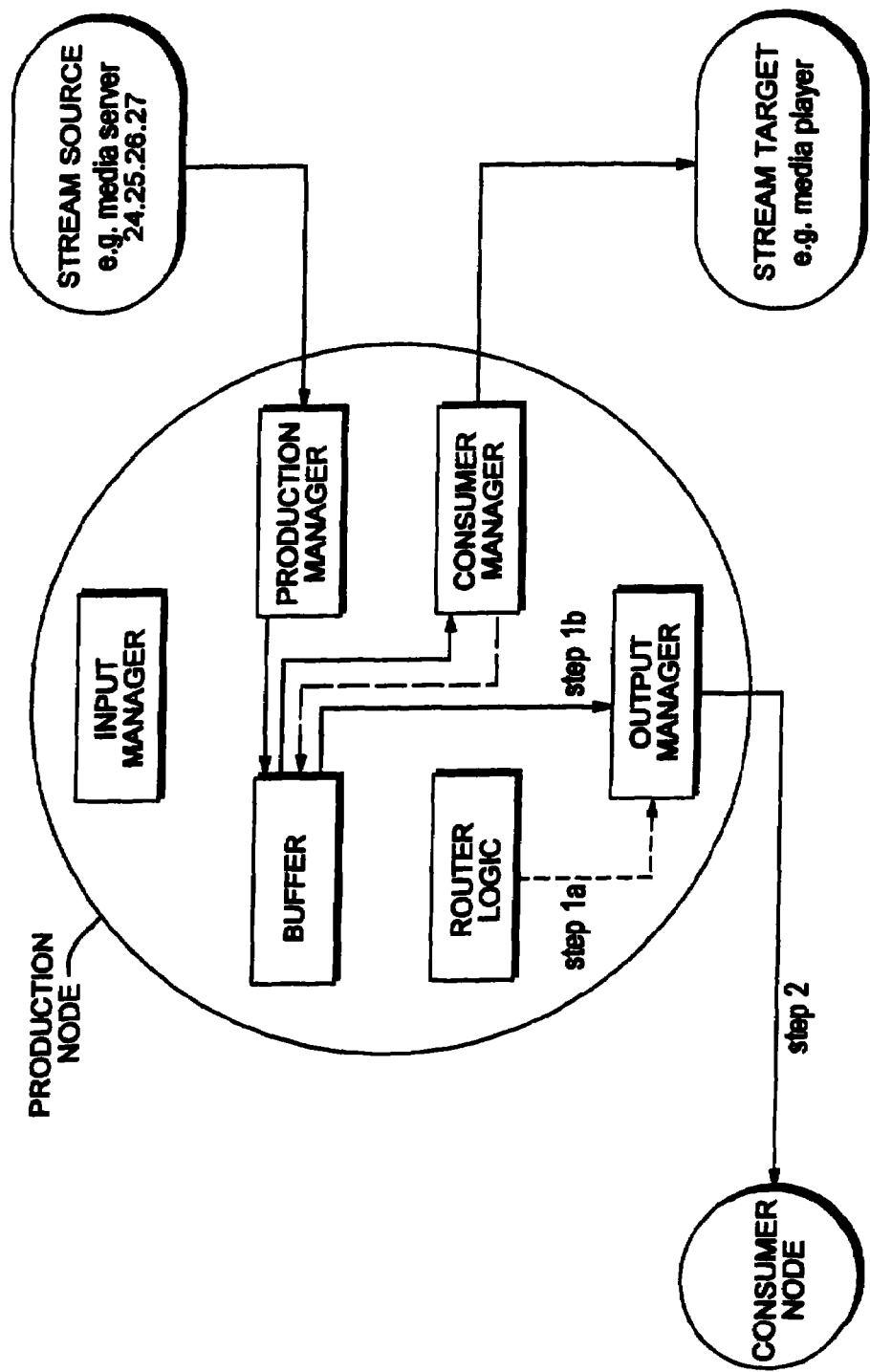
Figure 11:
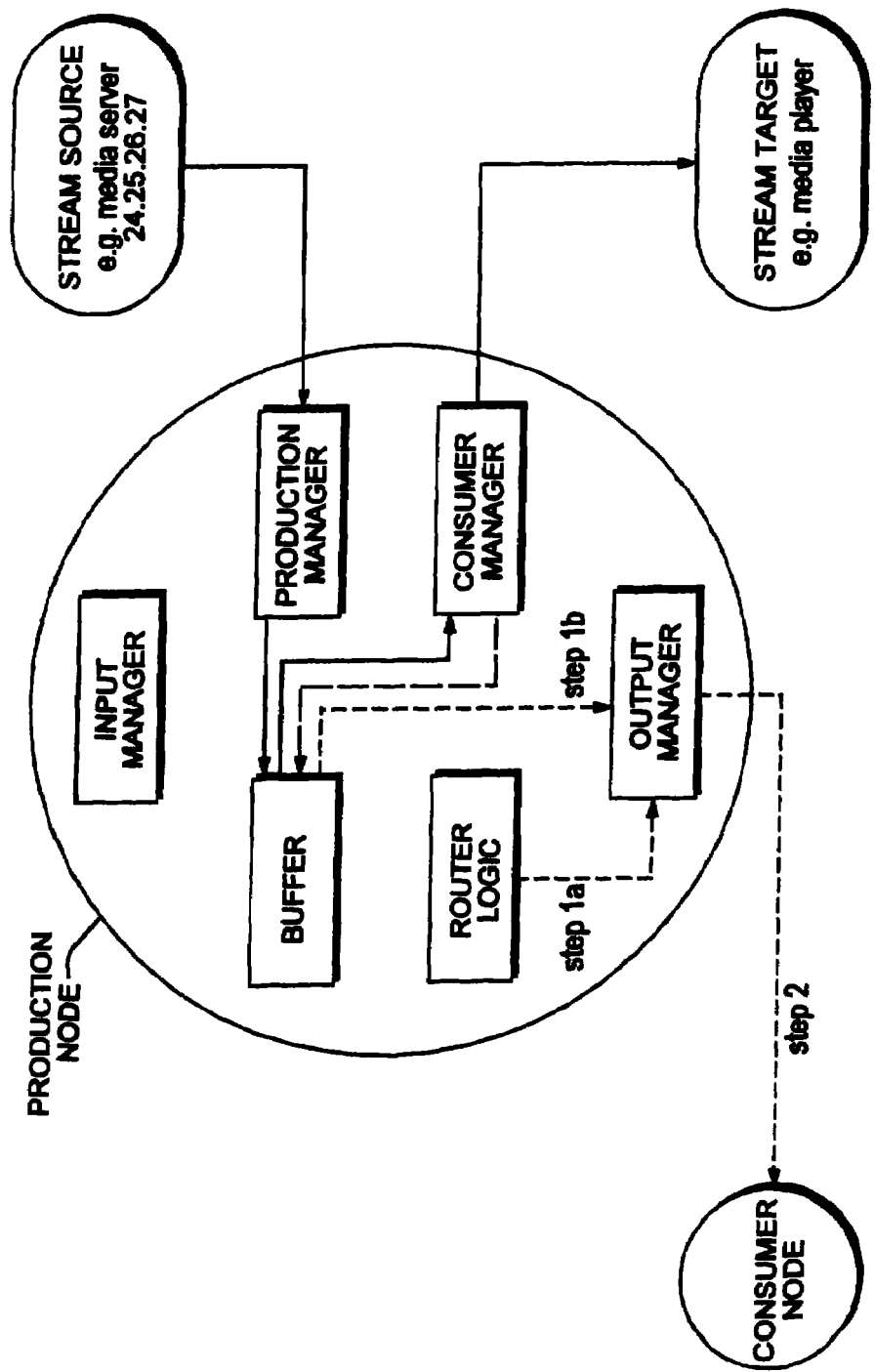

In FIGS. 10 and 11, the response of the Production Node (PN) on an incoming request of the Consumer Node (CN) is shown. The following situation may occur:

The requested data blocks are available
The data blocks are not available.
These two possible situations will be further ellucidated.
Blocks Available (FIG. 10)

The requested blocks are available in the Buffer of the Production Node, together with network information this data is returned to the requesting Consumer Node. The following steps are then performed:
Step 1a: Network information about PN and the nodes PN is aware off, is returned to the Output Manager (OM) by the Router Logic (RL)
Step 1b: The requested parts of the media stream (data blocks) are returned by the buffer to the OM
Step 2: The OM bundles the information and returns this to the CN.

Blocks NOT Available (FIG. 11)
The requested blocks are NOT available in the Buffer of the Production Node, together with network information this data is returned to the requesting Consumer Node.
Step 1a: Network information about PN and the nodes PN is aware off, is returned to the Output Manager (OM) by the Router Logic (RL)
Step 1b: The Buffer returns no data available
Step 2: The OM returns the network information of the RL to the CN.

Figure 12:
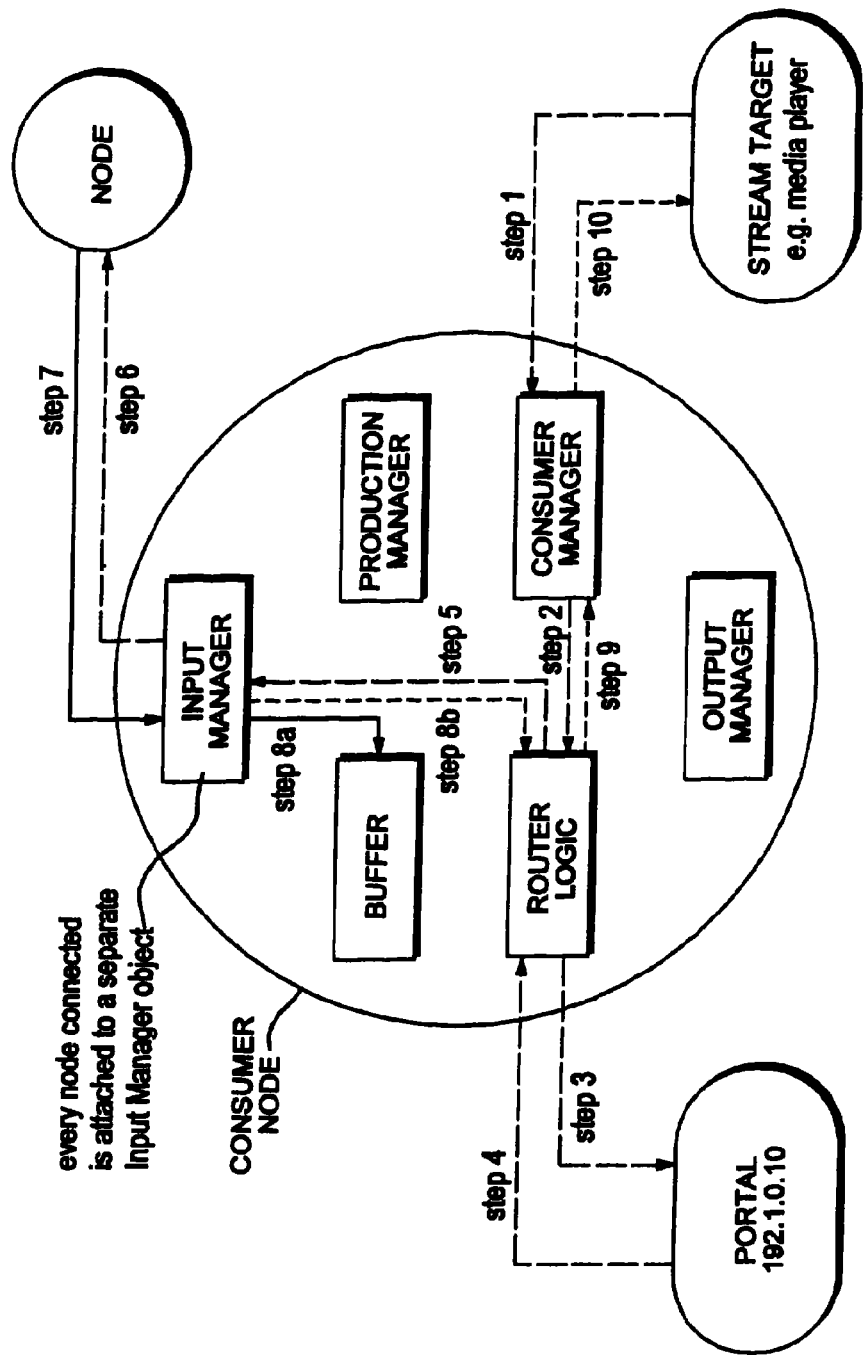

FIG. 12 now shows the different process steps which take place on the side of the Consumer Node (CN) when opening a media stream. A Stream Target (media player) requests a media stream through portal with: http://localhost:123/192.1.0.10/stream.mp3 via the consumer node.

Figure 13:
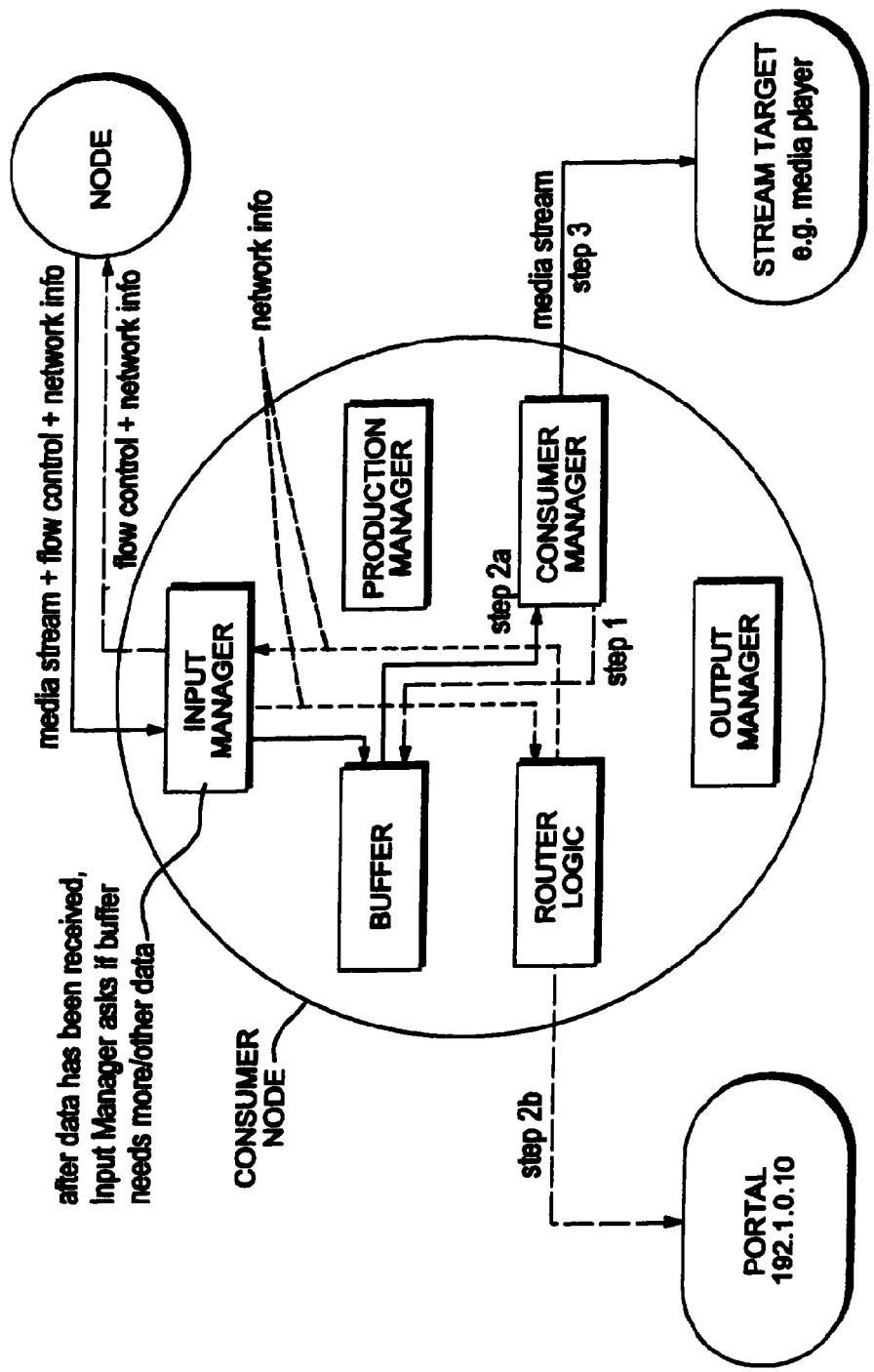

The following steps then take place:
Step 1: Consumer Manager (CM) receives and recognizes a request
Step 2: CM asks Router Logic (RL) for action
Step 3: RL ask portal (192.1.0.10) for IP address other node (PN or CN) participating in the node network
Step 4: Portal returns IP address of other node
Step 5: RL asks Input Manager (IM) to connect other node
Step 6: IM requests other node for connection
Step 7: Other node returns media stream and http header
Step 8a: IM parses data and sends media stream to Buffer
Step 8b: IM returns http header to RL
Step 9: RL returns http header to CM
Step 10: CM returns http header to Stream Target In FIG. 13 is shown what happens when the Consumer Node (CN) starts receiving a media stream. When the http header has been passed to the Stream Target, the Consumer Manager (CM) starts a data retrieval loop: asks data from Buffer and waits for reply. Buffer response could either be:

data medium stream (CM will ask for more) or
data not ready yet (CM will wait and try later) or
end of stream (CM will close connection).

Figure 14:
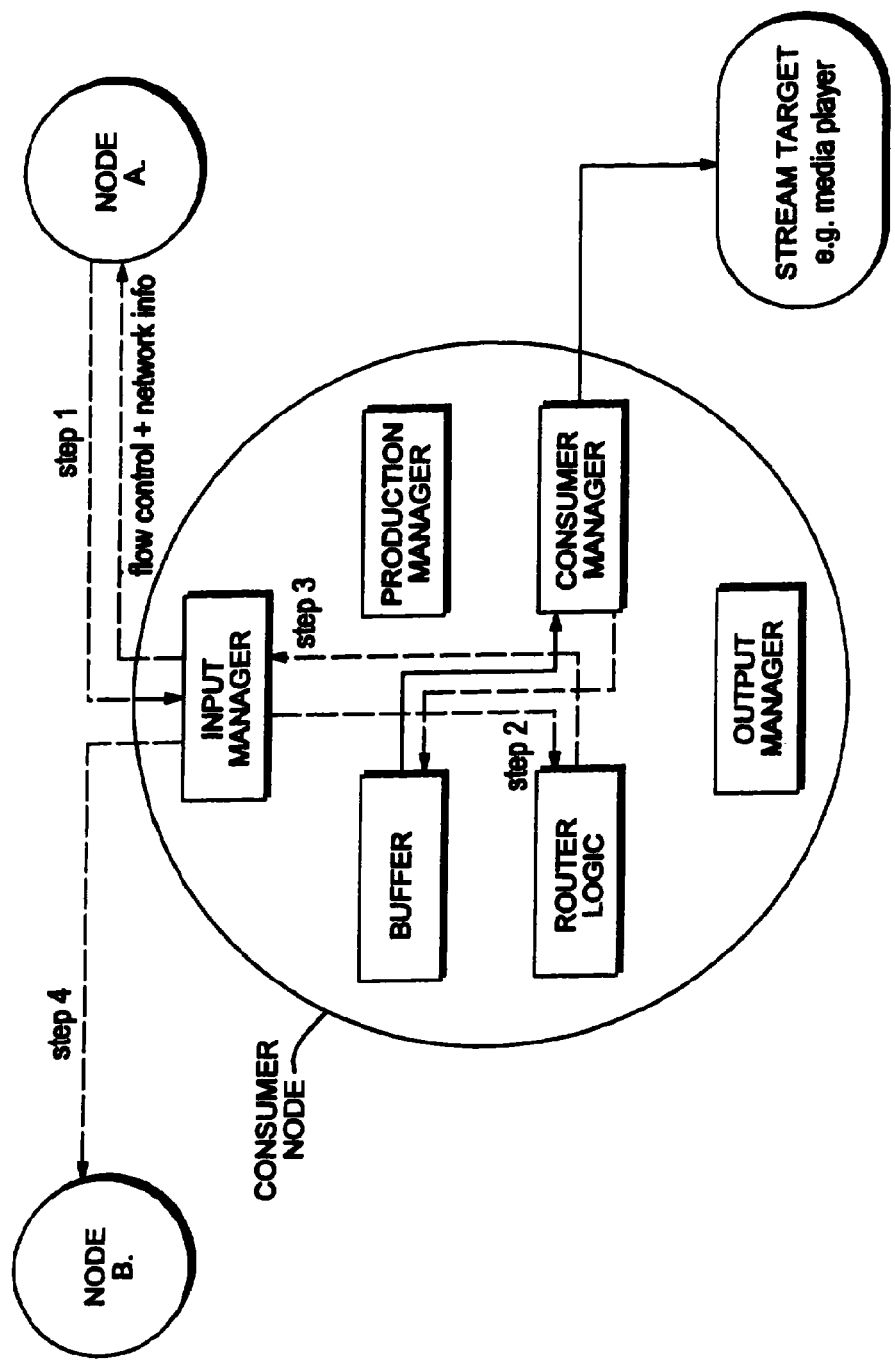

The following steps are thus performed:
Step 1: Consumer Manager (CM) requests Buffer for data media stream
Step 2a: Buffer starts sending media stream to CM
Step 2b: Router Logic (RL) registers CN as active node at Portal and confirms its connection with other node
Step 3: CM passes stream to Stream Target In FIG. 14 is shown what happens when the Consumer Node (CN) fails to connect after receiving media stream from another Node. For instance, connection from Consumer Node to other node (A.) is lost. Consumer Node reacts by a request to another node (B.) in the node network. This is done by performing the following steps:
Step 1: Input Manager (IM) fails to connect to other node (A.)
Step 2: IM asks Router Logic (RL) for another IP address in the node network.
Step 3: Router Logic (RL) returns IP address of another node (B.)
Step 4: IM sends out a connection request to another node (B.)

Figure 15:
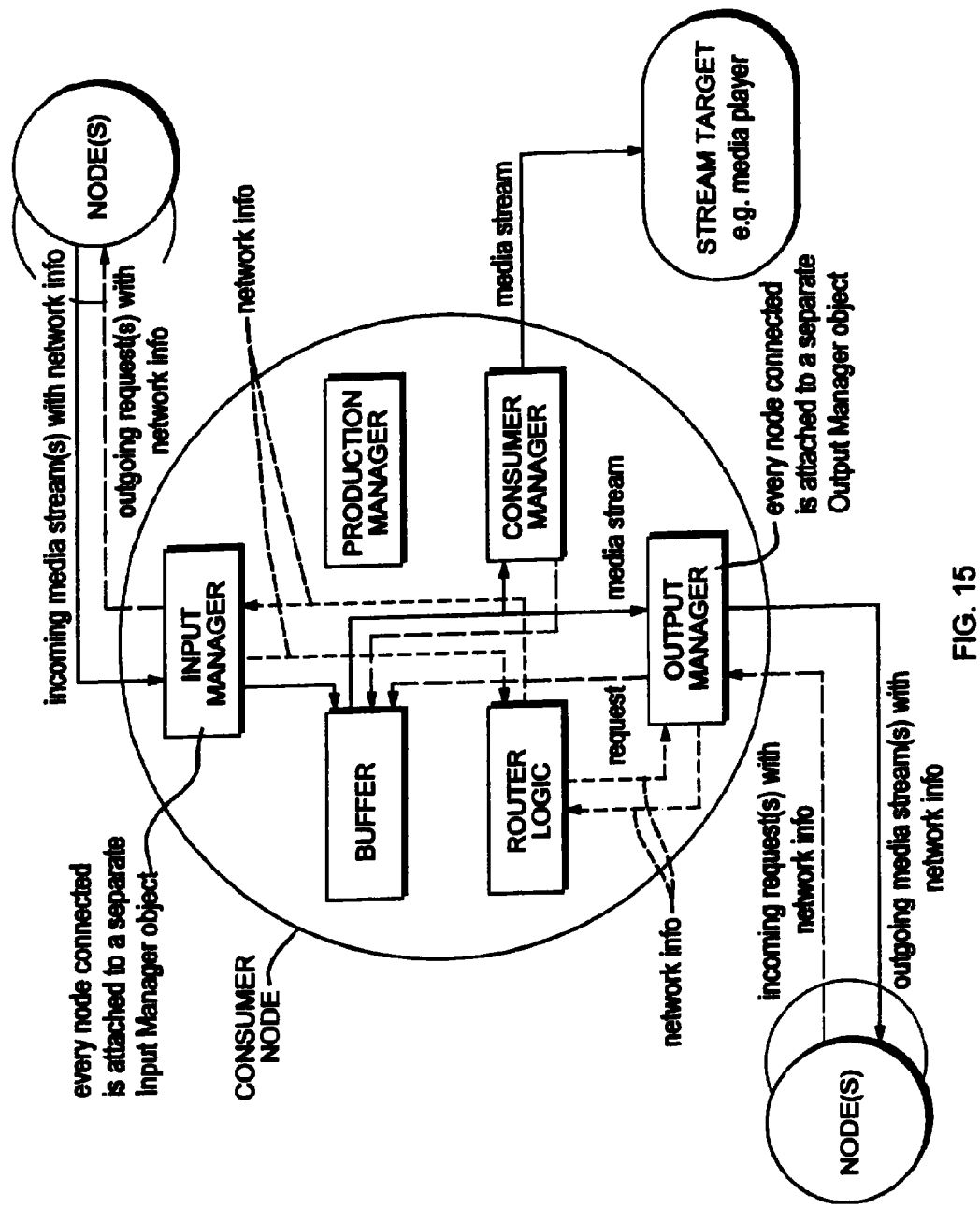

FIG. 15 shows, by way of summary, the different processing streams in an active Consumer Node (CN). It shows in what way the different parts of the consumer node are interconnected.

The device according to the invention in all examples is autonomously capable of retrieving content from a data network, and sending it on to other devices according to the invention without the intervention of the transmitting side. Additionally each device is capable of testing whether a better connection is within reach, and entirely independently choosing whether to use said connection.

It is to be understood that the above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for distributing data, using wireless peer to peer (P2P) connections between motor vehicles, comprising:

issuing a first request for data from a first device of a first motor vehicle to at least a second device of a second motor vehicle, the first device being wirelessly coupled to the second device, in response to a the first request, transmitting at least a part of the data requested in the first request from the second device of the second motor vehicle to the first device of the first motor vehicle; and in response to the receipt of a second request from a third device of a third motor vehicle, transmitting at least a portion of the data transmitted in response to the first request, from the first device of the first motor vehicle to the third device of the third motor vehicle, the third device being wirelessly coupled to the first device.

2. The method according to claim 1, wherein the response to the first request and the response to the second request comprise traffic information.

3. The method according to claim 1, wherein the response to the second request comprises information about at least the second motor vehicle.

4. The method of claim 1, wherein the first device of the first motor vehicle is configured to issue the first request autonomously.

5. A method of distributing data using connections in a network, the network including one or more production nodes that send data, and a plurality of consumer nodes, wherein each consumer node receives data from one or more production nodes or at least one other consumer node and is operationally coupled to a motor vehicle, the method comprising:
  (a) providing a plurality of consumer nodes, wherein each given consumer node is configured to:
    (i) issue a first request for data to at least one production node or at least another consumer node that is directly connected to the given consumer node; and
    (ii) in response to a request for data issued by one other consumer node, transmit data from the given consumer node to the one other consumer node;
  (b) providing one or more production nodes configured to transmit data to a requesting consumer node in response to a request for data issued by the requesting consumer node;
  (c) in response to receipt of the first request from the given consumer node by the at least one consumer node or the at least one production node:
    (i) if the node receiving the first request is a consumer node, transmitting at least a portion of the requested data to the given consumer node; and
    (ii) if the node receiving the first request is a production node, transmitting at least a portion of the requested data to the given consumer node;
  (d) after step (c), and independent of said first request, issuing a second request for data from a second consumer node, the second request issued to the given consumer node; and
  (e) in response to receipt of the second request, transmitting to the second consumer node at least a portion of the data requested by the second request.

6. The method of claim 5, wherein the data comprises at least traffic information.

7. A method of distributing data, using wireless peer to peer (P2P) connections between a plurality of devices, each device operationally coupled to a motor vehicle, the method comprising:
  (a) issuing a first request for data from a first device of a first motor vehicle to a second device of a second motor vehicle, the first device being wirelessly coupled to the second device;
  (b) in response to the receipt of the first request by the second device, transmitting at least a portion of the requested data to the first device;
  (c) after step (b), and independent of said first request, issuing, from a third device of a third motor vehicle, a second request to the first device for at least a part of the portion of the requested data; and
  (d) in response to receipt of the second request, transmitting to the third device at least a portion of the data requested by the second request.

8. The method according to claim 7, wherein the first device and the second device are part of a traffic information system.

9. The method according to claim 7, wherein the first device and the second device are part of a route navigation system.

10. The method according to claim 9, wherein the route navigation system is provided with GPS.

11. The method according to claim 7, wherein said the first device is a radio.

12. The method according to claim 7, wherein the first device is part of a radar system.

13. The method according to claim 7, wherein the first and second devices are part of a motor vehicle information system.

14. The method according to claim 7, wherein said data comprises traffic information.

15. The method according to claim 7, wherein said data comprises information about said at least one other motor vehicle.

* * * * *

UNITED STATES PATENT AND TRADEMARK OFFICE
CERTIFICATE OF CORRECTION

PATENT NO.         : 7,522,993 B2
APPLICATION NO. : 11/617421
DATED                 : April 21, 2009
INVENTOR(S)       : Marc van Oldenborgh et al.

Page 1 of 1

It is certified that error appears in the above-identified patent and that said Letters Patent is hereby corrected as shown below:

In claim 1, column 15, line 5, "in response to a the first request," should read --in response to the first request--.

Signed and Sealed this

Sixteenth Day of June, 2009

JOHN DOLL
*Acting Director of the United States Patent and Trademark Office*